US00RE42728E

(19) United States
(12) Reissued Patent
Madrane

(10) Patent Number: US RE42,728 E
(45) Date of Reissued Patent: Sep. 20, 2011

(54) NETWORK DISTRIBUTION AND MANAGEMENT OF INTERACTIVE VIDEO AND MULTI-MEDIA CONTAINERS

(75) Inventor: Nabil Madrane, Casablanca (MA)

(73) Assignee: Sony Corporation, Tokyo (JP)

(21) Appl. No.: 11/140,518
(22) Filed: May 31, 2005

(Under 37 CFR 1.47)

Related U.S. Patent Documents

Reissue of:
(64) Patent No.: 6,573,907
Issued: Jun. 3, 2003
Appl. No.: 09/411,873
Filed: Oct. 4, 1999

U.S. Applications:
(63) Continuation-in-part of application No. 08/887,992, filed on Jul. 3, 1997, now Pat. No. 5,963,203.
(51) Int. Cl.
*G06F 3/00* (2006.01)

(52) U.S. Cl. ..... 715/716; 715/719; 715/720; 715/721
(58) Field of Classification Search ..... 715/716, 715/719, 720, 721, 723, 205, 206, 208
See application file for complete search history.

(56) References Cited

U.S. PATENT DOCUMENTS

| | | | | | |
|---|---|---|---|---|---|
| 5,008,853 | A | * | 4/1991 | Bly et al. | 345/751 |
| 5,220,657 | A | * | 6/1993 | Bly et al. | 711/152 |
| 5,237,648 | A | | 8/1993 | Mills et al. | 345/723 |
| 5,596,705 | A | * | 1/1997 | Reimer et al. | 345/720 |
| 5,600,775 | A | * | 2/1997 | King et al. | 715/203 |
| 5,708,845 | A | * | 1/1998 | Wistendahl et al. | 715/202 |
| 5,729,471 | A | | 3/1998 | Jain et al. | 345/419 |
| 5,745,710 | A | | 4/1998 | Clanton, III et al. | 345/721 |
| 5,805,118 | A | * | 9/1998 | Mishra et al. | 345/1.1 |
| 5,828,370 | A | * | 10/1998 | Moeller et al. | 345/720 |
| 5,938,724 | A | * | 8/1999 | Pommier et al. | 709/205 |
| 5,956,716 | A | | 9/1999 | Kenner et al. | 707/10 |
| 5,963,203 | A | | 10/1999 | Goldberg et al. | 345/723 |
| 6,275,529 | B1 | | 8/2001 | Sato | |
| 6,345,288 | B1 | * | 2/2002 | Reed et al. | 709/201 |

FOREIGN PATENT DOCUMENTS

| | | |
|---|---|---|
| FR | 97.00423 | 1/1997 |
| WO | WO 98/02827 | 1/1998 |
| WO | WO 98/47084 | 10/1998 |
| WO | WO 99/01830 | 1/1999 |
| WO | WO 99/46702 | 9/1999 |

OTHER PUBLICATIONS

Carol Levin, "Web Video Studio Premiers This Spring," *PC Magazine Online,* Dec. 1998.
International Search Report in related PCT/US99/26938.
Zhang, H.J. et al., "Video Parsing, Retrieval and Browsing: An Integrated and Content–Based Solution," *The Third ACM International Multimedia Conference and Exhibition Multimedia '95,* New York, New York, 1996, pp. 1–19.

* cited by examiner

*Primary Examiner*—Dennis Bonshock
(74) *Attorney, Agent, or Firm*—Oblon, Spivak, McClelland, Maier & Neustadt, L.L.P.

(57) ABSTRACT

Interactive interfaces to video information provide a displayed view of a quasi-object called a root image. The root image consists of a plurality of basic frames selected from the video information, arranged such that their respective x and y directions are aligned with the x and y directions in the root image and the z direction in the root image corresponds to time, such that base frames are spaced apart in the z direction of the root image in accordance with their time separation. The displayed view of the root image changes in accordance with a designated viewing position, as if the root image were a three-dimensional object. The user can manipulate the displayed image by designating different viewing positions, selecting portions of the video information for playback and by special effects, such as cutting open the quasi-object for a better view. A toolkit permits interface designers to design such interfaces, notably so as to control the types of interaction which will be possible between the interface and an end user. Implementations of the interfaces including editors and viewers are also disclosed.

57 Claims, 39 Drawing Sheets

NETWORK DISTRIBUTION AND MANAGEMENT OF INTERACTIVE VIDEO AND MULTI-MEDIA CONTAINERS

Matter enclosed in heavy brackets [ ] appears in the original patent but forms no part of this reissue specification; matter printed in italics indicates the additions made by reissue.

This application is CIP of application Ser. No. 08/887,992; filed on Jul. 3, 1997, now U.S. Pat. No. 5,963,203.

The present invention relates to network distribution and management of video and, more particularly, to distribution and management of interactive video and multi-media containers. The network distribution and management includes, but is not limited to, managing media files, creating and authoring media containers, publishing and indexing media containers, searching and browsing media containers, and distributing media containers.

BACKGROUND AND SUMMARY

Video information is being produced at an ever-increasing rate and video sequences, especially short sequences, are increasingly being used, for example, in websites and on CD-ROM, and being created, for example, by domestic use of camcorders. There is a growing need for tools enabling the indexing, handling and interaction with video data. It is particularly necessary for interfaces to be provided which enable a user to access video information selectively and to interact with that information, especially in a non-sequential way.

Conventionally, video information consists of a sequence of frames recorded at a fixed time interval. In the case of classic television signals, for example, the video information consists of 25 or 30 frames per second. Each frame is meaningful since it corresponds to an image which can be viewed. A frame may be made up of a number of interlaced fields, but this is not obligatory as is seen from more recently proposed video formats, such as those intended for high definition television. Frames describe the temporal decomposition of the video image information. Each frame contains image information structured in terms of lines and pixels, which represent the spatial decomposition of the video.

In the present document, the terms "video information" or "video sequences" refer to data representing a visual image recorded over a given time period, without reference to the length of that time period or the structure of the recorded information. Thus, the term "video sequence" will be used to refer to any series of video frames, regardless of whether this series corresponds to a single camera shot (recorded between two cuts) or to a plurality of shots or scenes.

Traditionally, if a user desired to know what was the content of a particular video sequence he was obliged to watch as each frame, or a sub-sample of the frames, of the sequence was displayed successively in time. (For purposes of this document, the terms "he," "him," or "his" are used for convenience in place of she/he, her/him and hers/his, and are intended to be gender-neutral.) This approach is still widespread, and in applications where video data is accessed using a personal computer, the interface to the video often consists of a displayed window in which the video sequence is contained and a set of displayed controls similar to those found on a video tape recorder (allowing fastforward, rewind, etc.).

Developments in the fields of video indexing and video editing have provided other forms of interface to video information.

In the field of video indexing, it is necessary to code information contained in a video sequence in order to enable subsequent retrieval of the sequence from a database by reference to keywords or concepts. The coded content may, for example, identify the types of objects present in the video sequence, their properties/motion, the type of camera movements involved in the video sequence (pan, tracking shot, zoom, etc.), and other properties. A "summary" of the coded document may be prepared, consisting of certain representative frames taken from the sequence, together with text information or icons indicating how the sequence has been coded. The interface for interacting with the video database typically includes a computer input device enabling the user to specify objects or properties of interest and, in response to the query, the computer determines which video sequences in the database correspond to the input search terms and displays the appropriate "summaries". The user then indicates whether or not a particular video sequence should be reproduced. Examples of products using this approach are described in the article "Advanced Imaging Product Survey: Photo, Document and Video" from the journal "Advanced Imaging", October 1994, which document is incorporated herein by this reference.

In some video indexing schemes, the video sequence is divided up into shorter series of frames based upon the scene changes or the semantic content of the video information. A hierarchical structure may be defined. Index "summaries" may be produced for the different series of frames corresponding to nodes in the hierarchical structure. In such a case, at the time when a search is made, the "summary" corresponding to a complete video sequence may be retrieved for display to the user who is then allowed to request display of "summaries" relating to sub-sections of the video sequence which are lower down in the hierarchical structure. If the user so wishes, a selected sequence or subsection is reproduced on the display monitor. Such a scheme is described in EP-A-0 555 028 which is incorporated herein by this reference.

A disadvantage of such traditional, indexing/searching interfaces to video sequences is that the dynamic quality of the video information is lost.

Another approach, derived from the field of video editing, consists of the "digital storyboard". The video sequence is segmented into scenes and one or more representative frames from each scene is selected and displayed, usually accompanied by text information, side-by-side with representative frames from other segments. The user now has both a visual overview of all the scenes and a direct visual access to individual scenes. Each representative frame of the storyboard can be considered to be an icon. Selection of the icon via a pointing device (typically a mouse-controlled cursor) causes the associated video sequence or sub-sequence to be reproduced. Typical layouts for the storyboards are two-dimensional arrays or long one-dimensional strips. In the first case, the user scans the icons from the left to the right, line by line, whereas in the second case the user needs to move the strip across the screen.

Digital storyboards are typically created by a video editor who views the video sequence, segments the data into individual scenes and places each scene, with a descriptive comment, onto the storyboard. As is well-known from technical literature, many steps of this process can be automated. For example, different techniques for automatic detection of scene changes are discussed in the following documents, each of which is incorporated herein by reference:

"A Real-time neural approach to scene cut detection" by Ardizzone et al, IS&T/SPLE-Storage & Retrieval for Image and Video Databases IV, San Jose, Calif.

"Digital Video Segmentation" by Hampapur et al, ACM Multimedia '94 Proceedings, ACM Press-1

"Extraction of News Articles based on Scene Cut Detection using DCT Clustering" by Ariki et al, International Conference on Image Processing, September 1996, Lausanne, Switzerland;

"Automatic partitioning of full-motion video" by HoncJiang Zhang et al, Multimedia Systems (Springer-Verfaa, 199')), 1, pages 10-28-, and EP-A-0 590 759.

Various methods for automatically detecting and tracking persons and objects in video sequences are considered in the following documents, each of which is incorporated herein by reference:

"Modeling, Analysis and Visualization of Nonrigid Object Motion", by T. S. Huang, Proc. of International Conf. on Pattern Recognition, Vol. 1, pp 361-364, Atlantic City, N.J., Jun. 1990- and "Segmentation of People in Motion" by Shio et al, Proc. IEEE, vol. 79, pp 325332, 1991. Techniques for automatically detecting different types of camera shot are described in "Global zoom/pan estimation and compensation for video compression" by Tse et al, Proc. ICASSP, Vol.4, pp 2725-2728, May 1991; and "Differential estimation of the global motion parameters zoom and pan" by M. Hoetter, Signal Processing, Vol. 16, pp 249-265, 1989.

In the case of digital storyboards too, the dynamic quality of the video sequence is often lost or obscured. Some impression of the movement inherent in the video sequence can be preserved by selecting several frames to represent each scene, preferably frames which demonstrate the movement occurring in that scene. However, storyboardtype interfaces to video information remain awkward to use in view of the fact that multiple actions on the user's part are necessary in order to view and access data.

Attempts have been made to create a single visual image which represents both the content of individual views making up a video sequence and preserves the context, that is, the time-varying nature of the video image information.

One such approach creates a "trace" consisting of a single frame having superimposed images taken from different frames of the video sequence, these images being offset one from the other due to motion occurring between the different frames from which the images were taken. Thus, for example, in the case of a video sequence representing a sprinter running, the corresponding "trace" will include multiple probably overlapping) images of the sprinter, spaced in the direction in which the sprinter is running. Another approach of this kind generates a composite image, called a "salient still", representative of the video sequence—see "Salient Video Stills: Content and Context Preserved" by Teodosio et al, Proc. ACM Multimedia 93, California, Aug. 1-6, 1993), pp 39-47 which article is incorporated herein by this reference in its entirety.

Still another approach of this general type consists in creation of a "video icon", as described in the papers "Developing Power Tools for Video Indexinor and retrieval" by Zhang et al, SPIE, Vol.2185, pp 140-149-, and "Video Representation tools using a unified object and perspective based approach" by the present inventors, IS&T/SPIE Conference on Storage and Perusal for Image and Video Databases, San Jose, Calif., February 1995 which are incorporated herein by reference.

In a "video icon", as illustrated in FIG. 1A, the scene is represented by a number of frames selected from the sequence and which are displayed as if they were stacked up one behind the other in the z-direction and are viewed in perspective. In other words, each individual frame is represented by a plane and the planes lie one behind the other with a slight offset. Typically the first frame of the stack is displayed in its entirety whereas underlying frames are partially occluded by the frames in front. The envelope of the stack of frames has a parallelepiped shape. The use of a number of frames, even if they are partially occluded, gives the user a more complete view of the scene and, thus, a better visual understanding. Furthermore, with some such icons, the user can directly access any frame represented in the icon.

Two special types of video icon have been proposed, "object based" video icons and video icons containing a representation of camera movement. In an "object based" video icon, as illustrated in FIG. 1B, objects of interest are isolated in the individual frames and, for at least some of the stacked frames, the only image information included in the video icon is the image information corresponding to the selected object. In such a video icon, at least some of the individual frames are represented as if they were transparent except in the regions containing the selected object. Video icons containing an indication of camera movement may have, as illustrated in the example of FIG. 1C, a serpentine-shaped envelope corresponding to the case of side-to-side motion of the camera.

The video icons discussed above present the user with information concerning the content of the whole of a video sequence and serve as a selection tool allowing the user to access-frames of the video sequence out of the usual order. In other words, these icons allow non-sequential access to the video sequence. Nevertheless, the ways in which the user can interact with the video sequence information are strictly limited. The user can select frames for playback in a non-sequential way but he has little or no means of obtaining a deeper level of information concerning the video sequence as a whole, short of watching a playback of the whole sequence.

The present invention provides a novel type of interface to video information which allows the user to access information concerning a video sequence in a highly versatile manner. In particular, interactive video interfaces of the present invention enable a user to obtain deeper levels of information concerning an associated video sequence at positions in the sequence which are designated by the user as being of interest.

The present invention provides an interface to information concerning an associated video sequence, one such interface comprising:

information defining a three-dimensional root image, the root image consisting of a plurality of basic frames selected from said video sequence, and/or a plurality of portions of video frames corresponding to selected objects represented in the video sequence, x and y directions in the root image corresponding to x and y directions in the video frames and the z direction in the root image corresponding to the time axis whereby the basic frames are spaced apart from one another in the z direction of the root image by distances corresponding to the time separation between the respective video frames;

means for displaying views of the root image;

means for designating a viewing position relative to said root image; and means for calculating image data representing said three-dimensional root image viewed from the designated viewing position, and for outputting said calculated image data to the displaying means.

According to the present invention, customized user interfaces may be created for video sequences. These interfaces comprise a displayable "root" image which directly represents the content and context of the image information in the video sequence and can be manipulated, either automatically or by the user, in order to display further image information, by designation of a viewing position with respect to the root image, the representation of the displayed image being changed in response to changes in the designated viewing position. In a preferred embodiment of the present invention, the representation of the displayed image changes dependent upon the designated viewing position as if the root image were a three-dimensional object. In such preferred embodiments, as the designated viewing position changes, the data necessary to form the displayed representation of the root image is calculated so as to provide the correct perspective view given the viewing angle, the distance separating the viewing position from the displayed quasi-object and whether the viewing position is above or below the displayed quasi-object.

In a reduced form, the present invention can provide non-interactive interfaces to video sequences, in which the root image information is packaged with an associated script defining a routine for automatically displaying a sequence of different views of the root image and performing a set of manipulations on the displayed image, no user manipulation being permitted. However, the full benefits of the invention are best seen in interactive interfaces where the viewing position of the root image is designated by the user, as follows. When the user first accesses the interface he is presented with a displayed image which represents the root image seen from a particular viewpoint (which may be a predetermined reference viewpoint). As he designates different viewing angles, the displayed image represents the root image seen from different perspectives. When the user designates viewing positions at greater or lesser distances from the root image, the displayed image increases or reduces the size and, preferably, resolution of the displayed information, accessing image data from additional video frames, if need be.

The customized, interactive interfaces provided by the present invention involve displayed images, representing the respective associated video sequences, which, in some ways, could be considered to be a navigable environment or a manipulable object. This environment or object is a quasi-three-dimensional entity. The x and y dimensions of the environment/object correspond to true spatial dimensions (corresponding to the x and y directions in the associated video frames) whereas the z dimension of the environment/object corresponds to the time axis. These interfaces could be considered to constitute a development of the "video icons" discussed above, now rendered interactive and manipulable by the user.

With the interfaces provided by the present invention, the user can select spatial and temporal information from a video sequence for access by designating a viewing position with respect to a video icon representing the video sequence. Arbitrarily chosen oblique "viewing directions" are possible whereby the user simultaneously accesses image information corresponding to portions of a number of different frames in the video sequence. As the user's viewing position relative to the video icon changes, the amount of a given frame which is visible to him, and the number and selection of frames which he can see, changes correspondingly.

As mentioned above, the interactive video interfaces of the present invention make use of a "root" image comprising a plurality of basic frames arranged to form a quasi-three dimensional object. It is preferred that the relative placement positions of the basic frames be arranged so as to indicate visually some underlying motion in the video sequence. Thus, for example, if the video sequence corresponds to a travelling shot moving down a hallway and tuning a corner, the envelope of the set of basic frames preferably does not have a parallelepiped shape but, instead, composes a "pipe" of rectangular section and bending, in a way corresponding to the camera travel during filming of the video sequence.

In preferred embodiments of video interfaces according to the present invention, the basic video frames making up the root image are chosen as a function of the amount of motion or change in the sequence. For example, in the case of a video sequence corresponding to a travelling shot, in which the background information changes, it is preferable that successive basic frames should include back-round information overlapping by, say, 50%.

In certain embodiments of the present invention, the root image corresponds to an "object-based video icon." In other words, certain of the basic frames included in the root image are not included therein in full; only those portions corresponding to selected objects are included. Alternatively, or additionally, certain basic frames may be included in full in the root image but may include "hot objects," that is, representations of objects selectable by the user. In response to selection of such "hot objects" by the user, the corresponding basic frames (and, if necessary, additional frames) are then displayed as if they had become transparent at all portions thereof except the portion(s) where the selected object or objects are displayed. The presence of such selectable objects in the root image allows the user to selectively isolate objects of interest in the video sequence and obtain at a glance a visual impression of the appearance and movement of the objects during the video sequence.

The interfaces of the present invention allow the user to select an arbitrary portion of the video sequence for playback. The user designates a portion of the video sequence which is of interest, by designating a corresponding portion of the displayed image forming part of the interface to the video sequence. This portion of the video sequence is than played back. The interface may include a displayed set of controls similar to those provided on a VCR in order to permit the user to select different modes for this playback, such as fast-forward, rewind, etc.

In preferred embodiments of interfaces according to the invention, the displayed image forming part of the interface remains visible whilst the designated portion of the sequence is being played back. This can be achieved in any number of ways, as for example, by providing a second display device upon which the playback takes place, or by designating a "playback window" on the display screen, this playback window being offset with respect to the screen area used by the interface, or by any other suitable means.

The preferred embodiments of interfaces according to the invention also permit the user to designate an object of interest and to select a playback mode in which only image information concerning that selected object is included in the playback. Furthermore, the user can select a single frame from the video sequence for display separately from the interactive displayed image generated by the interface.

In preferred embodiments, the interfaces of the present invention allow the user to generate a displayed image corresponding to a distortion of the root image. More especially, the displayed image can correspond to the root image subjected to an "accordion effect", where the root image is "cracked open", for example, by bending around a bend line so as to "fan out" video frames in the vicinity of the opening point, or is modified by linearly spreading apart video frames at a point of interest. The accordion effect can also be applied repetitively or otherwise in a nested fashion according to the present invention.

The present invention can provide user interfaces to "multi-threaded" video sequences, that is, video sequences consisting of numerous interrelated shorter segments such as are found, for example, in a video game where the user's choices change the scene which is displayed. Interfaces to such multi-threaded video sequences can include frames of the different video segments in the root image, such that the root image has a branching structure. Alternatively, some or all of the different threads may not be visible in the root image but may become visible as a result of user manipulation. For example, if the user expresses an interest in a particular region of the video sequence by designating a portion of a displayed root image using a pointing device (such as a mouse, or by touching a touch screen, etc.) then if multiple different threads of the sequence start from the designated area, image portions for these different threads may be added to the displayed image.

In preferred embodiments of interfaces according to the present invention, the root image for the video sequence concerned is associated with information defining how the corresponding displayed image will change in response to given types of user manipulation. Thus, for example, this associated information may define how many, or which additional frames are displayed when the user moves the viewing position closer up to the root image. Similarly, the associated information may identify which objects in the scene are "hot objects" and what image information will be displayed in relation to these hot objects when activated by the user.

Furthermore, different possibilities exist for delivering the components of the interface to the end user. In an application where video sequences are transmitted to a user over a telecommunications path, such as via the Internet, the user who is interested in a particular video sequence may first download only certain components of the associated interface. First of all he downloads information for generating a displayed view of the root image, together with an associated application program (if he does not already have an appropriate "interface player" loaded in his computer). The downloaded (or already-resident) application program includes basic routines for chancing the perspective of the displayed image in response to changes in the viewing position designated by the user. The application program is also adapted to consult any "associated information" (as mentioned above) which forms part of the interface and conditions the way in which the displayed image changes in response to certain predetermined user manipulations (such as "zoom-in" and "activate object"). If the interface does not contain any such "associated information" then the application program makes use of pre-set default parameters.

The root image corresponds to a particular set of basic video frames and information designating relative placement positions thereof. The root image information downloaded to the user may include just the data necessary to create a reference view of the root image or it may include the image data for the set of basic frames (in order to enable the changes in user viewing angle to be catered for without the need to download additional information). In a case where the user performs a manipulation which requires display of video information which is not present in the root image (e.g. he "zooms in" such that data from additional frames is required), this extra information can either be pre-packaged and supplied with the root image information or the extra information can be downloaded from the host website as and when it is needed.

Similar possibilities exist in the case of interfaces provided on CD-ROM. In general, the root image and other associated information will be provided on the CD-ROM in addition to the full video sequence. However, it is to be understood that, for reasons of space saving, catalogues of video sequences could be made consisting solely of interfaces, without the corresponding full video sequences.

In addition to providing the interfaces themselves, the present invention also provides apparatus for creation of interfaces according to the present invention. This may be dedicated hardware or, more preferably, a computer system programmed in accordance with specially designed computer programs.

Various of the steps involved in creation of a customized interface according to the present invention can be automated. Thus, for example, the selection of basic frames for inclusion in the "root image" of the interface can be made automatically according to one of a number of different algorithms, such as choosinbg one frame every n frames, or choosing 1 frame every time the camera movement has displaced the background by m%, etc. Similarly, the relative placement positions of the basic frames in the root image can be set automatically taking into account the time separation between those frames and, if desired, other factors such as camera motion. Similarly, the presence of objects or people in the video sequence can be detected automatically according to one of the known algorithms (such as those discussed in the references cited above), and an "object oriented" root image can be created automatically. Thus, in some embodiments, the interface creation apparatus of the present invention has the capability of automatically processing video sequence information in order to produce a root image. These embodiments include means for associating with the root image a standard set of routines for changing the representation of the displayed image in response to user manipulations.

However, it is often preferable actively to design the characteristics of interactive interfaces according to the invention, such that the ways in which the end user can interact with the video information are limited or channeled in preferred directions, This is particularly true in the case of video sequences which are advertisements or are used in educational software and the like.

Thus, the present invention provides a toolkit for use in creation of customized interfaces. In preferred embodiments, the toolkit enables a designer to tailor the configuration and content of the root image, as well as to specify which objects in the video sequence are "hot objects" and to control the way in which the displayed interface image will change in response to manipulation by an end user. Thus, among other things, the toolkit enables the interface designer to determine which frames of the video sequence should be used as basic frames in the root image, and how many additional frames are added to the displayed image when the user designates a viewing position close to the root image.

According to another aspect, the invention relates to network ditribution and management of interactive video and multi-media containers. A need exists for methods and systems for transmitting video and other multi-media files across a network, such as the Internet. U.S. Pat. No. 5,956,716 to Kenner et al. provides an example of a system and method for the delivery of video data over a computer network. In Kenner, a user uses a multimedia terminal to send a request for video clips from a database. A local storage and retrieval module receives and processes video clip requsts and a primary index manager causes the distribution of video clips among a plurality of extended storage and retrieval modules. The extended storage and retrieval modules store a plurality of databases including those that contain video clips. A data sequencing interface directs the extended storage and retrieval module to download the requested video clips. The video clips are then downloaded to the multimedia terminal via the local storage and retrieval module.

Systems and methods according to the invention provide for the network distribution and management of interactive video and multi-media containers. Systems and methods not only can distribute video and other multi-media files but they can also distribute multi-media containers. Consequently, users would be able to access information concerning the mult-imedia files in a highly versatile manner. Systems and methods according to the invention also enable for the transmission of information both to and from the users. Thus, systems and methods according to the invention provide for colloboration between users. For instance, work performed by one user in indexing or in providing annotations is not restricted to just that user but can be shared with others having access to the multi-media file. Other advantages and benefits of the invention are provided in the following description and will be apparent to those skilled in the art.

BRIEF DESCRIPTION OF THE DRAWINGS

Further features and advantages of the present invention will become apparent from the following description of preferred embodiments thereof, given by way of example, and illustrated by the accompanying drawings, in which:

FIG. 1 illustrates various types of video icon, wherein

FIG. 5 illustrates the displayed image in the case of the root image viewed from the different viewing positions of FIG. 4, wherein FIG. 5A represents the displayed image from viewing position A, wherein FIG. 5B represents the displayed image from viewing position B, and wherein

FIG. 6 illustrates displayed images based on more complex root images according to the present invention, in which

DETAILED DESCRIPTION

I. Interactive Interface

The components of an interactive interface according to a first preferred embodiment of the present invention will now be described with reference to FIG. 2. In this example, an interactive interface of the invention is associated with video sequences recorded on a CD-ROM.

Figure 2:
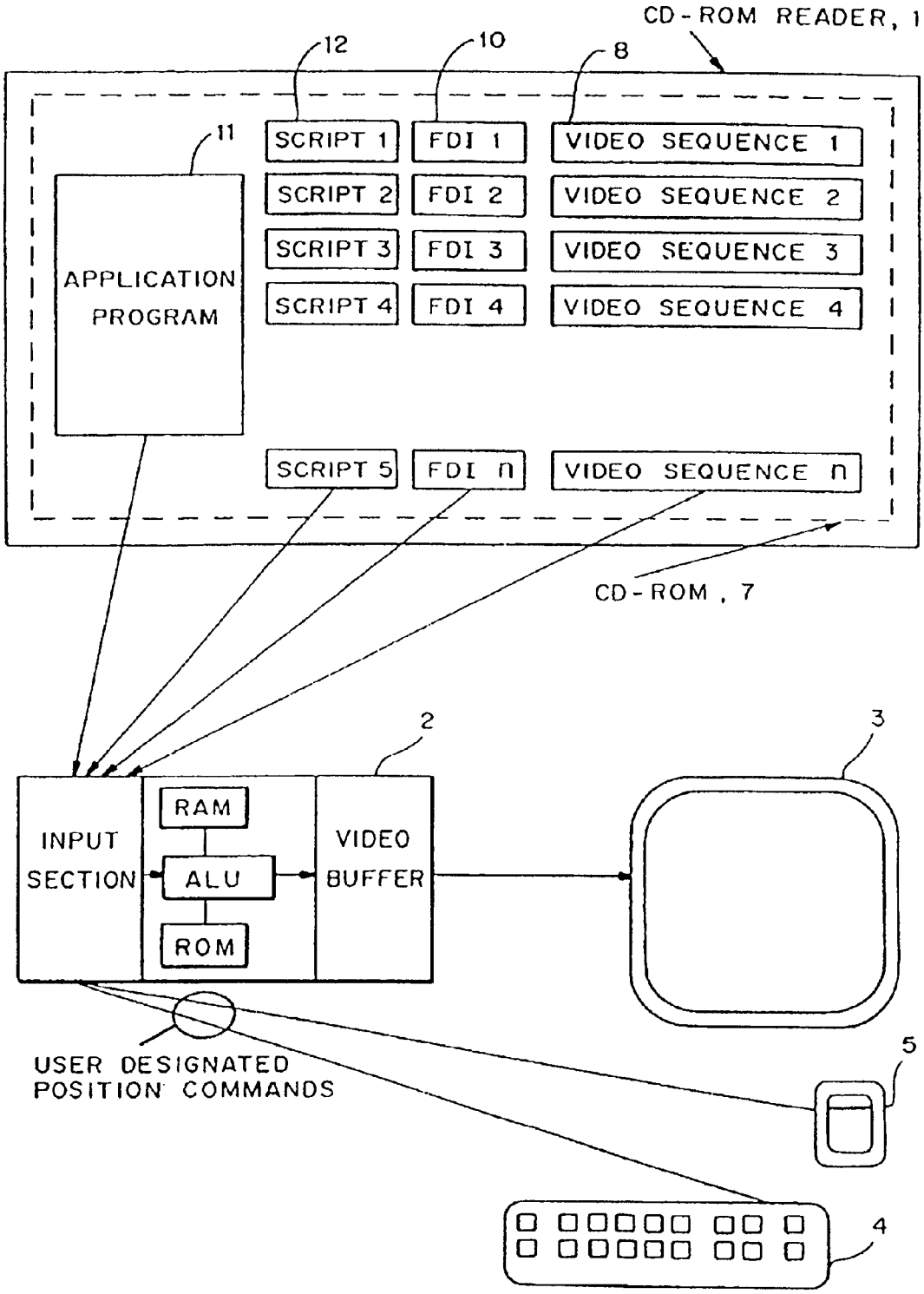
FIG. 2 is a block diagram indicating the components of an interactive interface according to a first embodiment of the present invention.

As shown in FIG. 2, a CD-ROM reader 1 is connected to a computer system including a central processor portion 2, a display screen 3, and a user-operable input device which, in this case, includes a keyboard 4 and a mouse 5. When the user wishes to consult video sequences recorded on a CD-ROM 7, he places the CD-ROM 7 in the CD-ROM reader and activates CD-ROM accessing software provided in the central processor portion 2 or an associated memory or unit.

Figure 3:
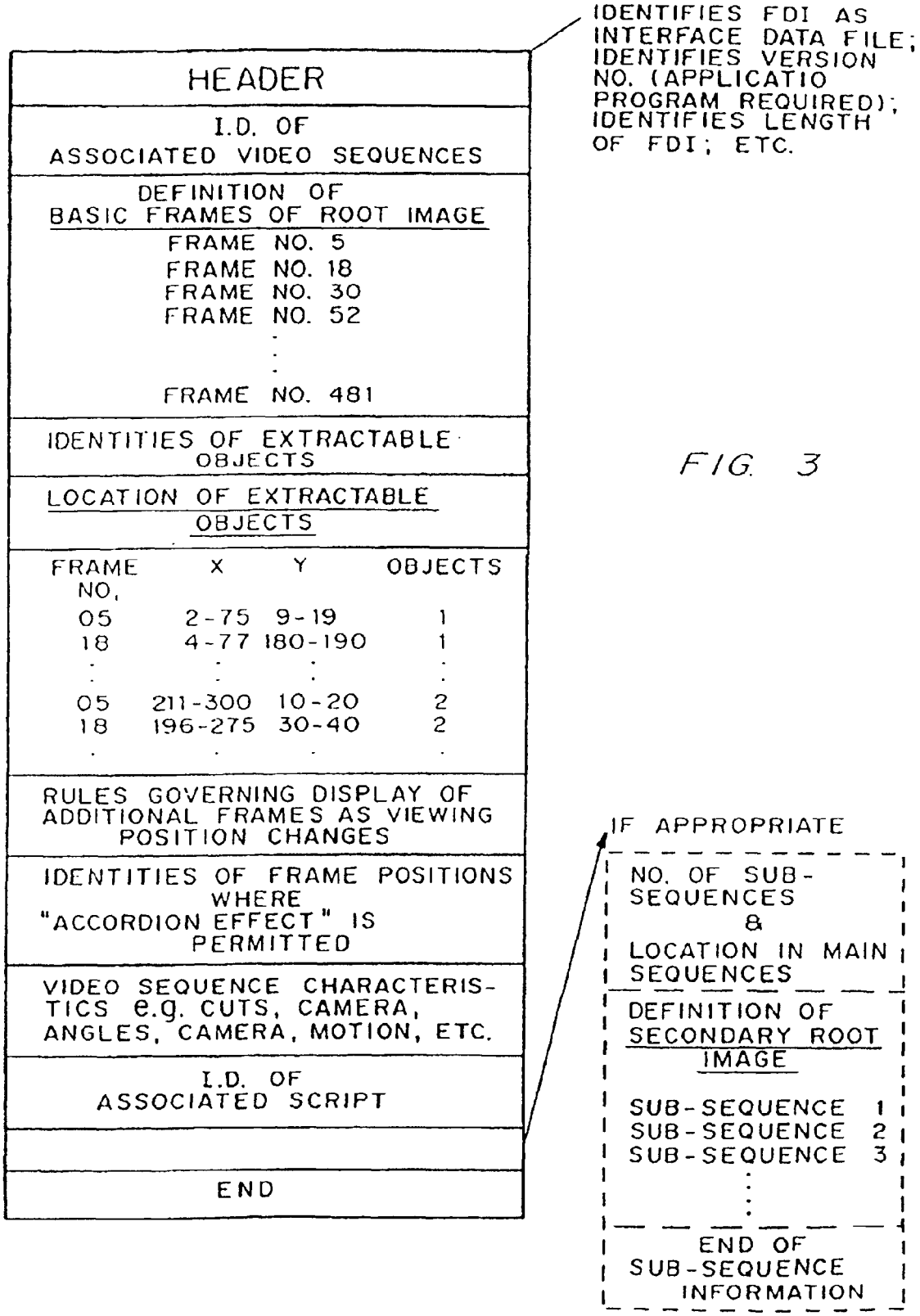
FIG. 3 is a diagram illustrating the content of the interface data file (FDI) used in the first embodiment of the invention.

According to the first embodiment of the invention, the CD-ROM has recorded thereon not only the video sequence image information 8 (in any convenient format), but also a respective interface data file ($FDI_i$) 10 for each video sequence, together with a video interface application program 11. The content of a typical data file is illustrated in FIG. 3. Respective scripts 12 are optionally associated with the interface data files. When data on the CD-ROM is to be read, the video interface application program 11 is operated by the central processor portion 2 of the computer system and the interface data file applicable to the video sequence selected by the user is processed in order to cause an interactive video icon (see, for example, FIGS. 4 and 5) to be displayed on the display screen 3. The user can then manipulate the displayed icon, by making use of the mouse or keyboard input devices, in order to explore the selected video sequence.

The types of manipulations of the interactive video icon which are available to the user will now be described with reference to FIGS. 4 to 9.

Figure 4:
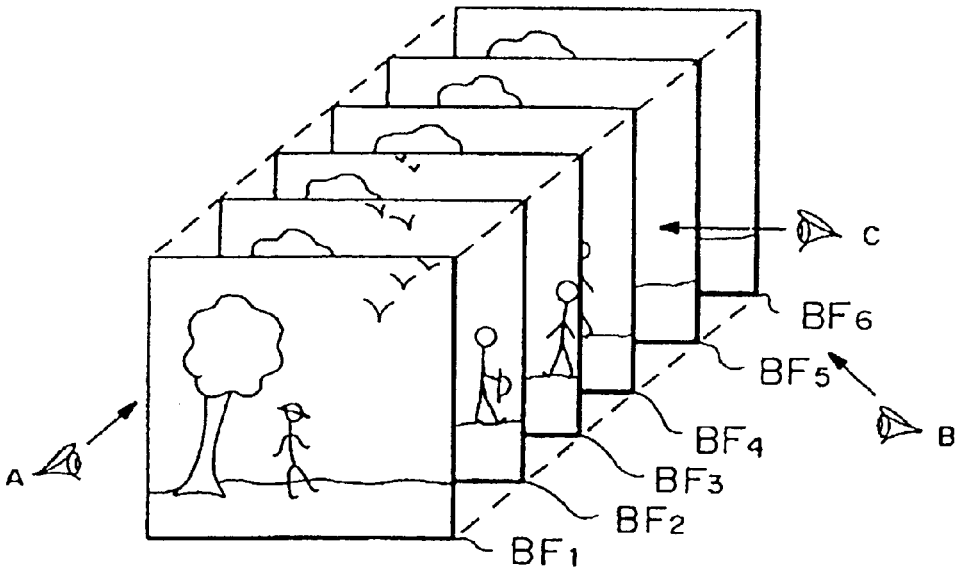
FIG. 4 is a diagram illustrating a reference view of a root image and three viewing, positions designated by a user.

FIG. 4 illustrates a simple interactive video icon according to the present invention. In particular, this video icon is represented on the display screen as a set of superposed images arranged within an envelope having the shape of a regular parallelepiped. Each of the superposed images corresponds to a video frame selected from the video sequence, but these frames are offset from one another. It may be considered that the displayed image corresponds to a cuboid viewed from a particular viewing position (above and to the right, in this example). This cuboid is a theoretical construct consisting of the set of selected video frames disposed such that their respective x and y axes correspond to the x and y axes of the cuboid and the z axis of the cuboid corresponds to the time axis. Thus, in the theoretical construct cuboid, the selected frames are spaced apart in the z direction in accordance with their respective time separations in the video sequence.

Figure 5A:
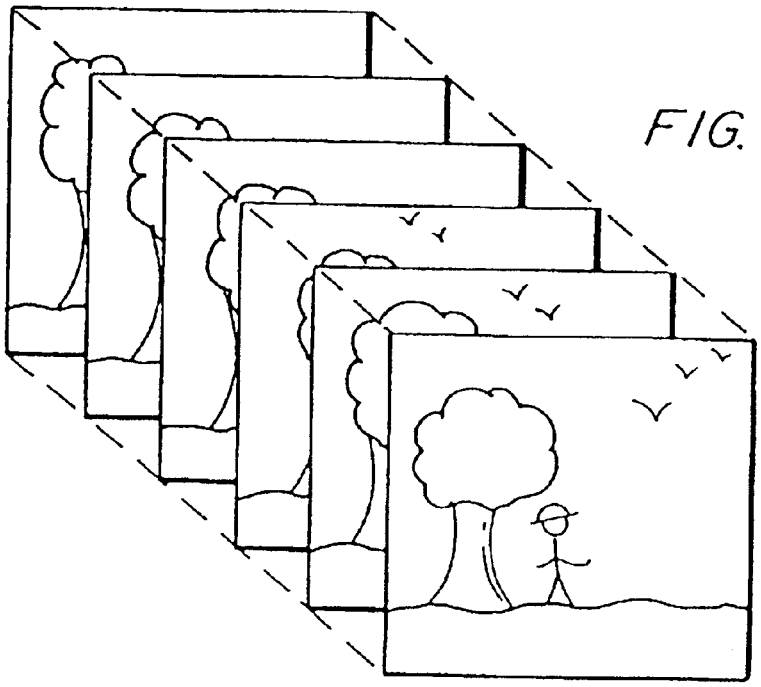
Figure 5B:
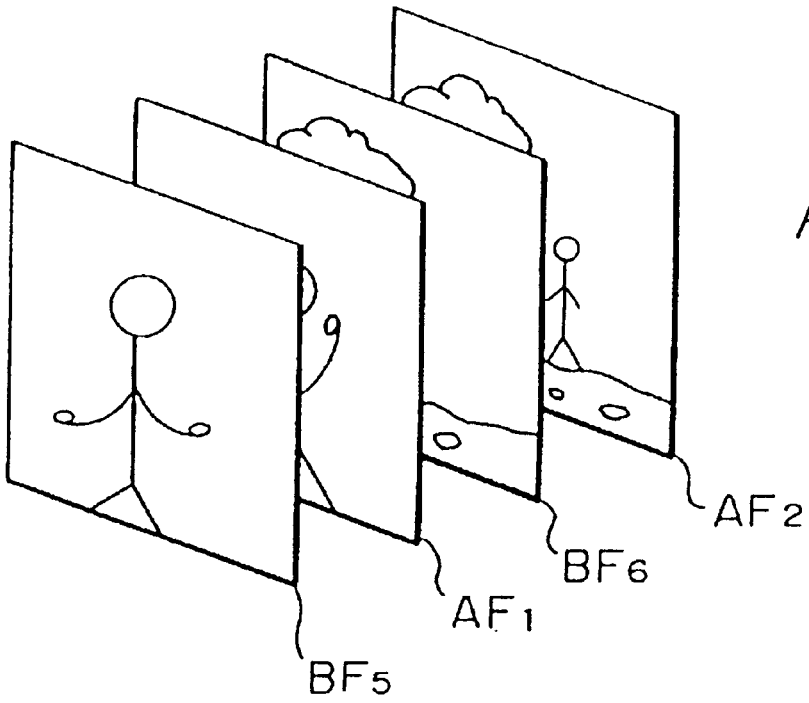
Figure 5C:
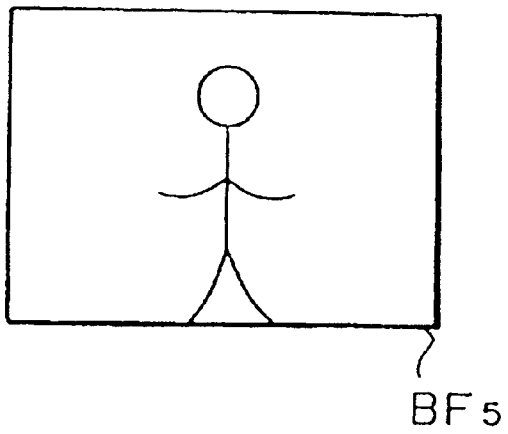
FIG. 5C represents the displayed image from viewing position C.

When the user seeks to explore the video sequence via the interactive video icon displayed on the display screen, one of the basic operations he can perform is to designate a position on the screen as a viewing position relative to the displayed image (e.g. by "clicking" with the computer mouse). In FIG. 4, three such designated viewing positions are indicated by the letters A, B and C. In response to this operation by the user, the displayed image is changed to the form shown in FIG. 5: FIGS. 5A, 5B and 5C correspond to "viewing positions" A, B and C, respectively, of FIG. 4. The image displayed to the user changes so as to provide a perspective view of the theoretical cuboid as seen from an angle corresponding to the viewing position designated by the user.

The above-mentioned cuboid is a special case of a "root image" according to the present invention. This "root image" is derived from the video sequence and conveys information concerning both the image content of the selected sub-set of frames (called below, "basic frames") and the relative "position" of that image information in time as well as space. It is to be appreciated that the "root image" is defined by information in the interface data file. The definition specifies which video frames are "basic frames" (for example, by storing the relevant frame numbers), as well as specifying the placement positions of the basic frames relative to one another within the root image.

The central processor portion 2 of the computer system calculates the image data required to generate the displayed image from the root image definition contained in the appropriate interface data file, image data of the basic frames (and, where required, additional frames) and the viewing position designated by the user, using, standard ray-tracing techniques. The data required to generated the displayed image is loaded into the video buffer and displayed on the display screen.

According to the present invention it is preferred that, when the user designates a viewing position close up to the interactive video icon, the image information in the area of interest should be enriched. This is achieved by including, in the displayed image, image data relating to additional video frames besides the basic video frames. Such a case is illustrated in FIG. 5B, where the basic frames BF5 and BF6 are displayed together with additional frames AF1 and AF2. As the user-designated viewing position approaches closer and closer to the displayed image the video interface application program causes closely spaced additional frames to be added to the displayed image. Ultimately, successive video frames of the video sequence may be included in the displayed image. As is clear from FIG. 5B, image information corresponding to parts of the root image distant from the area of interest may be omitted from the displayed "close-up" image.

Preferably, the interface data file includes data specifying how the choice should be made of additional frames to be added as the user "moves close up" to the displayed image. More preferably, this data defines rules governing the choice of how many, and which, additional frames should be used to enrich the displayed image as the designated viewing position changes. These rules can, for example, define a mathematical relationship between the number of displayed frames and the distance separating the designated viewing position and the displayed quasi-object. In preferred embodiments of the invention, the number of frames which are added to the display as the viewing position approaches the displayed quasi-object depends upon the amount of motion or change in the video sequence at that location.

The example illustrated in FIG. 4 is a simplification in which the displayed image corresponds to a root image having a simple, cuboid shape. However, according to the present invention, the root image may have a variety of different forms.

Figure 6A:
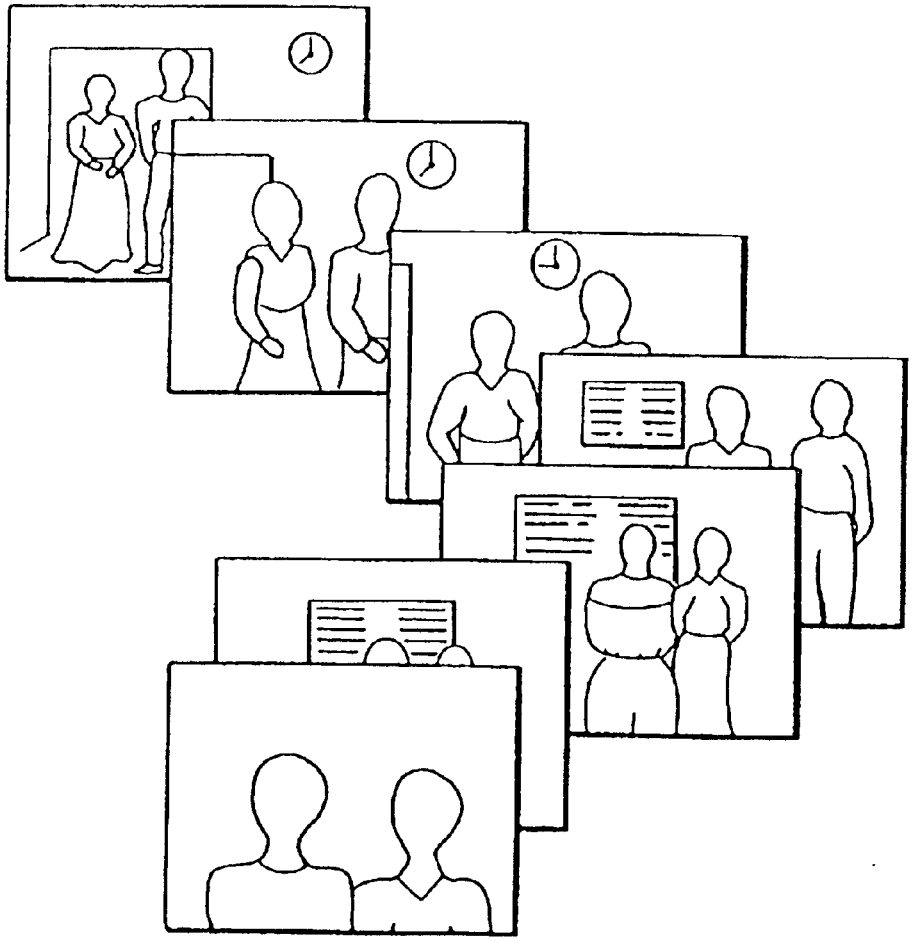
FIG. 6A is derived from a root image visually representing motion and FIG. 6B is derived from a root image visually representing a zoom effect.

For example, the relative placement positions of the basic frames may be selected such that the envelope of the root image has a shape which reflects motion in the corresponding video sequence (either camera motion, during tracking shots and the like, or motion of objects represented in the sequence)—see the corresponding interactive icon shown in FIG. 6A. Similarly, the dimensions of the basic frames in the root image may be scaled so as to visually represent a zoom effect occurring in the video sequence -see the corresponding interactive icon shown in FIG. 6B.

Figure 6B:
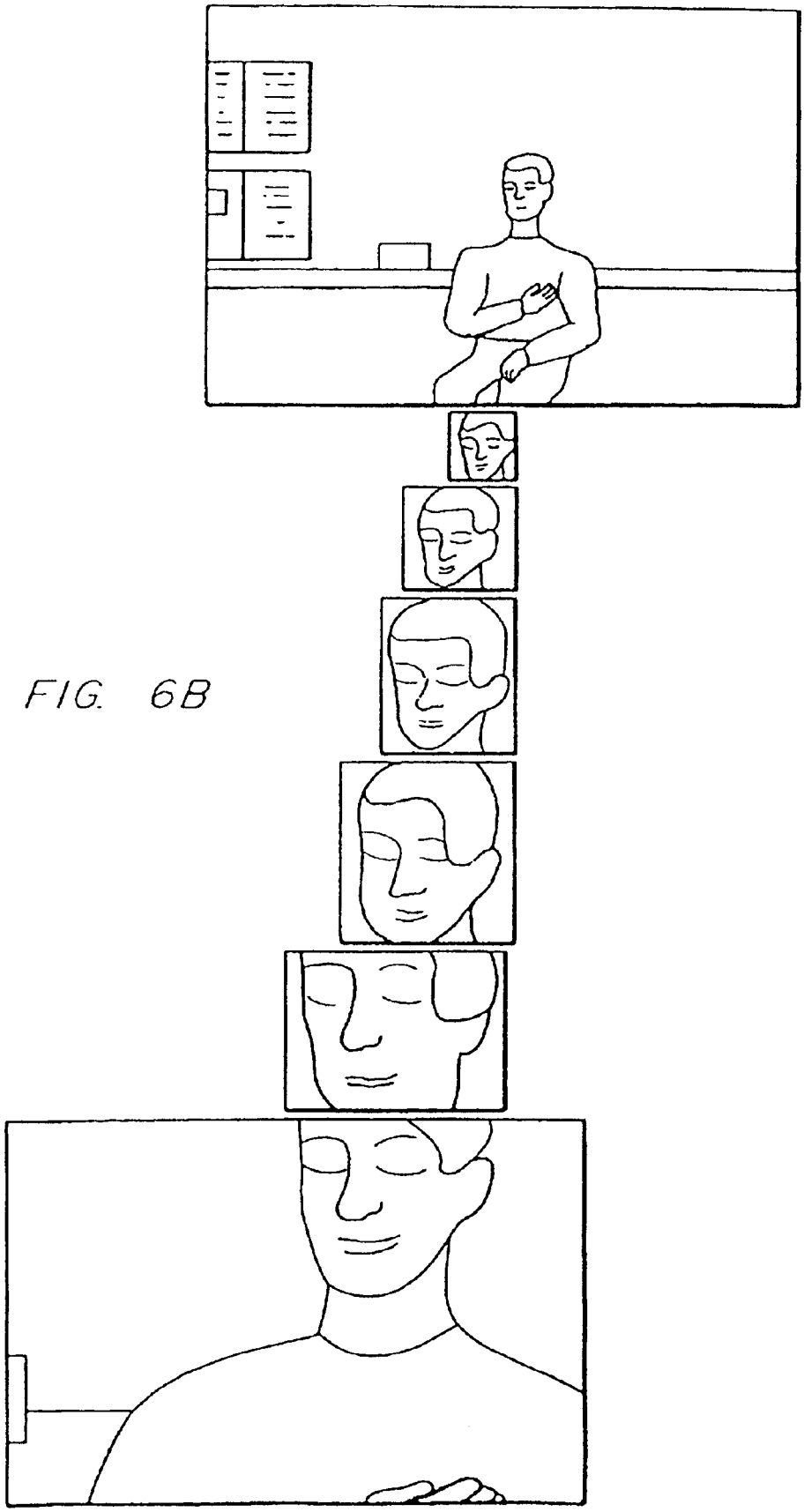

It will be seen that the interactive icon represented in FIG. 6B includes certain frames for which only a portion of the image information has been displayed. This corresponds to a case where an object of special interest has been selected. Such object selection can be made in various ways. If desired, the root image may be designed such that, instead of including basic frames in full, only those portions of frames which represent a particular object are included. This involves a choice being made, at the time of design of the root image portion of the interface, concerning which objects are interesting. The designer can alternatively or additionally decide that the root image will include basic frames in full but that certain objects represented in the video sequence are to be "selectable" or "extractable" at user request. This feature will now be discussed with reference to FIG. 7.

Figure 7A:
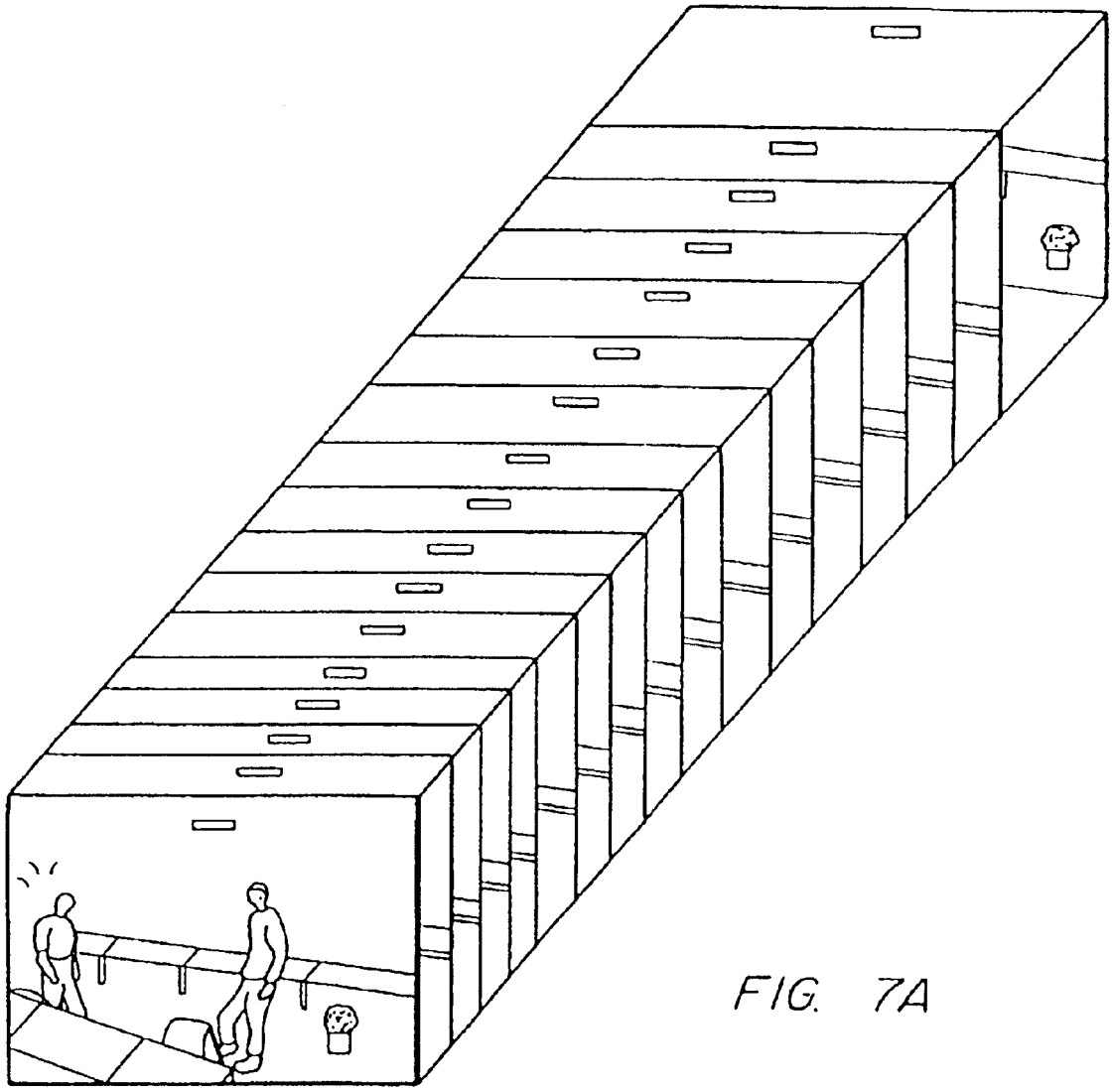
FIG. 7 illustrates the effect of user selection of an object represented in the displayed image, in a second embodiment of interface according to the present invention.

FIG. 7A illustrates an initial view presented to a user when he consults the interface for a particular selected video sequence. In this sequence two people walk towards each other and their paths cross. The designer of the interface has decided that the two people are objects that may be of interest to the end user. Accordingly, he has included, in the interface data file, information designating these objects as "extractable". This designation information may correspond to x, y co-ordinate range information identifying the position of the object in each video frame (or a subset of frames).

Figure 7B:
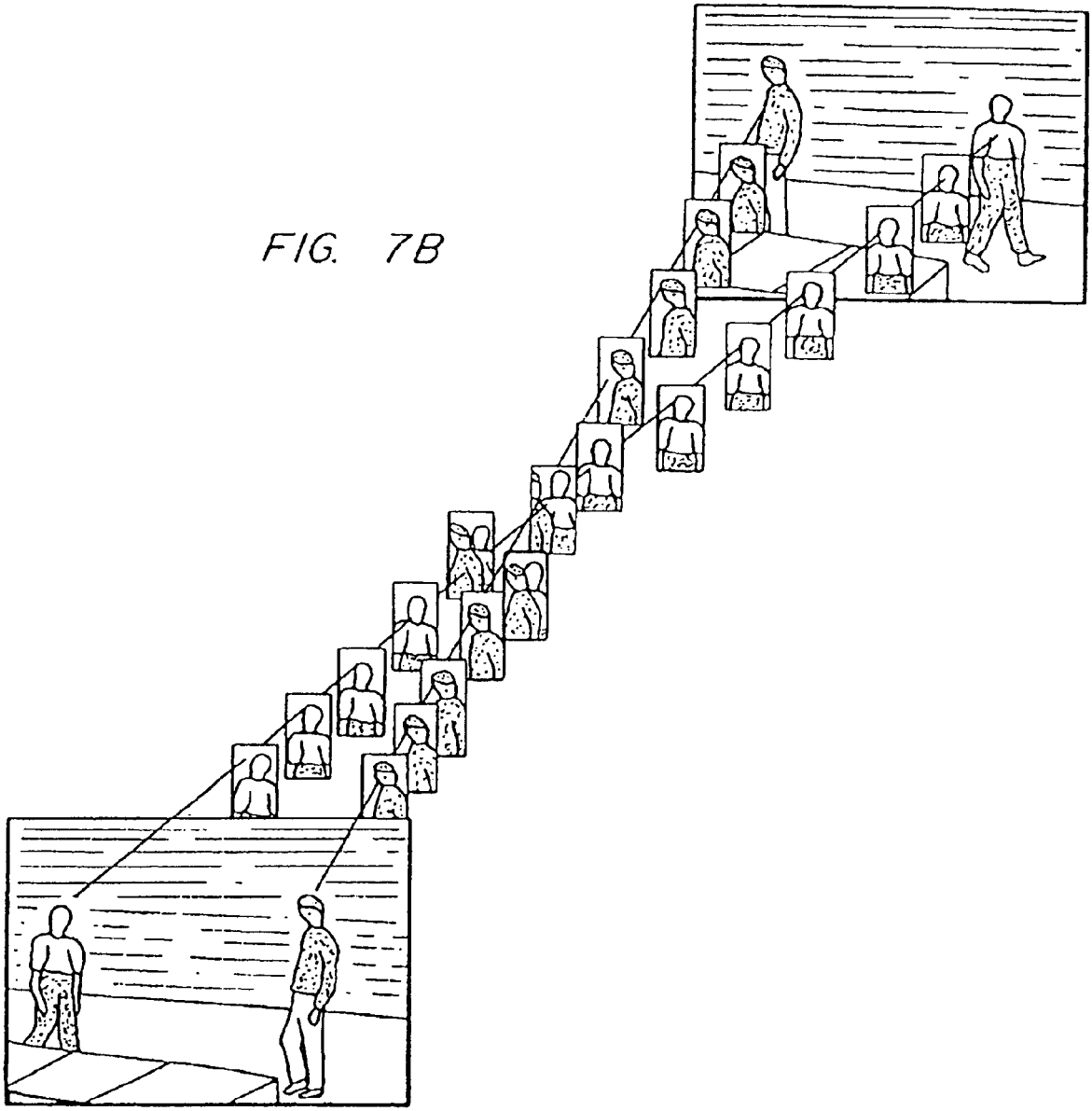

If the user expresses an interest in either of the two objects, for example, by designating a screen position corresponding to one of the objects (e.g. by "clicking" on the left-hand person using the right-hand mouse button), then the interface application program controls the displayed image such that extraneous portions of the displayed frames disappear from the display, leaving only a representation of the two people and their motion, as shown in FIG. 7B. Thus, the objects of interest are "extracted" from their surroundings. The "missing" or transparent portions of the displayed frames can be restored to the displayed image at the user's demand (e.g. by a further "click" of the mouse button).

It is to be understood that, according to the present invention, interfaces may be designed such that particular "extractable" objects may be extracted simultaneously with some or all of the other extractable objects, or they may be extracted individually. Sophisticated interfaces according to the present invention can incorporate object-extraction routines permitting the user to arbitrarily select objects visible in the displayed view of the root image, for extraction. Thus, for example, the user may use a pointing device to create a frame around an object visible in a displayed view of the root image and the application program then provides analysis routines permitting identification of the designated object in the other basic frames of the root image (and, if required, in additional frames) so as to cause display of that selected object as if it were located on transparent frames.

Figure 8:
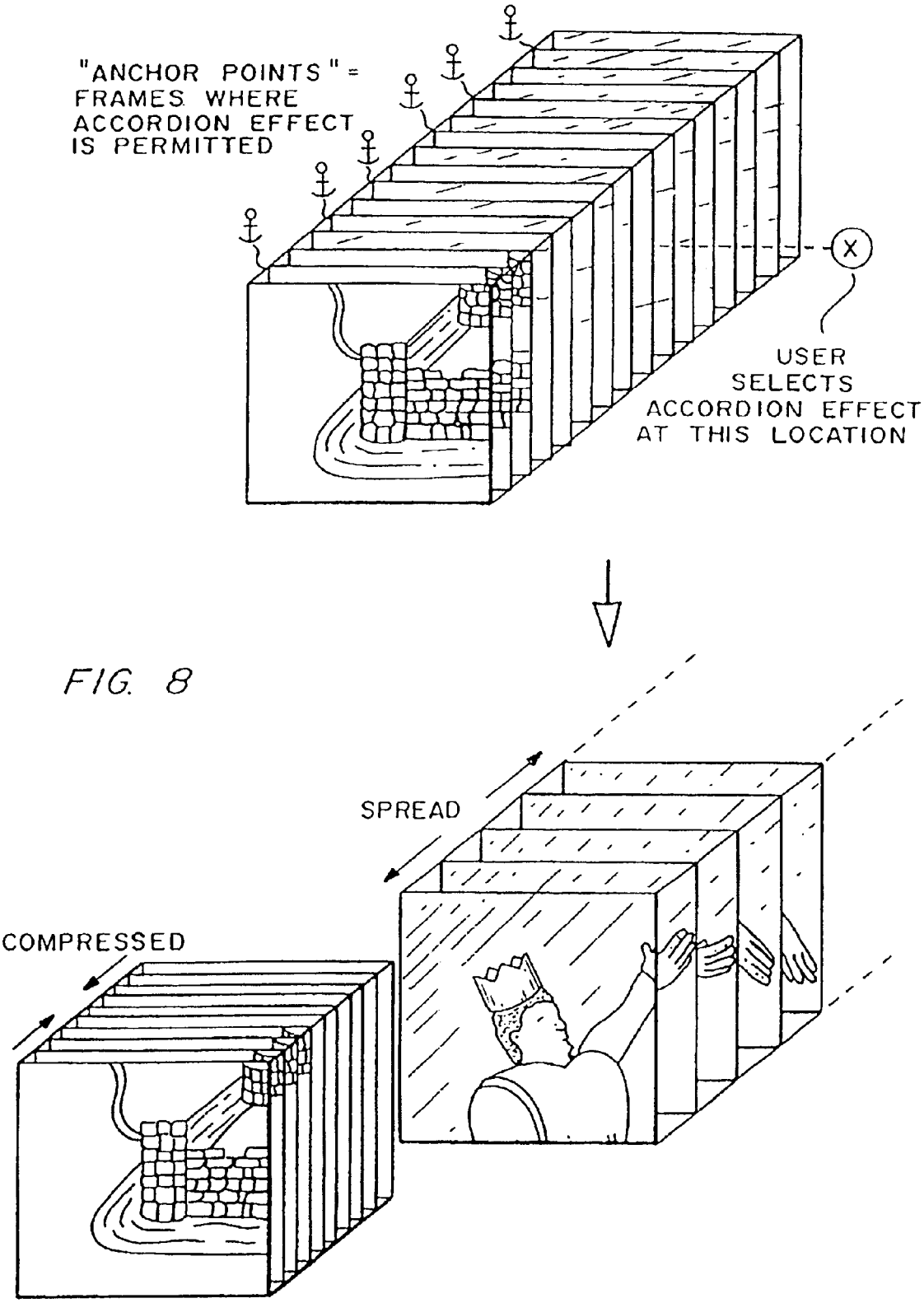
FIG. 8 illustrates a user manipulation of a root image to produce an "according effect"

It may be desirable to allow the user to obtain a close-up view of a particular portion of the interactive video icon in a manner which does not correspond to a strict perspective view of the reion concerned. Preferred embodiments of interface according to the invention thus provide a so-called "accordion" effect, as illustrated in FIG. 8. When the user manipulates the icon by an "accordion" effect at a particular point, the basic frames in the vicinity of the region of interest are spread so as to provide the user with a better view. Further, preferably, the function of displaying additional frames so as to increase detail is inhibited during the "accordion" effect.

Figure 9:
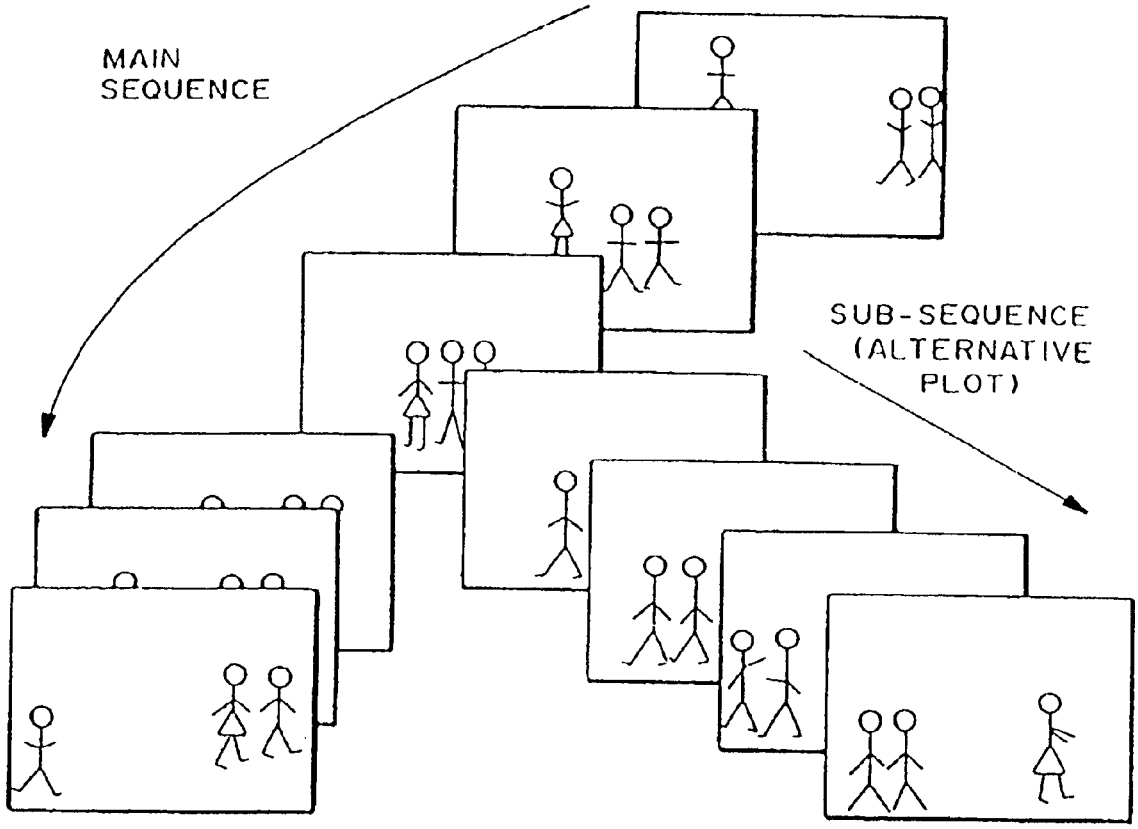
FIG. 9 illustrates a displayed image corresponding to a view of a branching root image associated with a multi-threaded scenario.

In the case of "multi-threaded" video sequences, such as are traditionally found in video-based computer games and educational software and involve parallel video subsequences which are accessed alternatively depending upon the user's choices, these too can be the subject of interfaces according to the present invention. In such a case, the interface designer may choose to include frames from different parallel video subsequences in the interface's root image in order to give the user an idea of the different plot strands available to him in the video sequence. FIG. 9 illustrates an interactive video icon derived from a simple example of such a root image.

Alternatively, or additionally, the designer may create secondary root images for the respective sub-sequences, these secondary root images being used to generate the displayed image only when the user designates a viewing position close to the video frame where the sub-sequence begins. In the case of interfaces to such computer games or educational software, this is a logical choice since it is at the point where the video sub-sequence branches from the main sequence that user choices during playing of the game, or using of the educational software, change the experienced scenario.

Another manipulation which it is preferable to include in interfaces according to the invention is the traditional set of displayed VCR controls which permit the user to playback the video sequence with which the displayed video icon is associated. Furthermore, the user can select for playback portions or frames within the sequence by, for example, "clicking" with the mouse button on the frames of interest as displayed in the interactive video icon. The video playback can take place on a separate display screen or on a window defined on the display screen displaying the video icon.

As mentioned above, a particular video sequence may be associated with an interface data file and a script. The script is a routine defined by the interface designer which leads the user through the use of the interface. The script can, for example, consist of a routine to cause an automatic demonstration of the different manipulations possible of the displayed quasi-object. The user can alter the running of the script in the usual way, for example by pausing it, slowing it down, etc.

The script may, if desired, include additional text, sound or graphic information which can be reproduced in association with the displayed view of the root image either automatically or in response to operations performed by the end user. Script functionality according to the present invention allows creation and editing of viewing scenarios that may be subsequently be played, in part or in whole, automatically, or interactively with user inputs. For example, in a completely automatic mode, the user can cause the scenario to begin to play by itself and take the user through the scenario and any associated information by simply reading the scenario and changing the view. In other situations the script may call for interaction by the user, such as to initiate a transaction. In this case the user may be asked to specify information, e.g. if he wants to purchase the video or any other items associated with what has been viewed. In yet other situations the editor may leave visible tags which when activated by the user will cause some information to be displayed on the display device; e.g. associated text, graphics, video, or sound files which are played through the speakers of the display device. In certain cases these tags are attached to objects selected and extracted from the video sequence, such as so-called "hot objects" according to the present invention.

Figure 10:
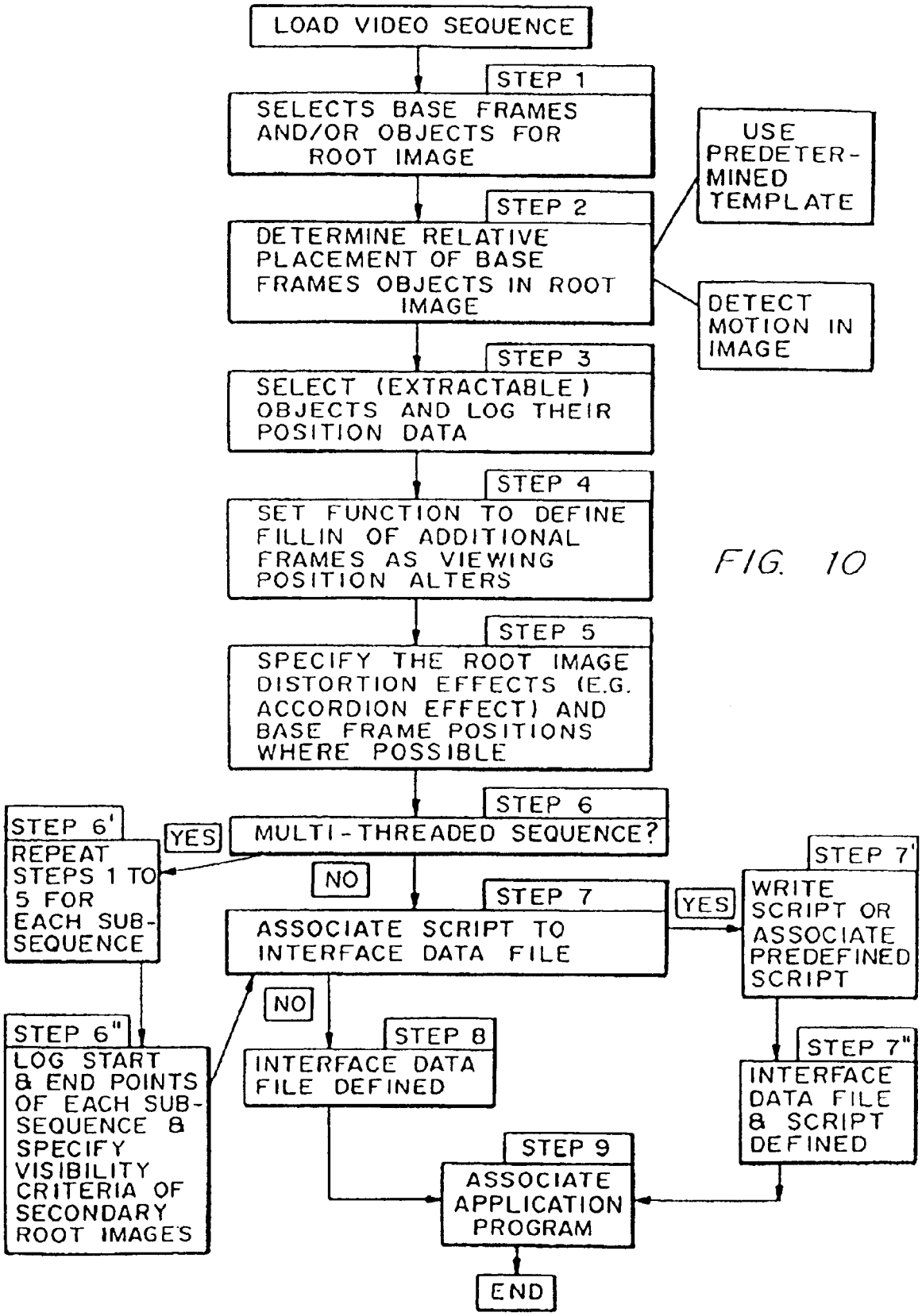
FIG. 10 is a flow diagram indicating steps in a preferred process of designing an interface according to the present invention.

FIG. 10 is a flow diagram illustrating typical stages in the design of an interface according to the present invention, in the case where a designer is involved. It is to be understood that interfaces according to the present invention can also be generated entirely automatically. It will be noted that the designer's choices affect, notably, the content of the interface data file. It is to be understood, also, that not all of the steps illustrated in FIG. 10 are necessarily required—for example, steps concerning creation of secondary root images can be omitted in the case of a video sequence which is not multithreaded. Similarly, it may be desirable to include in the interface design process certain supplementary steps which are not shown in FIG. 10. Thus, for example, it is often desirable to include in the interface data file (as indicated in the example of FIG. 3) information regarding the camera motion, cuts, etc. present in the video sequence. During use of the interface, this information can permit, for example, additional video frames to be added to the displayed image and positioned so as to provide a visual representation of the camera motion. During the interface design process the information on the characteristics of the video sequence can be determined either automatically (using, known cut-detection techniques and the like) and/or may be specified by the interface designer. It may also be desirable to include in the interface data file information which allows the sequence, or scripting for it, to be indexed and retrieved. Preferably, the interface or sequence is accessed using such information applied according to a traditional method, such as standard database query language or through a browser via a channel or network; the interface data may be downloaded in its entirety or fetched on an as needed basis.

The present invention provides toolkitd for use by designers wishing to create an interactive video interface according to the present invention. These toolkits are preferably implemented as a computer program for running on a general purpose computer. The toolkits present the designer with displayed menus and instructions to lead him through a process including steps such as the typical sequence illustrated in FIG. 10.

The designer first of all indicates for which video sequence he desires to create an interface, for example by typing in the name of a stored file containing the video sequence information. Preferably, the toolkit accesses this video sequence information for display in a window on the screen for consultation by the designer during the interface design process. In such preferred embodiments of the toolkit, the designer may make his selection of basic frames/objects for the root image, extractable objects and the like by stepping slowly through the video sequence and, for example, using a mouse to place a cursor on frames or portions of frames which are of interest. The toolkit logs the frame number (and x, y locations of regions in a frame, where appropriate) of the frames/frame portions indicated by the designer and associates this positional information with the appropriate parameter being defined. Preferably, at the end of the interface design process the designer is presented with a displayed view of the root image for manipulation so that he may determine whether any changes to the interface data file are required.

Different versions of the application program can be associated with the interface data file (and script, if present) depending upon the interface functions which are to be supported. Thus, if no script is associated with the interface data file, the application program does not require routines handling the running of scripts. Similarly, if the interface data file does not permit an accordion effect to be performed by the end user then the application program does not need to include routines required for calculating display information for such effects. If the interface designer believes that the end user is likely already to have an application program suitable for running interfaces according to the present invention then he may choose not to package an application program with the interface data file or else to associate with the interface data file merely information which identifies a suitable version of application program for running this particular interface.

The present invention has been described above in connection with video sequences stored on CD-ROM. It is to be understood that the present invention can be realized in numerous other applications. The content of the interface data file and the elements of the interface which are present at the same location as the end user can vary depending upon the application.

For example, in an application where a video sequence is provided at a web-site, the user may first download via his telecommunications connection just the interface data file applicable to the sequence. If the user does not already have software suitable for handling manipulation of the interactive video icon then he will also download the corresponding application program. As the user manipulates the interactive video icon, any extra image information that he may require which has not already been downloaded can be downloaded in a dynamic fashion as required.

This process can be audited according to the present invention if desired. The user's interaction with the interface can be audited, and he can interact with the transaction/audit functionality for example to supply any information required by a script which may then be recorded and stored. Depending upon the application, the transaction/audit information can be stored and made available for externally (optional)

located auditing and transaction processing facilities/applications. In a typical situation, the auditing information can be transmitted at the end of a session whereas the transaction information may be performed on-line, i.e. the transaction information is submitted during the session. Real time transmission can also occur according to the present invention, however.

Another example is the case of a catalogue on CD-ROM including only interfaces rather than the associated video sequences, in order to save space. In such a case, rather than including a pointer to the image information of the basic frames of the root image, the interface data frame includes the image information. Some additional image information may also be provided.

Figure 11:
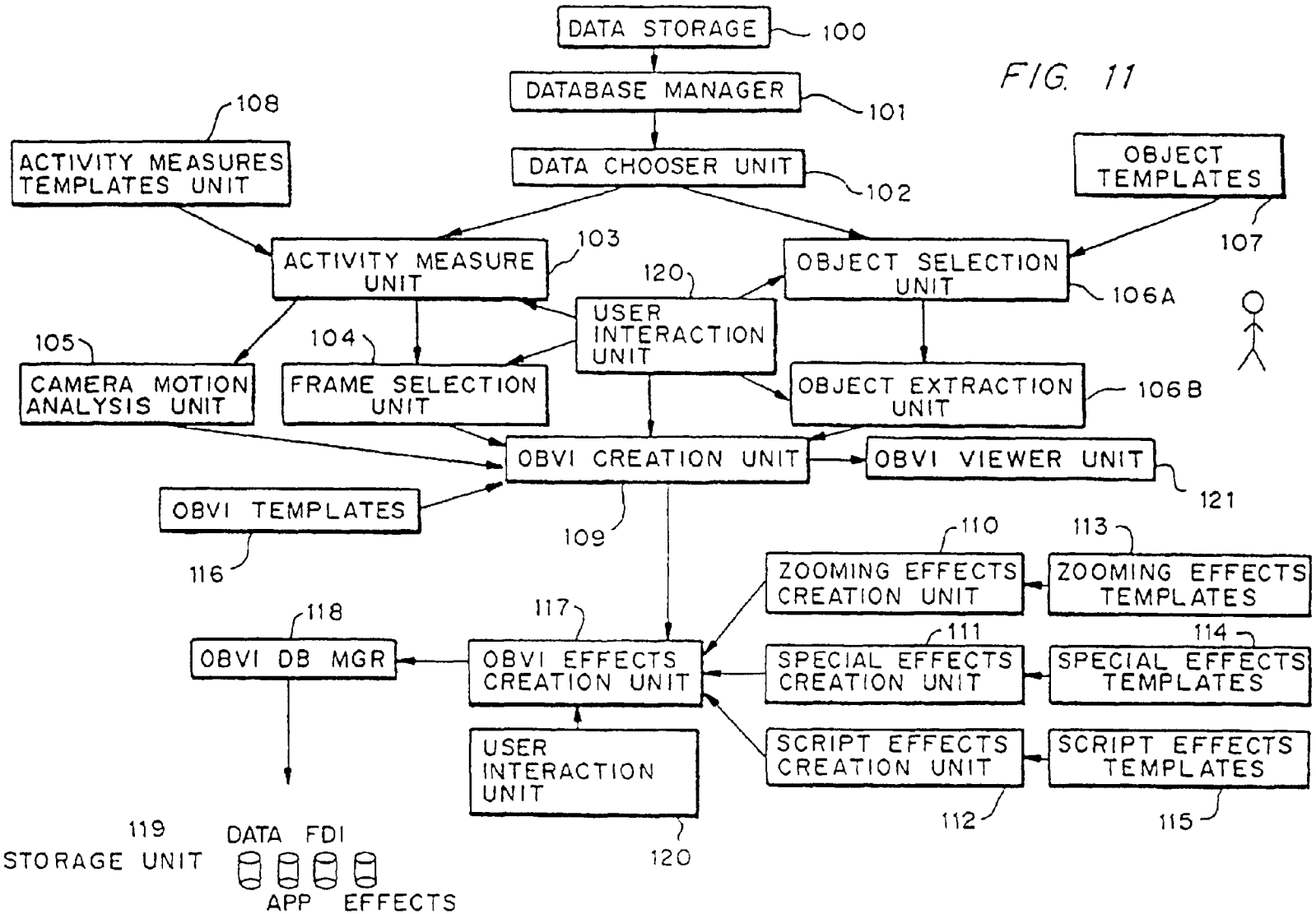
FIG. 11 is a schematic representation of a preferred embodiment of an interface editor unit according to the present invention.
Figure 12:
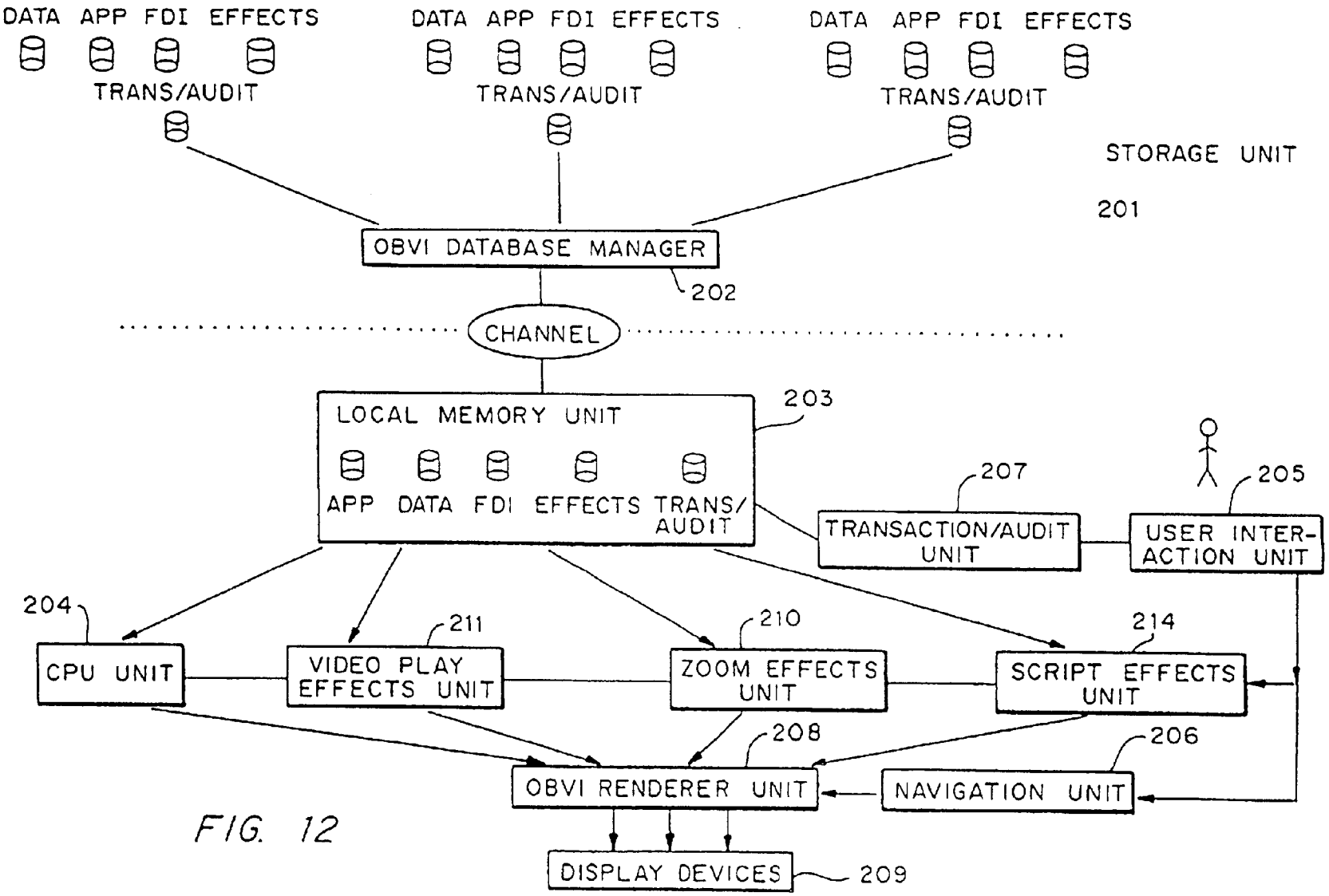
FIG. 12 is a schematic representation of a preferred embodiment of an interface viewer according to the present invention.

The following disclosure relates to a preferred implementation according to the present invention, with reference to FIGS. 11 and 12.

A. Interface Editor Unit

Editors, readers and viewers according to the present invention can be implemented in hardware, hardware/software hybrid, or as software on a dedicated platform, a workstation, a personal computer, or any other hardware. Different units implemented in software run on a CPU or graphics boards or other conventional hardware in a conventional manner, and the various storage devices can be general purpose computer storage devices such as magnetic disks, CD-ROMs, DVD, etc.

With reference to FIG. 11, the editor connects to a database manager (101) and selects a video document and any other documents to be included in the interface by using a data chooser unit (102). The database manager may be implemented in various ways; e.g., as a simple file structure or even as a complete multimedia database. The data storage (100) contains the video data and any other information/documents required and can be implemented in various modes; e.g., in a simple stand-alone mode of operation it could be a CD-ROM or in a networked application it could be implemented as a bank of video servers. Typically the user operating through the user interaction unit (120) is first presented a list of available videos or uses a standard database query language to choose the desired video and then chooses any other documents required.

The creation of an interface using the editor is discussed below in three phases: (1) Analysis, (2) Visual layout and (3) Effects creation.

1. Analysis.

The video document chosen by the editor is first processed by the activity measure unit (103). The activity measure unit is responsible for computing various parameters related to the motion and changes in the video. This unit typically will implement one of a number of known techniques for measuring changes, e.g., by calculating the statistics of the differences between frames, by tracking objects in motion, or by estimating camera motions by separating foreground and background portions of the image. In other implementations this unit may use motion vector information stored in an MPEG-encoded sequence to detect important frames of activity in the video document. The activity measures template store is optional but would contain templates which can be used to calculate the frame ranking measure and could be specified by the user through the user interaction unit.

These parameters are then used to calculate a frame ranking measure which ranks the different frames as to whether they should be included in the interface. The frame ranking measure is derived heuristically from these measures [e.g., by normalizing the values and taking an average of the parameters, and can be tailored for different kinds of sequences (traveling shots, single objects in motion, etc) or applications]. The editor may choose a pre-defined set of parameters from the activity measures template store (108) to detect or highlight a specific kind of activity (rapid motion, abrupt changes, accelerations, etc.)

The frame ranking measures can be employed by the user acting through the user interaction unit on the frame selection unit (104) to select the frames to be included within the interface. For example, if 10 frames are to be included in the interface then in default mode the 10 frames corresponding to the 10 largest frame making measures are selected for inclusion in the interface. The user can then interactively de-select some of these frames and add other frames.

Figure 1A:
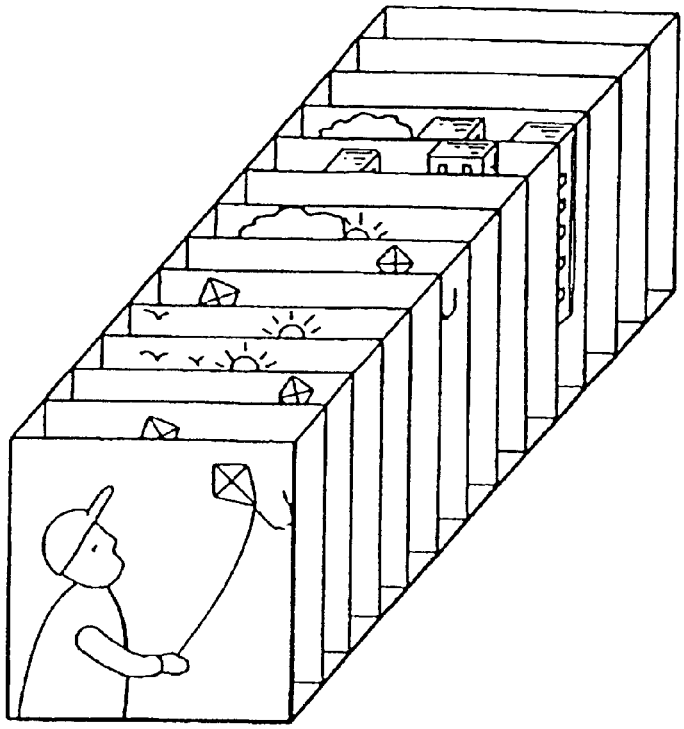
FIG. 1A shows an ordinary video icon.
Figure 1B:
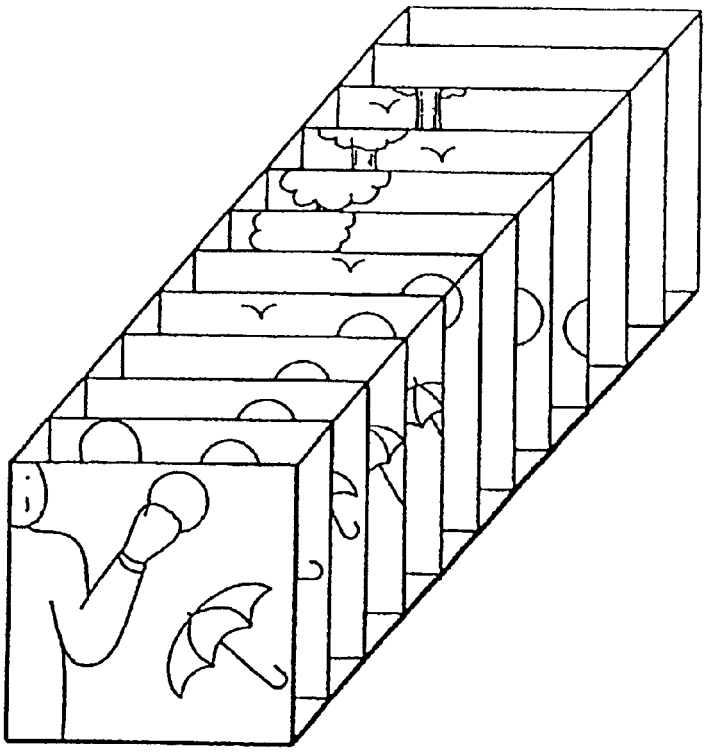
FIG. 1B shows an object-based video icon and FIG. 1C shows a video icon including a representation of camera motion.
Figure 1C:
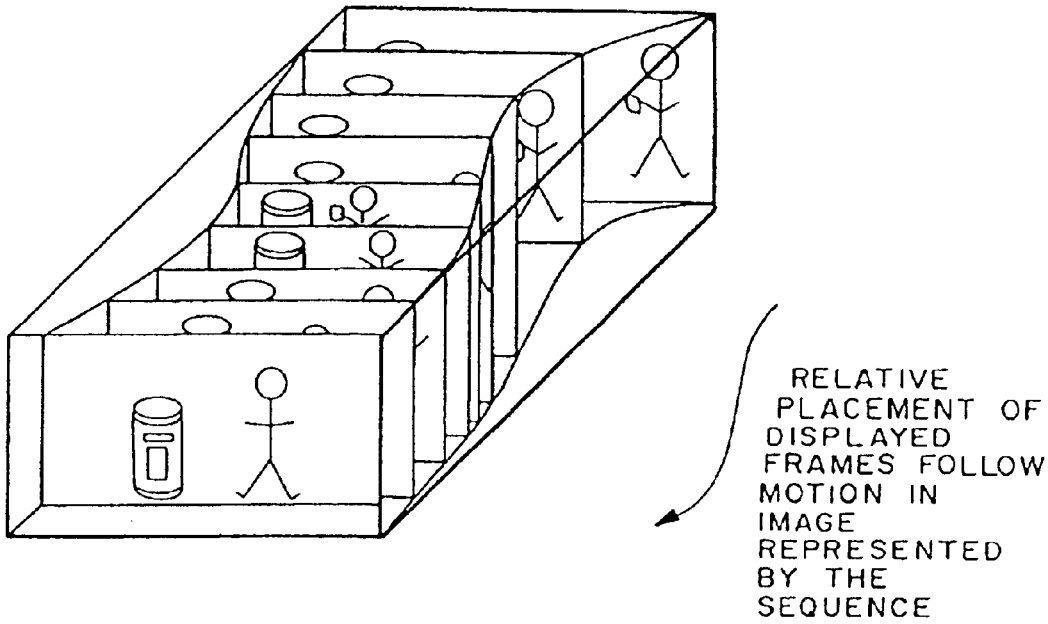

The camera motion analysis unit (105) is an optional unit which typically will implement one of a number of known techniques for measuring camera motion parameters. This information can be used to determine what shape to give to the outer envelope of the interface as shown in FIG. 1C; a default shape, stored in the interface template store (116) can be chosen. This information may be optionally stored in the FDI file.

The object selection unit (106A) is responsible for selecting or detecting individual objects in the video document. There are various modes possible: in a completely manual mode the editor may visually select and outline an object of interest in a given frame through the user interaction unit (120); in a semi-manual mode, the editor simply points at an object and chooses from the object templates store (107) features and associated algorithms to use for extracting and tracking the chosen object; in another mode the editor may chose one of a set of pre-defined templates of objects and known pattern matching techniques are used to detect whether any objects of interest are preset. The user may even assign a name/identifier to the object and add the object to the object templates store (107). In this latter case searches for multiple occurrences of the same object can be initiated by the user. The information regarding the properties of the object may be optionally stored in the FDI file.

The object extraction and tracking unit (106B) is now responsible for extracting the object of interest from the frame and then tracking it by using known tracking algorithms. The algorithms used are either chosen by the user or by default. It is understood that the object selecting, detection, extraction, and tracking process may be highly interactive and that the user may be called upon or choose to intervene in the process a number of times. The information about the presence and location of objects may be optionally stored in the FDI file.

In certain applications the FDI file can be made available to an external program, for example when the interface editor is associated with an indexing program, the task of which is to attach indexes (identifiers) to the video documents, to portions thereof, or to objects located within the video document.

2. Visual Layout.

The user acting through the user interaction unit (120) on the interface creation unit (109) determines the visual layout of the interface.

He can shape the outer envelope of the interface in any way that he desires; two examples are provided in FIGS. 6 and 9; in particular, multiple sequences can be concentrated and so implement branching effects representing alternatives to the user. Default shapes are stored in the interface template store (116). The user can also choose to vary the spacing of the frames seen on the interface; that is the distance between frames of the interface as perceived on the display unit. The user can also insert selections of the extracted and tracked objects from unit (106B) as illustrated in FIG. 7B. In this case, the corresponding frames are rendered transparent except at the locations of the objects.

The different pieces of information generated by the units described above are gathered together by the interface creation unit (109) into an FDI file containing a description of the interface in terms of its layout i.e. shape and structure, the image frame numbers and their positions, and if available, the extracted features the ranking of the frames and the camera motion information. This information is transmitted to the interface effects creation unit (117).

3. Effects Creation.

The editor can also specify three classes of interface features which serve to convey additional information to the user and which allow the user to interact with the interface. The editor performs this specification through the interface effects creation unit (117).

The zooming effects creation unit (110) is used by the editor to specify which frames will be made visible, and also which will be rendered invisible to the user when he moves up closer to the interface (FIG. 5B) so as to view it from a new viewing position. The choice of frames to add depends upon factors such as, the distance of the viewing point from the interface, the degree of motion, the degree of scene change, the number of frames that can be made visible and optionally the frame ranking measures calculated by the activity measure unit (103). The editor can choose to use one or more of the default zooming effect templates contained in the zooming effect templates store (113) and assign these in a differential manner to different parts of the interface; alternatively the editor can choose to modify these templates and apply them differentially to the interface.

The special effects creation unit (111) is used by the editor to create special visual effects on the interface. One such example is the accordion effect illustrated in FIG. 8 where parts of the interface are compressed and other parts are expanded. Another example is illustrated in FIG. 7A and 7B where the editor has designated an extractable object and which is then shown in its extracted form; in other words, the background is removed. The editor creates the scripts by calling up templates from the specific effects templates store (114) and instantiating them by defining the positions where the special effect is to take place and by setting the appropriate parameters.

The script effects creation unit (113) allows the editor of the interface to build an interface viewing scenario that may be subsequently be played, in part or in whole, automatically, or interactively with user inputs. For example, in a completely automatic mode when the user calls up the interface it begins to play by itself and takes the user through the interface and any associated information by simply reading the scenario and changing the view of the interface. In other situations the script may call for the user to interact with the interface, e.g. to initiate a transaction. In this case the user may be asked to specify information, e.g. if he wants to purchase the video or any other items associated with the interface. In yet other situations the editor may leave visible tags which when activated by the user will cause some information to be displayed on the display device; e.g. associated text, graphics, video, or sound files which are played through the speakers of the display device. In certain cases these tags are attached to objects selected and extracted from the video sequence by units 6A and 6B and become so-called "hot object." The editor creates the scripts by calling up templates from the script effects templates store (115) and instantiating them by defining the tag and the locations of the information to be called up.

The interface effects creation unit (117) creates 4 files which are passed to the interface database manager (118) which will store these files either remotely or locally as the case may be: (1) The FDI file, completed by the special effect and script tags, text and graphics which have been added to the interface and which are directly visible to the user. (2) The zoom effect details, scripts and special effects. (3) The application programs (optional) to view the interface; i.e., allow the user to view the interface from different perspectives, traverse the interface, run the script, perform the special effects, or coded information which indicate which application program residing on the users machine can be used to perform these operations. (4) The video sequence and any other associated information (data) required for reading the interface.

These files are shown stored in storage unit (119) but depending upon the embodiment they may be physically located in the same storage device, in separate storage devices (as shown) either locally (as shown) or remotely.

During the editing process, the user/editor can view the interface under construction, according to the current set of parameters, templates and designer preferences, on the interface viewer unit (121) (presented in FIG. 12 and described below), thus allowing the editor to interactively change its appearance and features.

B. Interface Viewer Unit

Having chosen an interface through a traditional method, for example by using a database query language or by using a browser such as are used for viewing data on the Web, the interface viewer unit is then employed to read and interact with the interface.

In a typical application the storage units (201) are remotely located and accessed through the interface database manager (202) by way of a communication channel or network; depending upon the size and characteristics of the channel and the application the interface data may be loaded in its entirety or fetched on a as need basis.

The data are then stored in a local memory unit (203) which may be either a cache memory, a disk store or any other writable storage element. The local memory unit (203) stores the 4 files created by the editor (see above) and in addition a transaction/audit file. In certain cases the applications programs are already resident in the interface viewer unit and so do not need to be transmitted.

The CPU unit (204) fetches the application program, deduces which actions need to be performed, and then fetches the relevant interface information contained in the local memory unit (203). Typically the CPU unit fetches the required application program for the user interaction unit (205), the navigation unit (206), and the transaction/audit unit (207), then interface information is read from the local memory unit (203) passed to the interface renderer unit (208) which then calculates how the interface is to appear or be rendered for viewing on the display device (209).

The user interacts with the interface through the user interaction unit (205) to the navigation unit (206) and all his actions are audited by the transaction/audit unit (207). In addition, the user can interact with the transaction/audit unit (207) for example to supply any information required by the script which is then recorded and stored in the transaction/audit portion of the local memory unit (203). Depending upon the application, this transaction/audit file or a portion thereof is transmitted by the interface database manager to the appropriate storage unit (201). This information is then available for externally (optional) located auditing and transaction processing facilities/applications. In a typical situation, the auditing information is transmitted at the end of the session whereas the transaction information may be performed on-line, i.e. the transaction information is submitted during the session.

Through the navigation unit (206) the user can choose the point of view from which to view the interface (or a portion of the interface). The interface rendered unit (208) then calculates how the interface is to appear or be rendered for viewing on the display device (209).

If the user chooses to zoom in or zoom out, then the zoom effects unit (210) fetches the required application program, reads the zoom effect parameters stored in the local memory store (203), determines the frames to be dropped or added and supplies this information (including the additional frames if needed) to interface renderer unit (208) which then calculates how the interface is to appear or be rendered for viewing on the display device (209).

If the user chooses to view part of the underlying video then the video play effects unit (211), fetches the required application program, then reads the required video data from the local memory unit (203) and plays the video on a second display device (209) or in a new window if only one display device is available.

If the user chooses to interact with a hot pre-extracted object (created by the special effects unit), then the special effects unit (212), fetches the required application program, reads the locations of the object and the corresponding frames are modified so as to be transparent wherever the objects do not occur; the new frames are passed to interface renderer unit (208) which then calculates how the interface is to appear or be rendered for viewing on the display device (209). In cases where the extracted object is to be played as a video the frames are passed to the video effects unit (211) which then plays the video on a second display device (209) or in a new window if only one display device is available. Similarly if the user chooses to view an accordion effect then the special effects unit fetches the accordion effect store (203), determines the frames to be dropped or added and calculates parameters stored in the local memory the relative position of all the frames and supplies this information (including the additional frames if needed) to interface renderer unit (208) which then calculates how the interface is to appear or be rendered for viewing on the display device (209).

If the user designates a tag created by the script then the script effects unit (214) fetches the required application program, reads the corresponding portion of the script and the related information required to carry out the portion of the script associated with the tag designated. If the interface is to be played in automatic mode then the script effects unit (214) fetches the entire script and all the related information required to carry out the script. When needed the zoom effects unit (210), the video play unit (211), and the special effects unit (212) may be called into play. If the script calls for user input such as required for carrying out a transaction, then a new window may be opened on the display device (or on a second display device) where the information is supplied and transmitted to the transaction/audit unit (207). In semi-automatic mode control of the viewing of the interface is passed between the script effects unit (214) and the navigation as instructed by the user through the user interaction unit (205).

Although the above-discussed preferred embodiments of the present invention present certain combinations of features, it is to be understood that the present invention is not limited to the details of these particular examples. Firstly, since image processing is performed on image data in digital form, it is to be understood that in the case where the video sequence consists of data in analogue form, an analogue-to digital converter or the like will be used in order to provide image data in a form suitable for processing. It is to be understood that the present invention can be used to create interfaces to video sequences where the video data is in compressed form, encrypted, etc. Secondly, references above to user input or user selection processes cover the use of any input device whatsoever operable by the user including, but not limited to, a keyboard, a mouse (or other pointing, device), a touch screen or panel, glove input devices, detectors of eye movements, voice actuated devices, etc. Thirdly, references above to "displays" cover the use of numerous different devices such as, but not limited to, conventional monitor screens, liquid crystal displays, etc.

Furthermore, for ease of comprehension the above discussion describes interfaces according to the present invention in which the respective root images each have a single characteristic feature, such as, giving a visual representation of motion, or giving a visual representation of zoom, or having a multi-threaded structure, etc. It is to be understood that a single root image can combine several of these features, as desired. Similarly, special effects such as object extraction, the accordion effect, etc. have been described separately. Again, it is to be understood that interfaces according to the invention can be designed to permit any desired combination of special effects.

II. Global Topology

1 Glossary and Concepts

ODA

Obvious Database Annotation

An OBVI can handle several types of annotations. One of them involves external databases. An ODA is an annotation formatted as a database template, i.e. a list of fields. Each field has a type definition (integer, string, date, etc.). The content of the fields are stored in the OBVI file and can be exported or imported to/from a remote database via ODBC. This export/import functionality is handled by third-party plugins. Obvious Technology provides a sample ODBC export/import plugin.

OSF

Obvious Streaming Format

The OVI file format is suitable for desktop editing and most distribution schemes. However, for stream-based distribution schemes, an alternative format is available. It is called Obvious Streaming Format. OBVIs stored in this format can be efficiently streamed on various network types and under different protocols.

Obvious Site

An Obvious Site (or site) is a logical group of services that manage a set of OBVIs with the same security policy. Several Obvious Sites can share the same physical resources. For example, Obvious Technology will be able to host several sites on the same set of machines. These sites will have different identifiers and will not interfere.

Portal

Synonym for Obvious Site

OSM

Obvious Site Manager. Proposed new name for the Obvious Media Router.

The Obvious Site Manager is the main server in a site. It constitute the entry- point of a site and manages all others servers.

OAS

Obvious Administration Server.

The Obvious Administration Server is located between administration tools and the OIS database. Administration tools never talk directly to the OIS database. They send requests to the OAS.

OAM

Obvious Asset Manager.

The Obvious Asset Manager is a server that acts as a repository for archiving media files. It also hosts the VAMT, the video analysis engine.

OSD

Obvious Site Directory.

The Obvious Site Directory is a global directory service that handles the list of all sites. It is hosted by Obvious Technology. An OVI file doesn't contain the address of the site to which it relies. It contains a Site Identifier. The mapping between Site Identifiers and IP addresses is done by using the services of the OSD.

OMS

Obvious Media Server.

The Obvious Media Server distributes images, annotations, structure and OBVIs.

Identifiers

Various objects defined in the Obvious Network Architecture have unique identifiers.

These objects can be video documents, media files, streams, sites, OBVIs, groups, users, machines, services, categories, etc. Identifiers are unique in a given site. That means that 2 objects from 2 different sites may have the same identifier. However, since each Site also has a unique identifier, we can combine the Site Identifier with the object identifier to make a global unique identifier (GUID) for each object. The specification of this GUID is given below in section XX entitled XML Format for Object Annotations.

Vdoc and Media

A Video Document (Vdoc) is a format-independent concept of a video. Any physical copy of a Vdoc, in whole or in part, is called a Media, regardless of the copy's format. For example, from a Vdoc representing a TV movie, you can create 3 media:

a BetaSP copy of the whole program a MPEG stream corresponding to the encoding of the first 45 minutes of the program an AVI file corresponding the last 10 minutes of the program 2 Components The Obvious Network Architecture is a distributed systems composed of several software components. These components can be grouped into 5 categories:

1. Runtime Components

The Runtime Components constitute the core elements that are involved during the visualisation of OBVIs. When an OBVI is opened from a client application, several Runtime Components are used for streaming the video, retrieving the images of the blocks, accessing the annotations and the structure, etc.

2. Video Components

The Video Components are involved in the process of video acquisition, storage, registering of media pieces. Video Components play an important role in the Obvious Network Architecture. OBVIs are bound to a video and, except for OVI files created from scratch, this video must be properly registered in the system before it can be used.

3. OBVI Components

The OBVI Components concern the authoring, indexing and publishing of OBVIs. OBVIs are created from a registered or a non-registered video file. Then, they are published on the system as database objects. Their content is indexed and end-users can do a search for retrieving an OBVI in various forms.

4. Distribution Components

The Distribution Components are involved for the distribution of OBVIs from a repository location to the end-user. Some of these components simply use traditional distribution channels (Email, Web, FTP). Others try to embed OBVIs into video streams (ASF, RM, QT).

5. Database Components

The Indexing Components offer indexing facilities for the others components. These components use database technologies for providing a reliable and efficient way to store, index, query and transact on various objects in the system. In particular, Database Components handle video, OBVIs, streams, users, machines as database objects.

Figure 13:
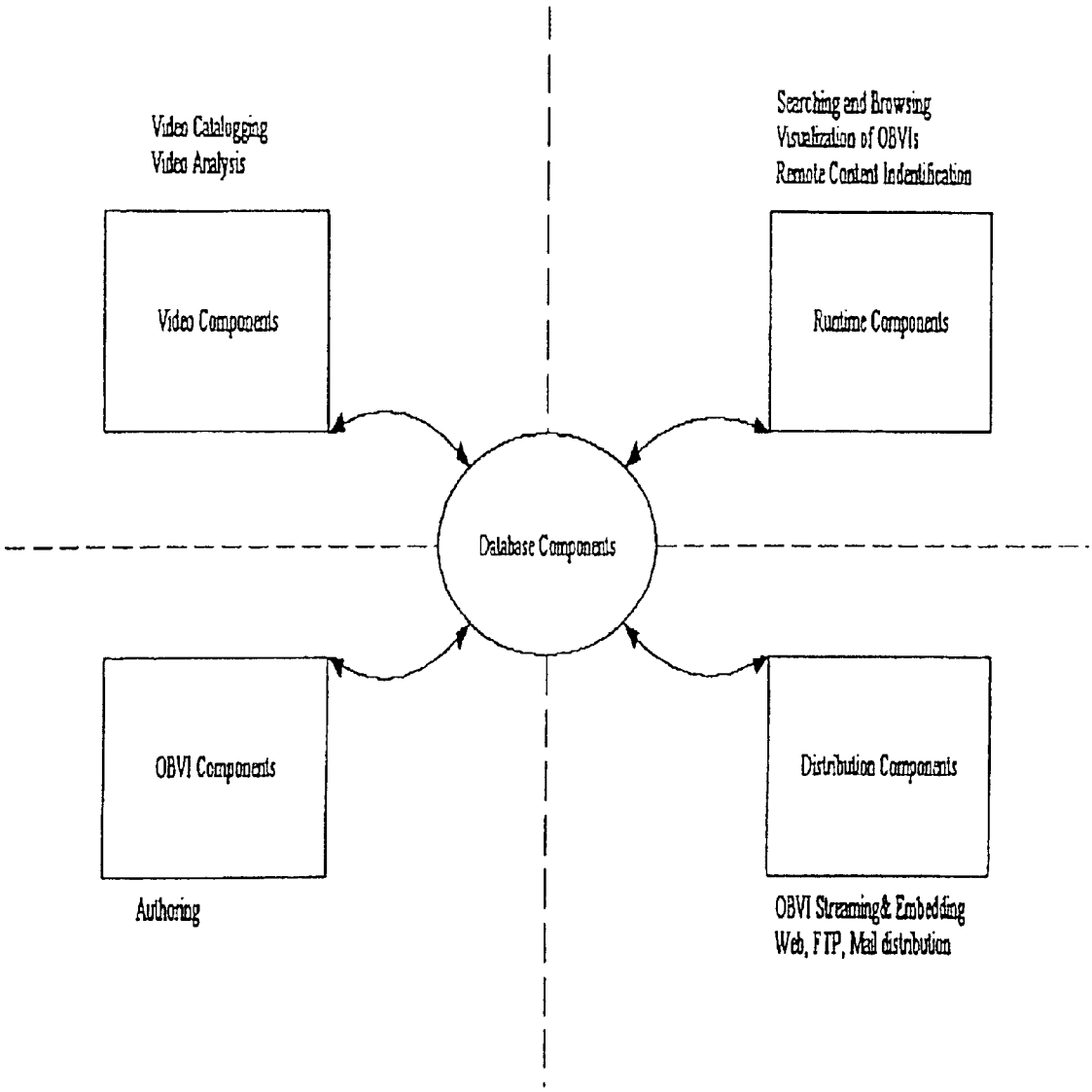
FIG. 13 is a block diagram of a network according to a preferred embodiment of the invention.

FIG. 13 gives an overview of the whole network architecture.

2.1 Runtime Components

Figure 14:
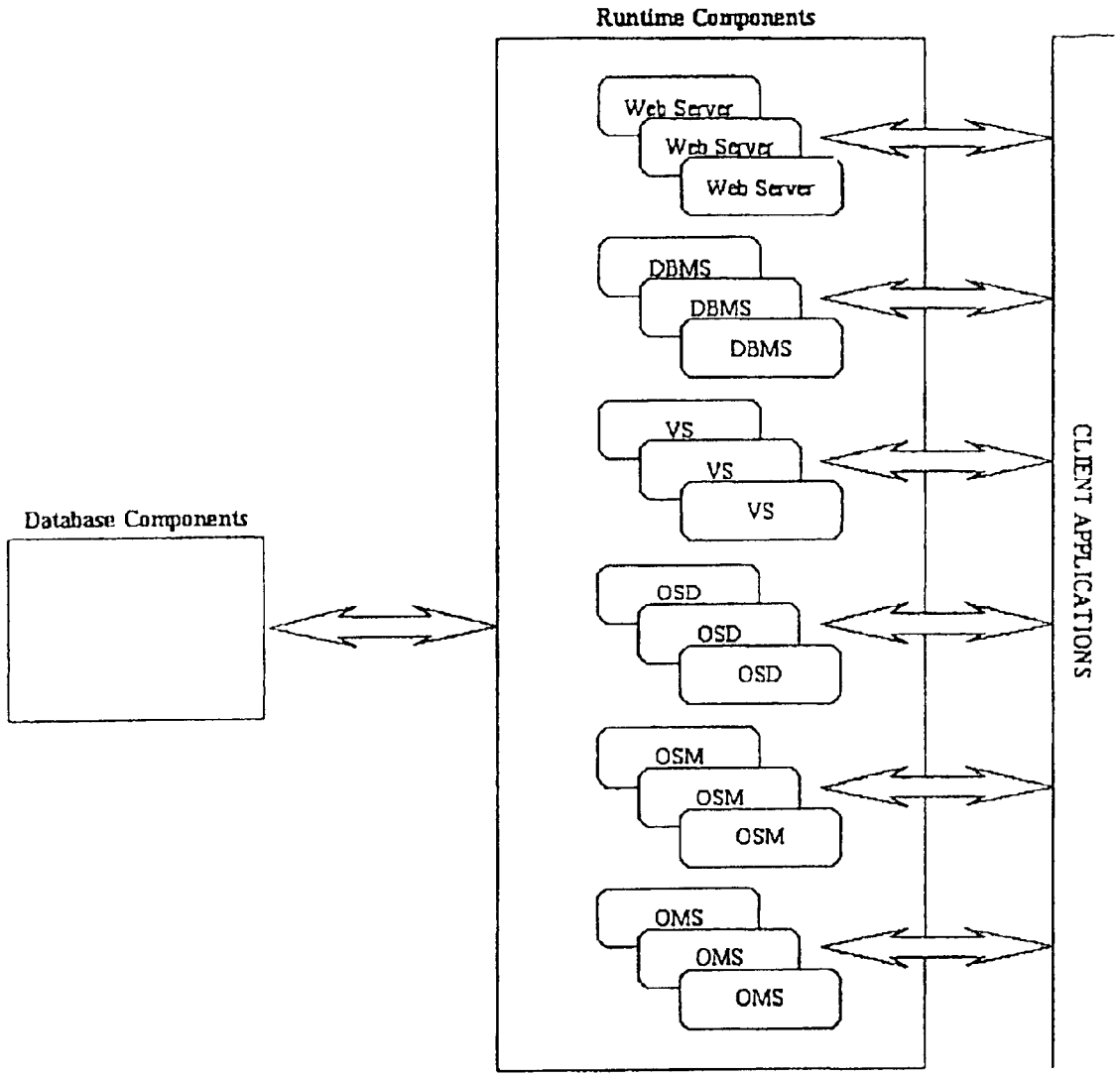
FIG. 14 is a more detailed diagram showing interaction between runtime components and both the database components and client applications.

The Runtime Components are detailed in FIG. 14. This diagram shows that Runtime Components interact directly with client applications and with the Database Components. Runtime Components include several types of servers: video server, web server, OSM, OMS, OSD.

2.1.1 Obvious Site Directory

The Obvious Site Directory is a directory service for Obvious Sites. By using the services of an Obvious Site Directory, an end-user can get the list of all available Obvious Sites in the world with their characteristics, security policies, description of their content, etc. All sites that are Obvious-compliant, i.e. being using our technology or being hosted on our portal, will have an entry in this directory.

An OBVI contains a Site Identifier. A Site Identifier is a number that uniquely references a site. The mapping between the Site Identifier and the actual address of the site involves a mechanism called Site Resolution. This mechanism is described in below in Section V entitled The Obvious Site Directory.

If the administrator of a site does not want to be referenced on this directory then the site is said to be autonomous. In that case, site Resolution is done locally, at each client application, since only one site/IP pair is necessary.

2.1.2 Obvious Site Manager

This component is responsible for the management of an Obvious Site. It handles access control and service replication. Client applications must first connect to an Obvious Site Manager before accessing resources in a given Obvious Site. The Obvious Site manager is the entry point for a given portal.

2.1.3 Obvious Media Server

The Obvious Media Server is involved during the visualisation process of an OBVI. Its primary goal is to distributes still images corresponding to OBVI blocks (because video servers can not distribute still images efficiently). The OMS allows remote applications to retrieve individual still images that can be used for 2D/3D storyboard, thumbnails of video documents, etc. Aside the distribution of still image, the OMS also accomplished important tasks such as the distribution of annotations and structure, the generation of OVI and XML files, etc.

2.1.4 Video Server

Several video servers can be used in the Runtime Components. The architecture does not rely on a specific streaming technology. Any third-party video server can be incorporated in the Obvious Network Architecture, if client applications (such as the Obvious Media Viewer) can support it. For example, the OMM/OME/OMV suite of applications support RealServer G2, NetShow and NetShow Theater streams.

RealServer G2 and NetShow should be used on low-bandwidth networks. NetShow Theater is the preferred choice for delivering broadcast-quality MPEG video streams across high-bandwidth networks and intranets.

2.1.5 Web Server

In the Obvious Network Architecture, several web servers can be used for accessing annotations. These servers distribute any content type that can be displayed in the IE-based annotation viewer of the OMM/OME/OMV tools. When an OVI file is published/indexed, its embedded annotations are converted into HTML and automatically published on these Web servers.

2.1.6 External Database

In the case of database annotations (ODA), several external databases can be used. Access to these databases is handled by a specific plugin, via ODBC, ADO or any other database access mechanism.

2.2 Video Components

Figure 15:
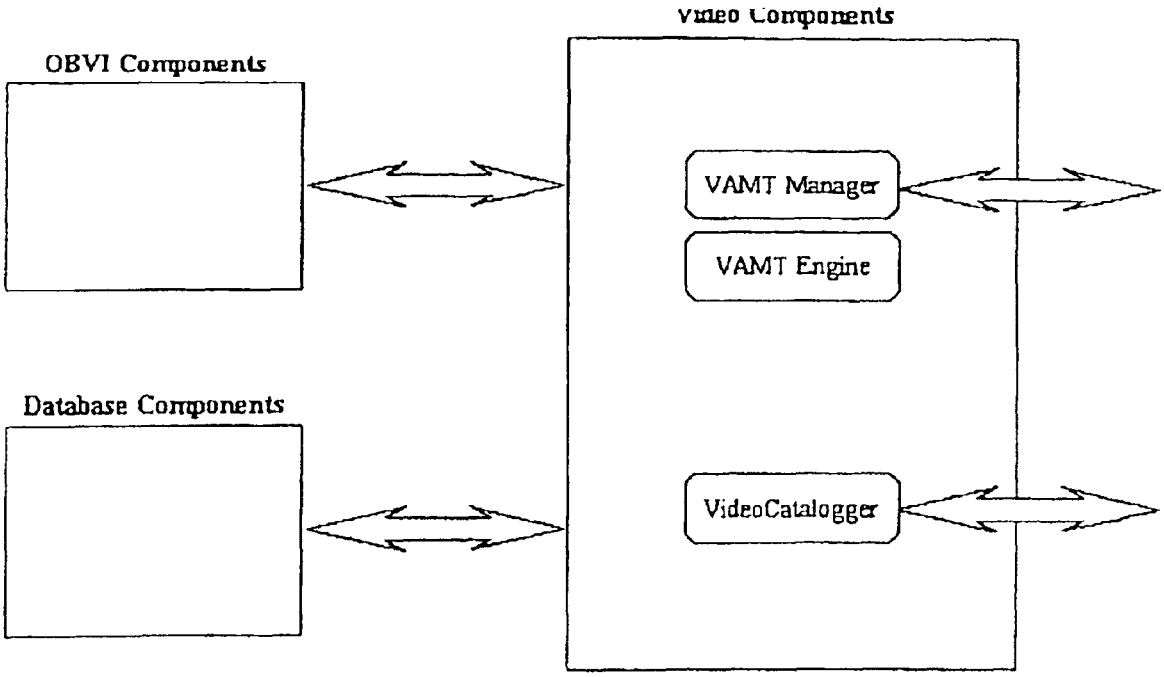
FIG. 15 is a more detailed diagram showing interaction between video components and both OBVI components and database components.

The Video Components are detailed FIG. 15. These components interact with the Database Components and the OBVI Components.

2.2.1 Video Cataloging Tools

Video cataloging tools perform the following tasks:

Video acquisition

Closed-Captions acquisition

Video registering in the OIS database

Video analysis and video archiving (on the Obvious Asset Manager)

In current implementation, these tasks are accomplished from a unified interface: the Obvious Management Console. The Obvious Management Console, described in details below in section XI, entitled Obvious Management Console, is an application that allows the administration of the whole system. In particular, it allows to run these video cataloging tools.

Video analysis and video archiving are handled by the Obvious Asset Manager.

2.2.2 Obvious Asset Manager

The Obvious Asset manager has 2 roles. It acts as a repository for the video files, for archiving purposes and it also hosts the VAMT for video analysis purposes.

Concerning video archiving, the Obvious Asset Manager is basically an FTP server that allows remote clients applications to upload their video files. This upload is never done manually. It is automatically handled from the Obvious Management Console, when the user registers a new video file. Video registering (composed of Video Document registering and Media registering) plays an important role in the Obvious Network Architecture.

Concerning video analysis, 3 modules are used: the VAMT Engine, the VAMT Service and the VAMT Manager. The VAMT Engine is a server that runs several simultaneous analysis jobs. It internally uses the Obvious VAMT Engine which handles the core analysis. Each analysis job involves the analysis of a specific video file from a timecode in to a timecode out. The Obvious VAMT Manager is the graphical user interface that allows remote administration of the Obvious VAMT Service. The Obvious VAMT Manager allows the user to define, launch, stop and edit analysis jobs. These modules are described in details in FIG. 15 and in more detail in Section IX entitled the Obvious Asset Server.

2.3 OBVI Components

Figure 16:
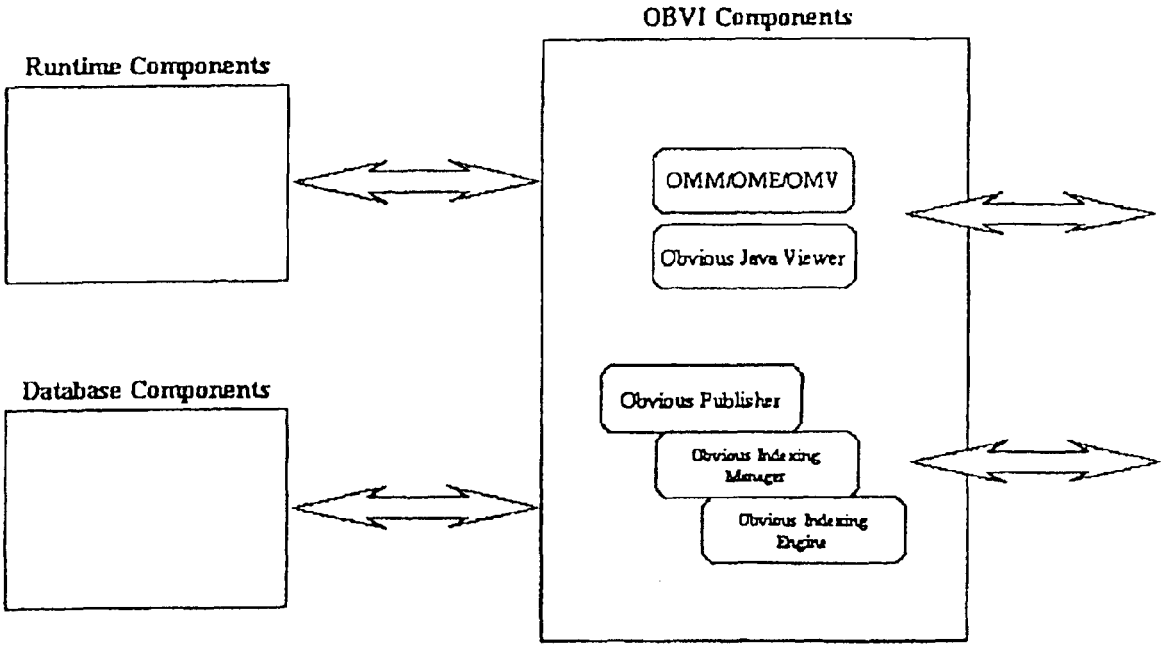
FIG. 16 is a more detailed diagram showing interaction between OBVI components and both runtime components and database components.

FIG. 16 describes the OBVI Components. These components interact with the Runtime Components and the Database Components.

2.3.1 Authoring and Editing Applications

There is only one authoring tool in the current state of development: the Obvious Media Manager. The Obvious Media Editor is an editing tool.

2.3.2 Viewer Applications

The Obvious Media Viewer is a viewer application implemented in Visual Basic and Visual C++. The Obvious Java Viewer is a cross-platform, lightweight and web-enabled OBVI viewer.

2.3.3 Obvious Publisher

The Obvious Publisher is the end-user graphical interface that allows to publish and index OVI files. Publishing involves the transformation of the OVI file into an OBVI object that can be stored in the OIS database. Indexing concerns the OBVI metadata and annotations. In current version, the indexing process can use the Microsoft Index Server or the Oracle 8 database (with ConText Cartridge). In both cases a specific filter is needed to parse the OVI files, extract meaningful information and populate index information. The Obvious Publisher doesn't do the publishing and the indexing job. It is a GUI that collects all the information necessary for publishing. The OVI file and the collected information are then uploaded to another machine where resides the Obvious Publishing Engine.

2.3.4 Obvious Publishing Engine

The Obvious Publishing Engine is the core module that handles the publishing and indexing of an OVI file. It acts as a daemon that automatically takes OVI files, parse them, publish their annotations, and create corresponding entries in the database.

2.3.5 Obvious Publishing Manager

The Obvious Publishing Manager is an application that can be used by administrators to remotely control and manager the Obvious Publishing Engine. From that application, the user can see the status of the publishing/indexing process, see the number of jobs, configure the scanned directories, etc.

2.4 Distribution Components 2.4.1 Classical Distribution

OVI files can be distributed by Web servers, FTP servers or by email. An OVI can be bound to its meia content in several ways. Concerning video, it can have the whole media file embedded or it can be linked to a registered Vdoc/Media. Concerning the annotations, they can be embedded or distributed on-demand at runtime.

2.4.2 On Demand Distribution

The Obvious Media Server is able to distribute OBVIs on demand (as OVI, XML or OSF files) or multicast (as OSF files). The distributed OVI, XML and OSF files can be either generated on the fly or pre-calculated.

2.4.3 Streamed Distribution

The Obvious Streaming Architecture defines the mechanisms that allows:

the conversion of OBVI files into OSF streams (Obvious Multicast Builder)

the multicast of OSF streams on IP channels (Obvious Multicaster)

the receiving of OSF streams at the client side (Obvious Multicast Listener)

These elements are detailed in section XVI, entitled The Whole Picture.

2.4.4 Immerse Streamed Distribution

MPEG2 Embedding

Several hardware/software technologies allow the encapsulation of bit-streams, byte-streams, and IP data into MPEG-2 packets. These MPEG-2 packets can then be injected into a DVB-compliant transport stream that can be carried over satellite, cable, or terrestrial digital transmission systems. By combining audio/video and OBVI data streams, these technologies enable a multitude of point-to-multipoint OBVI delivery applications for traditional broadcasters looking for new business models.

QT Embedding

QuickTime movies can handle user-defined tracks of information. A new track can be created for carrying OBVI data in a traditional QuickTime movie. The track identifier, as defined by the QuickTime specification, is "OBVI". The embedding of an OBVI in a QuickTime is an alpha functionality. It is available in the OMM and is implemented in a separate DLL called LibQT.dll. It currently uses QuickTime 3. Porting to QuickTime 4 is expected in next major release of the OMM.

A new QuickTime player has also been implemented. It acts as a classic QuickTime player. However, if the input movie file contains the OBVI track, a dialog box asks the user if he wants to launch the OMM. In that case, the OVI file is extracted from the QuickTime file is opened with the OMM.

ASF Embedding

Microsoft has recently defined a new ASF format. NetShow 2.0 was using ASF version 1.ASF version 2, available in NetShow 3.0 is more powerful and flexible. It allows the embedding of user-defined packets of data. Experiments have shown that embedding OBVI data into an ASF stream should be easy. However, we should wait until the end of the OSF specification because it should be possible to directly embed OSF packets in an ASF stream.

RealMedia Embedding

The RealServer G2 SDK exposes a way for embedding user-defined packets of data in a RealMedia stream. Here again, there will be a strong relation with OSF. OSF packets can be directly embedded in RealMedia streams.

2.5 Database Component

The Database Component is also called the Obvious Indexing System (OIS). It acts as a repository for registering and indexing the various entities in the system: video documents, media, streams, OBVIs, users, groups, etc. The Database Component interact with all others components.

3 Implementation Issues 3.1 Technologies Involved

The Obvious Network Architecture is designed for Windows technologies. Microsoft Internet Information Server is extensively used in servers that need to provide services to remote application clients using HTTP. Others servers. A three-tier model is used. The OIS constitute the backend store, the database. The business logic, as defined in the three-tier model, is implemented as a set of ISAPI scripts and NT services. Client applications interact with the system by using HTTP. XML is heavily used at different levels as a standard format for data exchange between client/server and server/server communications.

Some parts of the system use direct TCP/IP communications, essentially for internal server/server data exchange.

All server components are implemented in Visual C++/MFC. This include NT services (implemented with ATL) and ISAPI extensions. MFC is used for all graphical parts.

3.2 Porting

Server components can easily be ported to others platform, especially Unix. ISAPI scripts can directly be converted into CGI scripts. NT services can be rewritten as Unix daemons. Windows-specific code has been, wherever possible, coded in a separate DLL.

Concerning the database, standard built-in types have been used in the definition of the tables. Data access is handled by ADO and should be easily replaced buy direct ODBC calls, if necessary.

III. THE OBVI

1 The OBVI

An OBVI is not a file. An OBVI is a hyper media container. This general definition does not imply any particular storage format. However, in the current implementation of the Obvious Architecture, an OBVI is stored and managed as a database object. This is the primary storage format.

From this primary, database-centric, storage format, an OBVI can the be exported in any additional storage format (an XML file, an OVI file or an OSF file), called secondary storage formats. In particular, the OVI file format is one of the storage format that has been defined fort storing OBVI objects outside the database, on a regular file-system. The OVI file format is a way to store an OBVI in a binary file. This file can be read by client applications for visualising and interacting with the OBVI.

Historically, the first OBVI format storage that has been developed is the OVI file format. This is the format that is natively read from the OMM/OME/OMV suite of client applications. However, this file-based storage format is only one of the possible secondary storage formats to which an OBVI can be exported.

The Obvious Network Architecture, described in details in this document, focuses on the specification of the primary storage format: the database format. It will also show how OVI files can be converted into OBVIs (this is the publishing/indexing process) and how OBVIs can be extracted from the database in an OVI or a XML form.

2 Annotations

In current version of the OVI file format, the following annotations types can be found:

1. HTML
2. Wordpad
3. Text
4. Closed-Captions
5. SpeakerID
6. Database template
7. Audio
8. Object An annotation can be either embedded in the OVI file or located on another server. In the second case, the OVI stores the URL of the remote annotation. While the internal mechanism is already implemented in the OBVIKernel, HTML annotations are the only kind of annotations that fully use this feature: the user can create embedded HTML annotation or linked HTML annotations.

However, as it will explained in future chapters, the Obvious Network Architecture heavily relies on this mechanism for providing a global framework for publishing indexing and distributing OBVIs. Future versions of the OMM will implement this dual mechanism for all others annotations types.

2.1 HTML Annotation

In an OVI file, HTML annotations are internally represented by a description file. This is a text file describing the material that constitute the HTML annotations. In the case of a remote HTML annotation, the description file contains the full URL of the document. In the case of an embedded HTML annotation, the description file gives the names of all temporary files that constitute the annotation. These can be HTML files, JAVA applets, images or any other file that can be part of an HTML page.

To ensure a proper migration into the Obvious Network Technology framework, this description file will be encoded in XML. This change is expected for next major release of the OMM.

Another expected change concerns the edition of the HTML annotations. An in-place HTML editor should be used for allowing the user to directly modify the annotation HTML, in WYSIWYG mode, without launching any external editor. Microsoft's DHTML editor is the preferred one.

In current version of the OMM, HTML annotations are viewed with Internet Explorer. That means that we can virtually handle any document that can viewed on the Web (Word document, PowerPoint presentation, VRML files, etc.).

2.2 Wordpad Annotation

A Wordpad annotation is represented by an RTF file. In the OMM, a standard "Rich Edit" component is used for visualising and editing these annotations.

2.3 Text Annotation 2.4 Closed Caption Annotation

In current version of the OMM, closed-caption annotations are created by converting a Virage VDF file into an OBVI. The user can directly create closed-caption annotation in the OMM. However, this functionality should be removed because closed-captions are supposed to be the result of an automated process (for example, during video acquisition, a hardware module grabs the closed-captions from the analog video signal). And, since closed-captions are a transcription of the speech track, allowing the user to create closed-captions will be very confusing.

2.5 SpeakerID Annotation

A SpeakerID annotation is a small line of text describing the person who is speaking. These annotations are currently created by converting a Virage VDF file into an OBVI. They can also be created manually by the user.

2.6 Database Template Annotation

Database template annotation (formerly Obvious Database Annotations, ODA) are internally represented by a description file. This text file gives the name and type definition of each field of the template.

To ensure a proper migration into the Obvious Network Technology framework, this description file will be encoded in XML. This change is expected for next major release of the OMM.

2.7 Audio Annotation

An audio annotation is constituted by a title, a description and an audio file. The audio file can be either embedded in the OVI file or located on another server. In that case, its URL is stored in the OVI file.

2.8 Object Annotation

An object annotation describes one or several object paths in the video. It has a title, a description, a URL, a video range and a list of object paths, one for each object of the annotation. Each object path is defined by a title, a description, a URL and a list of bounding boxes. The list of bounding box gives the successive positions of the object in the video sequence. It is not required to have a bounding for each frame in the range. Each bounding box is represented by the corresponding frame number, its position (x, y, width and height), a description and a URL. Text descriptions are plain ASCII.

Figure 17:
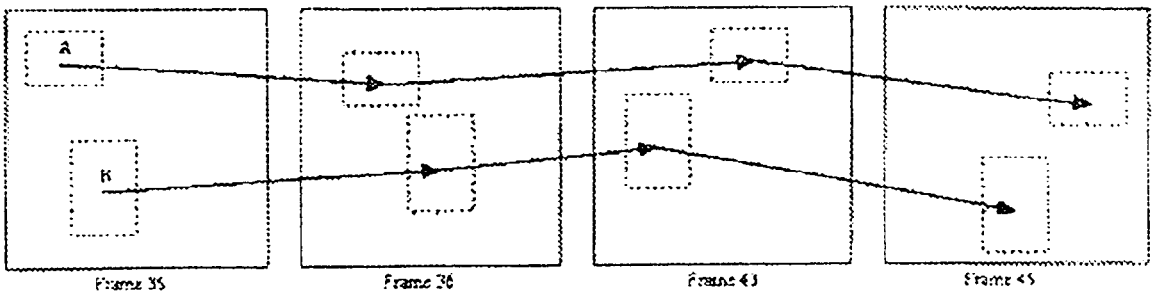
FIG. 17 is a diagram of an object annotation comprised of two objects.

FIG. 17 depicts an object annotation composed by 2 object: A and B. Each object has a path, described by a list of bounding box, one for each image. The range of the object annotation is 35-45. However, only frames 35, 36, 43 and 45 have a the bounding box of the objects. This allows to represent sparse and non contiguous sets of object positions. Metadata (represented by a title, a description and a URL) can be attached at different levels: at object annotation level, at the level of each object path or at the level of each bounding box. An object annotation is internally represented by an XML file. the following gives a sample XM file corresponding to the 2 objects depicted below. We suppose here that object A represents a bird and that object B represents a cat.

```
<?xml version="1.0"?>
<ObjectAnnotation RangeMin=36 RangeMax=45>
  <Title>Bird and cat</Title>
  <Description>This annotation contains a bird and a cat</
    Description>
  <URL></URL>
    <ObjectPath>
    <Title>Bird</Title>
    <Description>Motion tracking of the bird</
      Description>
    <URL>http://www.company1.com/page1.html</
      URL>
    <Path>
      <Box x=140 y=126 width=76 height=65 frame=35>
          <Description>The bird is sleeping</Description>
          <URL>http://www.company1.com/birds.html</
            URL>
      </Box>
      <Box x=140 y=126 width=76 height=65 frame=36>
      </Box>
      <Box x=140 y=126 width=76 height=65 frame=43>
          <Description>The bird is dead</Description>
      </Box>
      <Box x=140 y=126 width=76 height=65 frame=45>
      </Box>
    </Path>
  </ObjectPath>
    <ObjectPath>
    <Title>Cat</Title>
    <Description>Motion tracking of the cat</
      Description>
    <URL>http://www.company1.com/page2.html</
      URL>
    <Path>
      <Box x=100 y=229 width=127 height=134 frame=
        35>
          <Description>The cat is hungry</Description>
    </Box>
      <Box x=145 y=190 width=133 height=130 frame=
        36>
      </Box>
      <Box x=149 y=198 width=120 height=139 frame=
        43>
          <Description>Cat eating the bird</Description>
          <URL>http://www.company1.com/cats.html</
            URL>
      </Box>
      <Box x=142 y=220 width=128 height=155 frame=
        45>
      </Box>
    </Path>
  </ObjectPath>
</ObjectAnnotation>
```

Object annotations can be manually created or they can be the result of an automated process. In the first case, the use manually draws a bounding box around objects of interests. In the second case, the motion tracking algorithms developed by the Phoenix team will directly provide the set of bounding boxes.

Concerning the visualisation of Objet Annotations, a new module is under development. It will allow to draw the bounding boxes corresponding to a given set of object paths. This module will be implemented as an ActiveX Control, to ensure an easy integration with the OMM.

3 Publishing and Indexing an OBVI

Publishing an OBVI means converting the OBVI from the OVI file format to the database-centric file format. Thus, the publishing operation must be considered as a storage conversion: from a secondary (file-based) storage format to the primary (database-centric) storage format. Once an OBVI is published and indexed, it can be re-extracted from the database as an OVI or an XML file. Then the extracted OVI file can be modified and re-published later, creating a new OBVI version.

4 Storage Scenarios

Before discussing the details of the various storage formats, let's present some possible scenarios that show how different storage formats can be used.

The primary storage format is essentially used in the following scenario:

SCENARIO 1:

From a particular client application, the user browses the OIS for existing OBVIs. He makes a boolean search that gives a list of possible matches. These matches correspond to OBVIs that are stored in the OIS, i.e. with the primary storage format. When the user selects an OBVI for viewing (read-only mode), the client application dynamically interact with the OIS (via various others runtime components) for getting all the information needed for visualizing the OBVI (metadata, structure, images, annotations, etc.).

The OVI file format is essentially used in the following scenarios:

SCENARIO 1:

From a particular client application, the user browses the OIS for existing OBVIs. Then he selects an OBVI and requests a write mode, meaning that we would like to be able to modify the OBVI. In that case, an OVI file is generated on the fly by the OIS (with the help of others runtime components) and is sent to the client application. The OBVI that the user manipulates is therefore stored as a file and can be saved locally on the client machine. This OVI file can be sent by email, modified and then re-published on the OIS. The Obvious Network Architecture specifies a version management scheme that allows the system to handle and track multiple versions of the same OBVI.

SCENARIO 2:

From a particular client application, the user creates an OBVI from scratch. He first selects a media by either browsing the local file system or browsing the OIS for a pre-registered media. Then an OBVI is created by using the VAMT (local or remote) or an EDL. The corresponding OBVI is then stored as an OVI file that can be modified at any time. Finally, this OBVI is published in the OIS. That means that a module will take care of the conversion of the OBVI from the OVI file format to the database-centric storage format.

The XML file format is used in the following scenario:

SCENARIO 1:

From a particular client application, the user browses the OIS for existing OBVIs. He makes a boolean search that gives a list of possible matches. These matches correspond to OBVIs that are stored in the OIS, i.e. with the primary storage format. When the user selects an OBVI for viewing (read-only mode), the client application downloads the corresponding XML file and interprets its content.

The OSF file format is used in the following scenario:

SCENARIO 1:

From a particular client application, the user selects an OSF channel. On that specific channel, OBVIs are transmitted as OSF packets, in multicast IP. The client application automatically stores the receives OSF files on the user hard-drive. The OSF files are converted into OVI files that can be opened with the OMM/OME/OMV suite of client applications.

SCENARIO 2:

The user is viewing a video stream (RelMedia or NetShow stream, for example). He has a special player that will automatically, while the user is viewing the video stream, decode any embedded OSF packet.

In conclusion, an OBVI is stored in the primary storage format (i.e. in the database) when it is published. Then, it corresponds to an identified object that is securely managed by the database. This object has a unique identifier and is attached to a version number. Its content is indexed and client applications can do search queries for browsing and retrieving a particular OBVI. In the other hand, an OBVI is stored as an OVI file (i.e. a secondary storage format) when editing is necessary (because the user created a new OBVI or because the user wanted to save an OBVI on its local machine for further editing tasks).

The ability to export an OBVI from the database to an OVI or XML file gives a clear separation between the OBVI (as an object, independently of its storage format) and the file format that can be used for storing the OBVI outside the database.

5 Storage Format 5.1 Primary Storage Format

As previously described, the primary storage format is based upon a relational database system. The OBVI is handled as an object in the database. Concerning implementation issues, two possibilities are of interest:

1) The OBVI can be stored as a user-defined datatype. That means that a new datatype must be created in the database. The database must be object oriented. Procedures and policies must also be defined to handle this new datatype. This object is stored in database tables and is indexed.

2) The OBVI can be stored by using a set of built-in datatypes. The OBVI is decomposed as a set of elements (pieces of metadata, individual images, timecodes, annotation links, etc.) and all these elements are stored in database tables, using built-in datatypes (integers, floating points, character strings, date values, etc.). This solution is portable because it doesn't imply the creation of a new datatype. The current version of the Obvious Network Architecture is based on this solution.

5.2 Secondary Storage Formats 5.2.1 The OVI File Format

The OVI file format is used by the OMM/OME/OMV suite of client applications. These applications use a low-level library (the OBVIKernel, which is an ActiveX control) for accessing and interpreting this binary file format.

An OVI can reference a video in two ways: the video file can be local (local hard-drive or on the LAN) or remote. In the second case, the OBVI is said to be bound to a registered media, meaning that a connection to the server components is necessary.

The header of the OVI file contains a number of fields. However the following fields are of special interest here because they are concern the interaction between client applications and server components.

| Field Name | Type | Description |
|---|---|---|
| SiteID | Number | Site Identifier |
| ObviId | Number | OBVI Identifier |
| VersionID | Number | Version Identifier |
| VdocID | Number | Video Document Identifier |
| MediaID | Number | Media Identifier |
| MediaLocation | String | Location of the media file |

The following tables give sample values of these field corresponding to different kind of OVI files Sample 1: The OVI is bound to a local media file This is the case of OBVIs created from scratch by using the local VAMT of the OMM. The corresponding OVI file contains the file path of the video file. Here is a sample set of values for the header fields:

| | |
|---|---|
| SiteID | =0 |
| ObviId | =0 |
| VersionID | =0 |
| VdocID | =0 |
| MediaID | =0 |
| MediaLocation | =“c:\test\media\movie.avi” |

All the fields are empty (an null value is used to specify an empty or irrelevant field) excepting the MediaFile field which contains the full path of the media file.

Sample 2: The OVI is bound to a remote video file but doesn't correspond to an OBVI in the database

| | |
|---|---|
| SiteID | =0 |
| ObviId | =0 |
| VersionID | =0 |
| VdocID | =5894 |
| MediaID | =488 |
| MediaLocation | =“” |

In that case, VdocID and MediaID are nor relevant.

Sample 3: The OVI is bound to a remote video file and corresponds to an OBVI in the database This is the case of OBVIs extracted from the database in write mode. The corresponding OVI file contains a Video Document Identifier and a Media Identifier that uniquely determine a registered media file in the OIS database. Here is a sample set of values for the header fields:

| | |
|---|---|
| SiteID | =178 |
| ObviId | =66 |
| VersionID | =965 |
| VdocID | =5894 |
| MediaID | =488 |
| MediaLocation | =“” |

In that case, all the fields are relevant excepting the MediaLocation field.

This kind of OVI files contain a valid OBVI Identifier and a valid Version Identifier that allow to track the original OBVI and the parent version. If the user modifies this OVI file and re-publishes it, then 5.2.2 The XML File Format The tools that allow to store an OBVI as a XML file are currently under development. However the DTD is already defined. Basically, the XML file will provide enough information to client applications for starting a runtime session. The runtime session starts by connecting to various server components. Query are sent to these runtime components for retrieving all the material needed for the visualisation/editing of the OBVI.

In current implementation, the XML file corresponding to an OBVI is used by the Obvious Java Viewer. It can be generated and distributed by the Obvious Media Server.

5.2.3 The OSF File Format

OSF stands for Obvious Streaming Format. An OSF and an OVI file contain the same information. However, the internal structure of the OSF file, composed of chunks, allows efficient streamed transmission of OBVIs. As an example of a possible use of the OSF file, a set of beta tools have been developed. They allow to build an OSF file from an OVI file, and multicast the OSF file on an IP channel. At the client level, a multicast receiver downloads the OSF streams and stores them on the client hard drive. These tools are described in more detail below in Section XVI.

6 Versioning

OBVI version management is handled in the OIS database. Several versions of the same OBVI can be stored. Each version has a unique identifier and is represented by an author and a creation date. Different versions of the same OBVI can share the same blocks and annotations. Thus, it is possible to track changes from version to version. Version is automatically incremented during the publishing operation.

Versioning is handled by using 2 identifiers: an OBVI identifier (OBVIID) and a version identifier (VERSIONID). Different versions of the same OBVI have the same OBVIID but different values of VERSIONID.

The following gives a sample cycle of life of an OBVI. This cycle shows how versioning works and how OVI are used for extracting an OBVI from the database. It is constituted by 5 phases:

In phase 1, an OBVI is created from scratch: a local video file is used for the VAMT analysis. The resulting OVI file is annotated and shared among various users. The header of the OVI file has a null OBVIID and a null VERSIONID, meaning that this OBVI is not related to the database it is a working OBVI, created locally for authoring purposes. This OBVI can be sent by email, provided that the receiver has a way to access the corresponding video (the transmitter can either send the video separately, embed the video in the OVI file or give LAN access to the original video file).

In phase 2, the OVI is published. It is sent to a specific server that handles the publishing and indexing process. The publishing and indexing process is basically a matter of creating a new OBVI entry in the database with a new version identifier. OBVI annotations are converted into HTML and published on a Web server. The OBVI has now a valid OBVIID and a VERSIONID (lets say OBVIID=123 and VERSIONID=1).

In phase 3, another user browses the database and selects the previously published OBVI in read-only mode. An XML version is generated on the fly and is rendered on the client browser by using the Obvious Java Viewer.

In phase 4, another user browses the databases and selects the same OBVI in write mode. In that case, an OVI is generated on the fly and is sent to the client machine. The OMM/OME is automatically launched and allows the user to modify the OVI. For that purpose, the generated OVI contains the whole set of annotations (as a set of embedded HTML pages). The header of this OVI has an OBVIID equal to 123 and a VERSIONID equal to 1.

In phase 5, the user modifies the OBVI by merging some blocks and by modifying some annotations. Then, he re-publishes the OBVI (OBVIID=123, VERSIONID=1). A new version is then created in the database (OBVIID=123, VERSION=2). The new OBVI version has the same blocks and annotations except for those that have been modified by the user. Since most of the blocks and annotations are common to both versions, the new OBVI version is stored in a very efficient way and no duplication of common material is necessary.

IV. OBVI SDK

1 Concepts

The OBVI SDK allows third-party applications to access OBVI objects from either the OVI file format, the XML file format or from the OIS database. The OBVI SDK is supposed to give the same level of functionalities than the OBVI Kernel.

In current implementation, the OBVI SDK is available as a DLL that exposes basic functions for opening, reading, editing and saving OVI files. As of writing, the OBVI SDK is internally used by the Obvious development team for the following tasks:

converting OVI files into XML files that can be read by the Obvious Java Viewer converting OVI files into OSF files that can be streamed by using the Obvious Streaming Architecture opening and reading OVI files during the publishing/indexing process 2 Developer's Guide 2.1 Basic Operations 2.1.1 Using the DLL long LIBOBVI_GetNewHandle( )

Get a new OBVI handle. This handle corresponds to an empty OBVI object.

BOOL LIBOBVI_ReleaseHandle(long hObvi)

Closes the OBVI corresponding to the given handle and frees its associated resources.

After this call, the handle can not be used any more.

2.1.2 Opening an OBVI from various sources

BOOL LIBOBVI_LoadOVI(long hObvi, LPCTSTR pURL)

This function opens an OBVI from an OVI file. HTTP, FTP and FILE protocols are supported.

BOOL LIBOBVI_LoadXML(long hObvi, LPCTSTR pURL)

This function opens an OBVI from an XML file. HTTP, FTP and FILE protocols are supported.

BOOL LIBOBVI_Load(long hObvi, long vSiteID, long vObviID, long vVersionID)

This function opens on OBVI from the database. A connection to the runtime components is opened and is used to query, interact and modify the OBVI remotely.

2.1.3 Running the OBVI

BOOL LIBOBVI_Run(long hObvi)

This function prepares the OBVI by creating the necessary internal resources needed for interacting with the media file and the remote servers.

2.1.4 Getting General Information

BOOL LIBOBVI_GetObviInfo(long hObvi, LIBOBVI_OBVIINFO* pObviInfo)

This function retrieves the metadata of the OBVI represented by hObvi. The caller must give a pointer to a valid LIBOBVI_OBVIINFO structure. hObvi is the OBVI handle that has been returned by a previous call to one of the LIBOBVI_LoadXYZ functions BOOL LIBOBVI_GetBindInfo(long hObvi, LIBOBVI_BINDINFO* pBindInfo)

This function retrieves binding information. Binding information describe how the OBVI is linked to the video (local or remote source) and how it is related to the backend system (self-contained OBVI or OBVI corresponding to an object in the database)

BOOL LIBOBVI_GetVideoInfo(long hObvi, LIBOBVI_VIDEOINFO* pVideoInfo)

This function retrieves the metadata of the video to which the OBVI is bound.

2.1.5 Getting the Structure

BOOL LIBOBVI_GetBlocInfo( long hObvi, long vLevel, long vNumBloc,

LIBOBVI_BLOCKINFO* pBlockInfo)

This functions allows to retrieve the description of a specific OBVI block.

BOOL LIBOBVI_GetStructInfo(long hObvi, LIBOBVI_STRUCTINFO* pStructInfo)

Applications can get the whole structure of an OBVI by using this function. The LIBOBVI_STRUCTINFO structure contains the description of all OBVI blocks, for each level of the hierarchy.

BOOL LIBOBVI_GetLevelInfo( long hObvi, long vlevel,

LIBOBVI_LEVELINFO* pLevelInfo)

By using this function, applications can get the structure corresponding to a specific level.

2.1.6 Getting Annotations

BOOL LIBOBVI_GetAnnotSetInfo( long hObvi, long vNumAnnotSet,

LIBOBVI_ANNOTSETINFO* pAnnotSetInfo)

This function retrieves the whole set of annotations.

2.1.7 Extracting Images

BOOL LIBOBVI_GetFrame( long hObvi, long vNumFrame, long vWidth, long vHeight, char* pfilename)

This function extracts an image from an OBVI and returns the path of a temporary JPEG file that contains the image. vWidth and vHeight represent the desired size of the extracted image.

2.1.8 Releasing LIBOBVI_XXX Structures

BOOL LIBOBVI_ReleaseInfo(long hObvi, LPVOID pInfo)

This function releases an information structure. pInfo must be a valid pointer to one of the information structures (LIBOBVI_OBVIINFO, LIBOBVI_BINDINFO, LIBOBVI_VIDEOINFO, etc.)

2.2 Sample Code

Applications using the OBVI SDK must link with the LibOBVI.lib import library. The runtime code is located in LibOBVI.dll. C/C++ applications can use the provided interface.h include file for the definition of various data types.

```
#include "Interface.h"
BOOL bRes;
```

```
Long hObvi;
LIBOBVI_OBVIINFO vObviInfo;
// Get a new OBVI handle
hObvi=LIBOBVI_GetNewHandle( );
// Load an OVI file
bRes=LIBOBVI_LoadOVI(hObvi,"c:\\test.ovi");
// Extract some useful information
vObviInfo.vMagic=0x01;
vObviInfo.dwSize=sizeof(LIBOBVI_OBVIINFO);
bRes=LIBOBVI_GetObviInfo(hObvi,&vObviInfo);
// Do something with the extracted information
......
// Close and free everything
bRes=LIBOBVI_ReleaseInfo(hObvi, &vObviInfo);
bRes=LIBOBVI_ReleaseHandle(hObvi);
```

3 Reference Guide 3.1 Constants

The following constants are used for the annotation types.

```
// Annotation types
#define ANNOT_TYPE_UNKNOWN          0
#define ANNOT_TYPE_WORDPAD          1
#define ANNOT_TYPE_HTMLLINK         2
#define ANNOT_TYPE_HTMLLOCAL        3
#define ANNOT_TYPE_DATABASE         4
#define ANNOT_TYPE_CLOSEDCAPTION    100
#define ANNOT_TYPE_SPEECHTOTEXT     101
#define ANNOT_TYPE_AUDIO            102
#define ANNOT_TYPE_SPEAKERID        103
```

3.2 Information Structures

This section describes the various structures that are used by the LIBOBVI functions. Each structure has a magic number field (vMagic) and a size field (dwSize) that must be properly initialised by the application before using them in one of the LIBOBVI functions.

The magic number identifies the type of the structure. The following table gives the different possible values:

| Information structure | Magic Number | Constant |
|---|---|---|
| LIBOBVI_OBVIINFO | 0 × 01 | LIBOBVI_Magic_ObviInfo |
| LIBOBVI_VIDEOINFO | 0 × 02 | LIBOBVI_Magic_VideoInfo |
| LIBOBVI_BINDINFO | 0 × 03 | LIBOBVI_Magic_BindInfo |
| LIBOBVI_BLOCINFO | 0 × 04 | LIBOBVI_Magic_BlocInfo |
| LIBOBVI_LEVELINFO | 0 × 05 | LIBOBVI_Magic_LevelInfo |
| LIBOBVI_STRUCTINFO | 0 × 06 | LIBOBVI_Magic_StructInfo |
| LIBOBVI_ANNOTINFO | 0 × 07 | LIBOBVI_Magic_AnnotInfo |
| LIBOBVI_ANNOTSETINFO | 0 × 08 | LIBOBVI_Magic_AnnotSetInfo |
| LIBOBVI_TABANNOTSETINFO | 0 × 09 | LIBOBVI_Magic_TabAnnotSetInfo |

Concerning the dwSize field, it must be initialised to the size of the structure, in bytes.

3.2.1 LIBOBVI_OBVIINFO

This structure gives the OBVI metadata. The pProxyLocation field contains the URL of an image that acts as a graphical representation for the whole OBVI. In current implementation, the proxy image is in JPEG format.

```
struct __LIBOBVI_13 OBVIINFO
{
  BYTE vMagic;
  DWORD dwsize;
  char* pTitle;
  char* pAuthor;
  char* pCopyright;
  char* pComments;
  char* pCreationDate;
  long vLogicalOffset;
  long vLogicalDuration;
  char* pProxyLocation;
};
typedef struct __LIBOBVI_OBVIINFO LIBOBVI_
  OBVIINFO;
```

3.2.2 LIBOBVI_VIDEOINFO

This structure gives the Video metadata.

```
struct __LIBOBVI_VIDEOINFO
{
  BYTE vMagic;
  DWORD dwSize;
  char* pURL;
  char* pURLorg;
  char* pCreationDate;
  char* pDigitalFormat;
  char* pAnalogFormat;
  long vwidth;
  long vHeight;
  long vNbFrames;
  double vFrameRate;
};
typedef struct __LIBOBVI_VIDEOINFO LIBOBVI_
  VIDEOINFO;
```

3.2.3 LIBOBVI_BINDINFO

This structure gives binding information.

```
struct __LIBOBVI_BINDINFO
{
  BYTE vMagic;
  DWORD dwsize;
  long vSiteID;
  long vObviID;
  long vVersionID;
  long vVdocID;
  long vMediaID;
};
typedef struct __LIBOBVI_BINDINFO LIBOBVI_
  BINDINFO;
```

3.2.4 LIBOBVI_BLOCKINFO

This structure describes an OBVI block.

```
struct __LIBOBVI_BLOCKINFO
{
  BYTE vMagic;
  DWORD dwSize;
  long vFirstframe;
  long vLastFrame;
};
typedef struct __LIBOBVI_BLOCKINFO LIBOBVI_
  BLOCKINFO;
```

3.2.5 LIBOBVI_LEVELINFO and LIBOBVI_STRUCTINFO

These structures describe the OBVI block structure.

```
struct _LIBOBVI_LEVELINFO
{
  BYTE vMagic;
  DWORD dwsize;
  char* pLabel;
  long vNbBlocs;
  long* pTabBloc;
};
typedef struct _LIBOBVI_LEVELINFO LIBOBVI_
  LEVELINFO;
struct _LIBOBVI_STRUCTINFO
{
  BYTE vMagic;
  DWORD dwSize;
  long vNbLevels;
  LIBOBVI_LEVELINFO* pTabLevel;
  };
typedef struct _LIBOBVI_STRUCTINFO LIBOBVI_
  STRUCTINFO;
```

3.2.6 LIBOBVI_ANNOTINFO, LIBOBVI_ANNOTSETINFO and LIBOBVI_TABANNOTSETINFO

These structures describe the OBVI annotations.

```
struct _LIBOBVI_ANNOTINFO
{
  BYTE vMagic;
  DWORD dwSize;
  UCHAR vType;
  DWORD vId;
  char* pTitle;
  char* pAuthor;
  char* pCreationDate;
  char* pModifDate;
  char* pContent;
  long vFirstFrame;
  long vLastFrame;
  BOOL bIsTitleOfBloc;
};
typedef struct _LIBOBVI_ANNOTINFO LIBOBVI_
  ANNOTINFO;
struct _LIBOBVI_ANNOTSETINFO
{
  BYTE vMagic;
  DWORD dwSize;
  long vNbAnnots;
  LIBOBVI_ANNOTINFO* pTabAnnot;
};
typedef struct _LIBOBVI_ANNOTSETINFO LIBOBVI_
  ANNOTSETINFO;
struct _LIBOBVI_TABANNOTSETINFO
{
  BYTE vMagic;
  DWORD dwSize;
  long vNbAnnotSets;
  LIBOBVI_ANNOTSETINFO* pTabAnnotSet;
};
typedef struct _LIBOBVI_TABANNOTSETINFO
  LIBOBVI_TABANNOTSETINFO;
```

V. The Obvious Site Directory

1 Concepts

The Obvious Site Directory (OSD) provides a worldwide directory service for sites. Client applications can access an Obvious Site Directory to browse available sites. The directory of sites is searchable: sites are grouped into categories and associated to a set of searchable properties.

The OSD service is hosted on Obvious technology's servers. It will reference all the companies that host an Obvious-compliant site.

2 Site Metadata and Site Categories

For each site the following metadata is stored:

Site Identifier

Name

Description

List of IP addresses for the OSMs

Email address of the administrator of the site

Web URL of the company that holds the site

Category Identifier

Each site has a unique identifier. The value 1 is reserved for Obvious Technology's site. Values between 2 to 99 are reserved for future internal uses. Values over 100 are used to identify external sites.

Sites are grouped into categories. A site belongs to one and only one category. Categories may have subcategories. The information concerning sites and sites categories is stored in the SITE AND SITECATEGORY tables of the OIS database. Section X, entitled The Obvious Indexing System, provides more details.

Each site is associated to a list of OSM's IP addresses. OSM stands for Obvious Site Manager. It will be described in details in Section VI. The OSM is the entry point for a given site. It handles access control and replication. The list of OSM's addresses is a string containing several IP addresses separated by a sharp character (#). The string is terminated by 2 sharp characters. For example:

www.company.osm1.com#www.company.osm2.com#www.company.osm3.com##

When a client application wants to access a specific site, it uses the first IP address in that list. In case of error (due to network congestion for example), it tries the next IP address in the list.

3 Protocol

As of writing, two requested are implemented in the OSD: GetCategories and GetSites.

3.1 GetCategories

This request allows client applications to retrieve the list of site categories.

Syntax http://server_address/.../IsapiOSD.dll?GetCategories

Parameters

This HTTP request has no parameters

Response

The response is in XML format. The corresponding DTD is described in more detail in Section XVIII entitled XML Format for Record Sets. A sample XML output is given here:

```
<?xml version="1.0"?>
<!-- Generated by the OSD -->
<!-- Obvious Technology, 1999 -->
<recordset>
  <fields>
    <field type="long">CategoryID</field>
    <field type="string">Name</field>
    <field type="long">ParentCategoryID</field>
```

```
    </fields>
    <row>
      <value>12</value>
      <value>Generaliste</value>
      <value>0</value>
    </row>
    <row>
      <value>13</value>
      <value>Advertisement</value>
      <value>0</value>
    </row>
  </recordset>
```

3.2 GetSites

This request allows client applications to retrieve the list of sites.

Syntax http://server_address/.../IsapiOSD.dll?GetSites

Parameters

This HTTP request has no parameters

Response

The response is in XML format. The corresponding DTD is described in in Section XVIII. A sample XML output is given here:

```
<?xml version="1.0"">
<!-- Generated by the OSD -->
<!-- Obvious Technology, 1999 -->
<recordset>
  <fields>
    <field type="long">SiteID</field>
    <field type="string">IPlist</field>
    <field type="string">Name</field>
    <field type="string">Description</field>
    <field type="string">CategoryID</field>
    <field type="string">Email</field>
    <field type="string">Web</field>
</fields>
  <row>
    <value>2378</value>
    <value>
      www.company1.osm1.com
    </value>
    <value>Company1</value>
    <value>Company1 Description</value>
    <value>452</value>
    <value>admin@company1.com</value>
    <value>www.company1.com</value>
</row>
  <row>
    <value>2379</value>
    <value>
      www.company2.osm1.com#
        www.company2.osm1.com
    </value>
    <value>Company2</value>
    <value>Company2 Description</value>
    <value>450</value>
    <value>admin@company2.com</value>
    <value>www.company2.com</value>
</row>
  <recordset>
```

4 Site Resolution

Site resolution is the mechanism that client applications use for converting a Site Identifier to an IP address. For example, when an OVI file is opened with the OMM, the Site Identifier (SiteID) is extracted from the file and must be converted into a valid IP address for connecting to the appropriate backend services.

More precisely, site resolution gives a list of IP addresses, as described above. These IP addresses correspond to the different OSMs that can be used for a given site.

This site resolution mechanisms involves 2 processes

A cache lookup

A client application maintains a local cache giving the mapping between site identifiers and IP addresses.

A cache update

On user request or on automatic scheduling, a client application connects to the OSD for retrieving the latest set of sites and categories.

Figure 18:
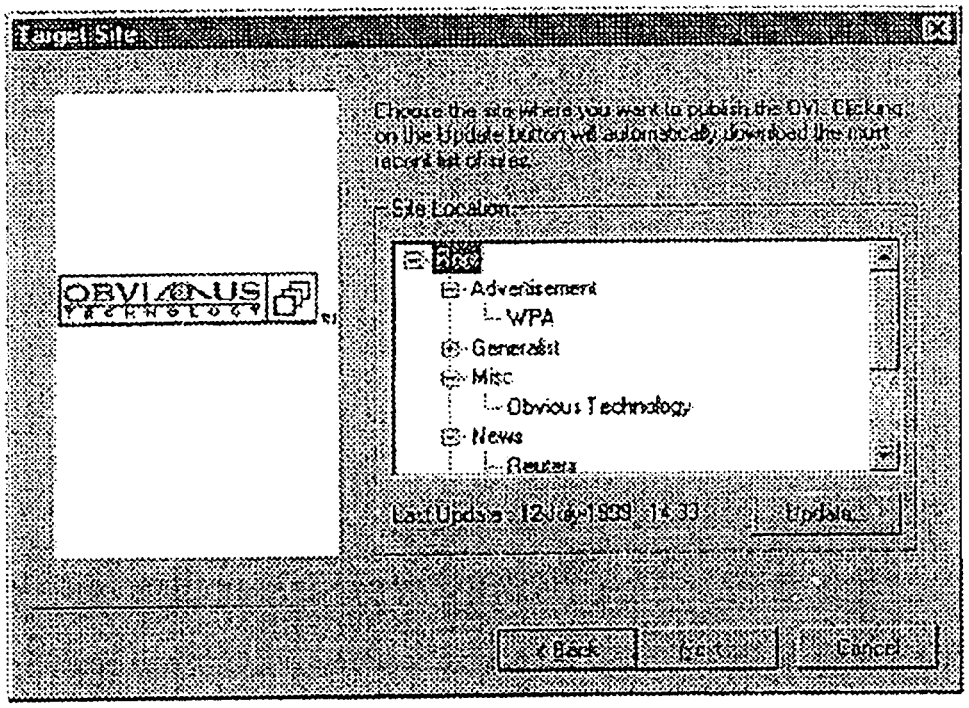
FIG. 18 is an example of a screen shot prompting a user for a site to publish an OVI.

The best example of cache lookup/update is given in the Obvious Publisher. The Obvious Publisher, described in more details in section XIII entitled OVI Publishing and Indexing, is the application that allows the publishing/indexing of OVI files. It is implemented as a Wizard with 6 property pages. As shown in FIG. 18, the second property page prompts the user for a site.

The content of the tree is taken from the local cache, which contains the list of categories and site categories from the last update. The Update button allows the user to download the latest version of the sites and their categories.

5 Implementation

Under Windows platforms, the Obvious Site Directory is implemented as an ISAPI script for Internet Information Server. The ISAPI script has a permanent connection to the OIS database, by using ADO.

A running version is available at http://odyssee.opus.obvioustech.com/OSDscript/IsapiOSD.dll VI. Site Management 1. Concepts Site Management refers to the set of components and procedures that manage a given site. The goal of these components and procedures is to handle access control to resources and load balancing between redundant resources. These resources are called services. In current version, services include the Obvious Media Server and several popular video servers. These services can be replicated, meaning that a given site can track several instances of the same service, for performance and quality of service reasons.

The main module is the Obvious Site Manager (OSM). The OSM handles the underlying services and manages the access control mechanisms for the entire site. The second important module is the Obvious Load Manager (OLM). The OLM sits in the machine hosting the services and act as an interface between the OSM and these services.

Figure 19A:
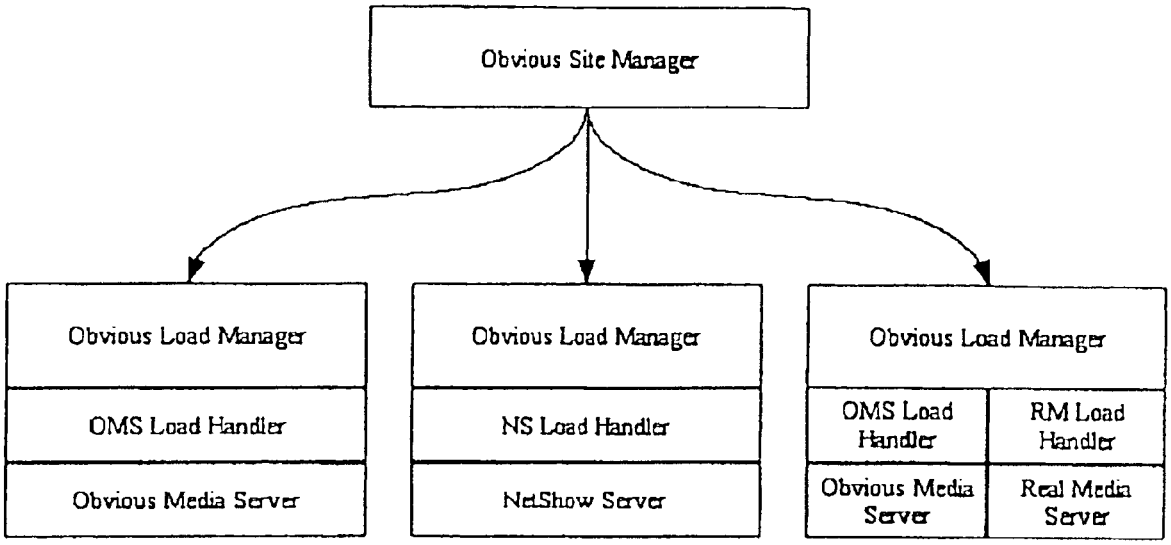
FIG. 19A is a block diagram illustrating interaction between a Site Manager and services.

FIG. 19A explains how the Obvious Site Manager and the services interact. In FIG. 19A, the Obvious Site Manager manages 4 services. Two of them are located on the same machine. The 2 others are located on separate machines. The handled services are:

The Obvious Media Server, located on machine A

The NetShow video server, located on machine B

Another instance of the Obvious Media Server, located on machine C

The Real Media video server, located on machine C

In this simple case, the Obvious Media Server is replicated since it exists on 2 separate machines. The video servers are not replicated: there is only one instance of the NetShow service and only one instance of the Real Media service.

The Obvious Site Manager uses the Obvious Indexing System as a central repository for storing the list of services, their mapping on the available set of machines, security information, load balancing data, etc.

On each machine, there is one and only one Obvious Load Manager. This component may use several different DLLs called Load Handlers for interacting with the underlying service. In the example depicted in FIG. 19A, the Obvious Load Manager located on machine C uses 2 handlers: one for the OMS and another one for the Real Server. The Obvious Load Manager receives requests from the Obvious Site Manager. These requests allows the Obvious Site Manager to update its internal tables with the status and load of the available services. Once the request is received by the Obvious Load Manager, it is forwarded to the appropriate Load Handler that manages the specific interaction with the service and calculates a global load measure for it. This measure is then sent back to the Obvious Load Manager.

2 Supported Services

Supported services include the Obvious Media Server and several video servers. Concerning video servers, a modular architecture allows the handling of virtually any kind of video server.

A service is defined by:

A unique identifier

The machine on which the service runs

The type of service (OMS, RM, NS, etc.)

2.1 OMS Service

The OMS Service, described in more detail in Section VII entitled The Obvious Media Server, is the most important service that is used during runtime operations. When an OBVI is opened from a client application (the OMM/OME/OMV or the Obvious Java Viewer), requests are sent to OSM for retrieving metadata information, images, annotations, structure, etc.

The OMS Service is composed of:

the Obvious Load Manager a specific DLL for interacting with OMS (the OMS Load Handler)

the core OMS components 2.2 RM Service

The RM Service concerns the Real Server G2 video server from Real Networks.

The RM service is composed of:

the Obvious Load Manager a specific DLL for interacting with the Real Media service (the RM Load Handler)

the Real Server G2 itself 2.3 NS Service

The NS Service concerns the NetShow video server from Microsoft.

The NS Service is composed of:

the Obvious Load Manager a specific DLL for interacting with NetShow server (the NS Load Handler)

the NetShow video server itself 2.4 NST Service

The NST Service concerns the NetShow Theater video server from Microsoft.

The NST Service is composed of:

the Obvious Load Manager a specific DLL for interacting with NetShow Theater server (the NST Load Handler)

the NetShow Theater video server itself

3 Service Replication

One of the main goal of the Obvious Site Manager is to manage service replication: a site may involve several instances of the same type of service. For example, a site may involve an OMS in Paris, London and New York. These OMSs have exactly the same features and serve the same content: they are replicated copies.

3.1 Automatic Monitoring 3.1.1 Monitoring of Service Load

The Obvious Site Manager tracks the available services and monitors their load at a regular time. Load refers here to any value that represents the current status of a service (based on the number of concurrent access, the available bandwidth, the CPU usage, etc.). The Obvious Network Architecture does not specify a generic algorithm for calculating the load of a service, since it depends on the nature of the service itself.

At a regular time, the Obvious Site Manager polls for the available services, sending them a request for retrieving their load. The retrieved load values are stored in the OIS database for logging and profiling. Four tables are used for that purpose:

The UNIT table that lists the available machines

The SERVICE table that lists the available services and how they are mapped on the available machines The STATOMS table that lists the history of the load of all OMS services The STATVS table that lists the history of the load of all video server services (RM, NS and NST services)

These tables are described in more detail in Section X entitled The Obvious Indexing System.

3.1.2 Monitoring of Service Status

The polling schema described in previous section allows the Obvious Site Manager to get the current load of the available services. The monitoring process described in this section describes how the Obvious Site Manager gets the map of all available services. For a given site, the mapping of all available services can dynamically change. For example, if a machine hosting one or several services becomes unavailable, the Obvious Site Manager must update its service map accordingly.

The process of monitoring service status does not involve a polling mechanism. Each Obvious Load Monitor directly accesses its parent Obvious Site Manager for transmitting its new status. Status information concerns the activation/unactivation of a service. This mechanism is useful when a new service is added to the system: upon activation, the Obvious Load Manager will automatically contact its parent Obvious Site Manager for registering itself as a new available service. This facilitate installation and deployment on large site configurations.

3.2 Service Handlers

Service handlers are separate modules that handle service-specific operations. They act as an interface between the Obvious Load Manager and the services. The Obvious Load manager does not contain service-specific code for interacting with a service. Therefore, each service must correspond to a service handler.

For the OMS service, the service handler uses the OMS external interface to retrieve the current load. For the RM service, the service handler uses the Real Server SDK for interacting with the Real Server architecture. Each handler has service-specific code.

3.2.1 Service Handler for Real Server G2

Using the Real Server SDK, the service handler for Real Server G2 uses the Real Server SDK for retrieving the current load of the video server. This SDK allows to extract various properties concerning the number of connected clients, statistics about the streams, file usage etc. The current implementation of the service handler for Real Server G2 calculates the load by using the following simple formula:

Load=Number of Connected Clients/Percentage of CPU Free 3.2.2 Service Handler for the OMS 3.2.3 Service Handler for NetShow 3.2.4 Service Handler for NetShow Theater NetShow Theater server is completely different from NetShow server. Its SDK gives access to several ActiveX controls that allow the management of the whole server. In particular, what the NetShow Theater SDK calls the MediaServer object, is an ActiveX control that permits client applications to retrieve useful information about the remote players, what title they are streaming, the available bandwidth, etc. The service handler for NetShow Theater internally uses this ActiveX control for calculating a global load measure.

4 Access Control

Beside replication management, the Obvious Site Manager also handles the access control to the site to which it belongs. For a given site, client application must first connect to the corresponding Obvious Site Manager for access control.

In addition to protocol-specific access control mechanisms, the Obvious Network Architecture defines its own security schema based on the following:

Client application send a username and a password to the OSM

The username and the password are transmitted in an encrypted form

The OSM returns a session key to the client application

The client application must use this session key for all subsequent requests on the OMS The OSM sends the same session key to the OMS The OMS must know in advance the session keys that he can accept. When the OSM generates a session key, it sends it to both the OMS and the client application.

For each request on the OMS, the session key is checked

Each request sent by a client application to thge OMS contains the session key. The OMS compares this session key with the ones that have been set by the OSM.

The session keys have a limited life

They expire after a certain amount of time if they are not used. The OMS handles a timer for each session key.

Figure 19B:
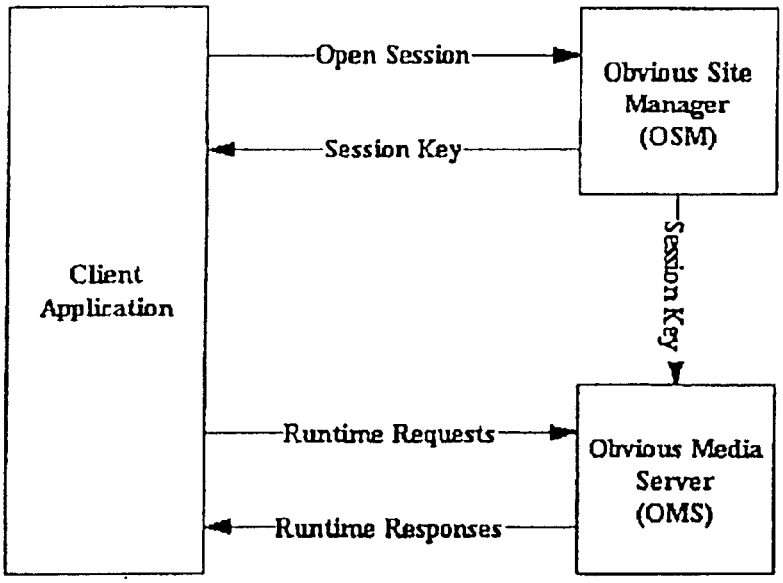
FIG. 19B is a block diagram illustrating a preferred schema for providing access control to a site.

These mechanisms are outlined in FIG. 19B.

5 Information Flux and Network Protocols

Figure 19C:
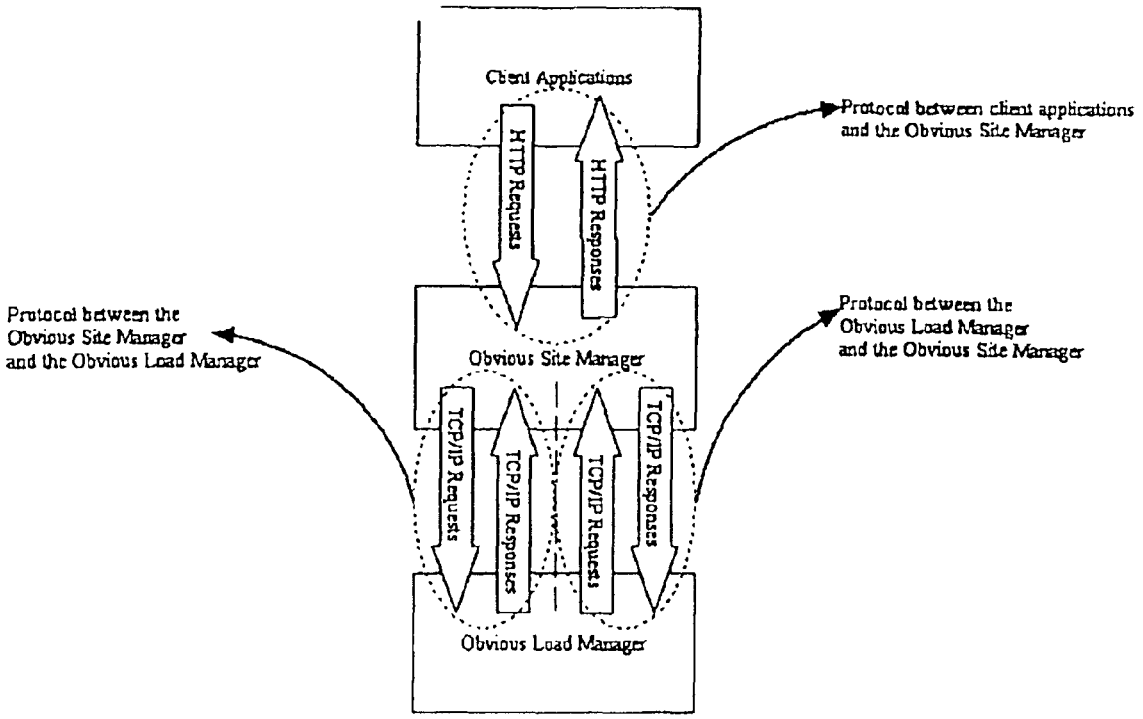
FIG. 19C is a block diagram illustrating network protocols used during site management.

FIG. 19C enumerates the network protocols used during site management. The first protocol concerns the interaction between client applications and the Obvious Site Manager. The second and third protocols concern the interaction between the Obvious Site Manager and the Obvious Load Manager. Two protocols are defined: one for the management of the mapping of the services, the other for the management of load balancing. In the first one, the Obvious Site Manager acts as a server and answers to OLM's requests. In the other one, the Obvious Load Manager acts as a server and answers to OSM's requests.

6 Implementation 6.1 Modules

Figure 20:
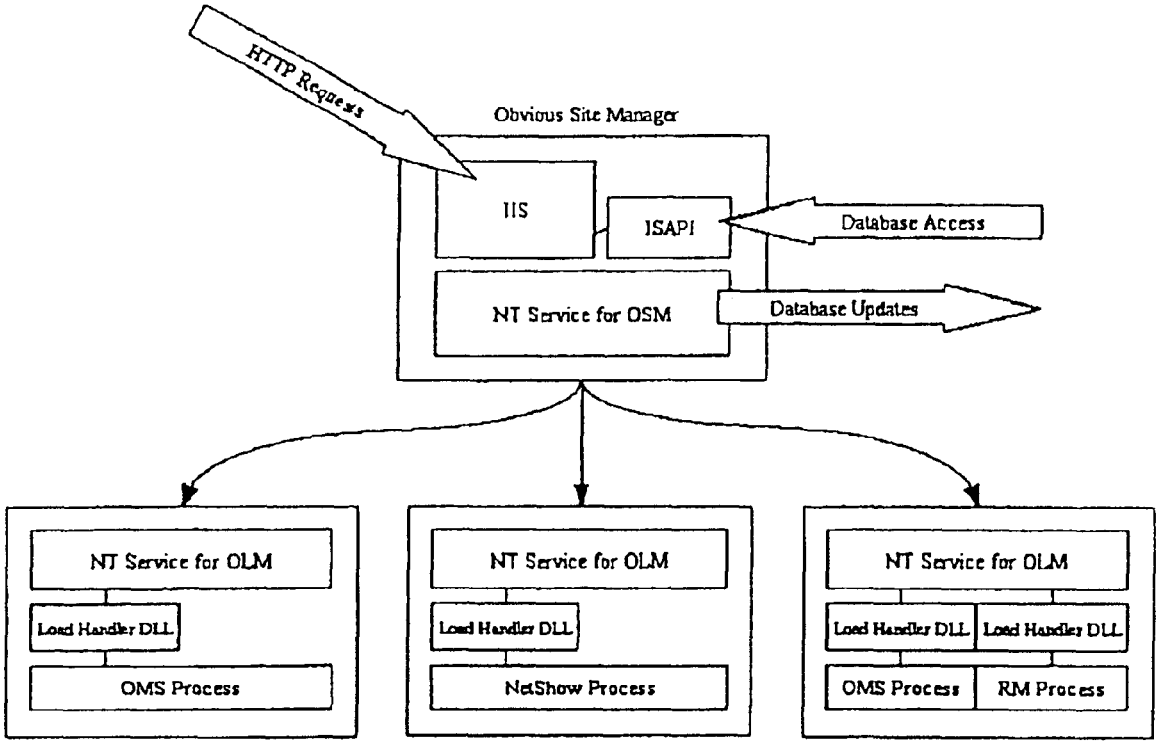
FIG. 20 is a block diagram depicting hierarchy of modules within the network architecture.

Site management is implemented as a set of 4 modules:

1) A Windows NT Service implementing the Obvious Site Manager engine that tracks the available services 2) An ISAPI extension for IIS implementing the engine that handles requests from client applications 3) A Windows NT Service implementing the Obvious Load Manager engine that handles a specific machine 4) Several DLLs implementing service-specific handlers FIG. 20 gives the hierarchy of these modules. The example depicted in FIG. 20 correspond to the one described in previous section.

The Obvious Site Manager machine contains the ISAPI module that handles requests from client application. This ISAPI module manages access control and load balancing. The protocol used between client application and the Obvious Site Manager is described later in this chapter. The Obvious Site Manager machine also contains a NT Service that polls for the available services, retrieve their load and updates database tables in the OIS.

The three others machines contain one NT Service for the Obvious Load Manager, at least one service process (OMS, NS, RM, NST) and at least one Load Handler DLL. Each OLM NT Service handles requests from the Obvious Site Manager.

6.2 Interaction Between the OLM and the Load Handlers

The load handler of a given service must be implemented as a DLL with the following exported functions:

long LH_Init( )

BOOL LH_Release(vHandle)

BOOL LH_GetLoad(long vHandle, long* pLoad)

6.2.1 LH_Init

By calling this function, the OLM initializes the load handler. It also gets am opaque handle that contain service-specific data. TheOLM does not interpret the content of this handle and simply use it for subsequent calls to LH_GetLoad and LH_Release functions.

6.2.2 LH_Release

The OLM calls this functions before unloading the DLL from memory. It allows the load handler to free it resources.

6.2.3 LH_GetLoad

The OLM calls this function in order to get the current load estimation of the service. The load is returned in parameter pLoad, as a long value.

6.3 Load Handler for Real Server G2

The service handler for Real Server G2 uses the Real Server for retrieving the number of connected clients. It has been implemented as a monitor plugin, as described in the Real Server SDK documentation. This monitor plugin, implemented as a DLL, registers itself for receiving monitoring information from Real Server G2.

At runtime, this DLL is loaded by 2 processes:

the Windows NT Service that implements the RealServer G2 the Windows NT Service that implements the OLM

The communication between the two corresponding threads (that run in these two separate processes) is implemented by using a segment of shared memory. First thread, running in the RealServer process, writes load values in this shared memory. The second thread, running in the OLM process, reads these values and transmit them, on-demand, to the OSM, The DLL file that implements the load handler for Real Server G2 is called lh_rm.dll 6.4 Load Handler for NetShow Theater With NetShow Theater, we don't need to write a plugin for accessing the internal state of the server (bandwidth, number of clients, etc.). The NetShow Theater SDK describes a set of ActiveX objects that can used by any client application for managing and tuning the server. For the purpose of the Load Handler, the MediaServer ActiveX control is of interest because it gives direct access to the number of connected players, the available bandwidth, the description of the title being played, etc.

6.5 Load Handler for the OSM

7 Protocol between the OSM and the OLM

The Obvious Load Manager creates a TCP/IP socket on port 15600 and listens for incoming connections from the Obvious Site Manager. Each connection corresponds to one request. Each request has a code, from one of the following values:

```
#define REQ_TYPE_GETVERSION 0
#define REQ_TYPE_GETLOAD 1
```

The binary message of each request is represented by a structure. The following sections gives the details of each structure. All requests are merged in a union structure as follows:

```
union _TRequest
{
DWORD vRequestType;
TRequestGetLoad vRequestGetLoad;
TrequestGetVersion vRequestGetversion;
};
typedef union _TRequest TRequest;
```

The vRequestType must be initialised to one of the REQ_TYPE_XXX values. Depending on that value, the corresponding entry of the union structure must be properly initialised.

7.1 Getting the OLM version

The OLM version get be retrieved by using a request with the following binary format:

```
struct _TRequestGetVersion
{
  DWORD vRequestType;
};
typedef struct _TRequestGetLoad TRequestGetLoad;
```

The vRequestType member must be initialized to REQ_TYPE_GETVERSION.

7.2 Retrieving the Current Load

For retrieving the load of a particular service, the OSM sends a request to the OLM. The binary message corresponding to this request is defined in the following structure:

```
struct _TRequestGetLoad
{
  DWORD vRequestType;
  DWORD vServiceID;
};
typedef struct _TRequestGetLoad TRequestGetLoad;
```

The vRequestType member must be initialized to REQ_TYPE_GETLOAD.

The OLM sends back the following response:

```
struct _TResponseGetLoad
{
  DWORD vLoad;
};
typedef struct _TResponseGetLoad TResponseGetLoad;
```

The vLoad member represents the load value, as extracted from the service (via the corresponding service handler). The range of possible values depends on the service. However, low values must correspond to a low load. High values must correspond to a significant. Load values retrieved from different types of services can not be compared. Load values from the same type of service are compared by the Obvious Site Manager to determine the best service for a given client session.

8 Protocol Between the OLM and the OSM 8.1 Concepts

An OLM can send its status to its parent OMS. This allows dynamic tracking of changes in the configuration of the services. When a new OLM is installed and deployed, it automatically register itself in the OMS, which will in turn add a corresponding entry in the OIS database. If a service stops (due to a failure or a manual operation from the administrator), the OLM sends the appropriate information to the OSM, which will update the OIS database accordingly.

8.2 Protocol Specification 8.2.1 Getting the OSM Version

The OLM can get the version of the remote OSM by sending a query whose binary structure is defined as follows:

8.2.2 Registering a Status Change

When the status of the OLM changes, it sends a message to the OLM. This message is defined by the following structure:

9 Protocol Between Client Applications and the OSM 9.1 Concepts

The protocol between client applications and the OSM is built on top of the HTTP protocol. The OSM module responsible for interacting with these client applications is implemented as an ISAPI script for Internet Information Server.

Three kinds of client applications can access the OSM:

OBVI viewers and editors that need to access the Runtime Components. They need first to connect to the OSM for authentication. The OSM sends back the address of the best OMS and the best Video Server that these client application can use, depending on the current system load. This is achieved with the GetSession query.

Administration tools that need to access the Obvious Administration Server (OAS) for managing a given site. They need first to connect to the OSM for authentication. The OSM sends back the address of the OAS that can be used. This is achieved with the GetOAS query.

Administration tools that need to access the Obvious Asset Manager (OAM) for uploading media files. They need first to connect to the OSM for authentication. The OSM sends back the address of the OAM that can be used. This is achieved with the GetOAM query.

9.2 Protocol Specification 9.2.1 GetSession

This request allows a client application to open a runtime session. After performing access control and replication management, the OSM returns the necessary information that will allow the client application to access a video server and an OMS.

Syntax http://server_address/.../osm.dll?GetSession?

server_address: Address of the web server hosting the OSM service

Parameters

This request has no parameters (POST method)

Request body

The request body is composed of the following information:

SiteID:

Site Identifier

Username: string containing the username

Password: string containing the password

ObviID: Obvi Identifier
VdocID: Vdoc Identifier
MediaID: Media Identifier
BandwithMin: Minimum bandwidth
BandwidthMax: Maximum bandwidth
InstalledVideoPlayers: List of installed video players
ClientApplication: Code of the client application
SerialNumber: Serial number of the client application Response The MIME type of the response is application/octet-stream. The response is constituted by the session key.

Description

The ClientApplication parameter contains a code that identifies the calling client application. The following table gives the different possible values:

| Code values | Client application |
|---|---|
| 0 to 9 | Obvious Media Viewer (OMV) |
| 10 to 19 | Obvious Media Editor (OME) |
| 20 to 29 | Obvious Media Manager (OMM) |
| 30 to 39 | Obvious Java Viewer (OJV) |
| 40 to 49 | Obvious Web Editor (OJE) |

The SerialNumber parameter is a string containing the serial number of the client application. It has the following structure: OBVxxx-yyyyyy-zzzzzzzz where x, y and z are digits.

9.2.2 GetOAM

This request allows client application to get some information about the Obvious Asset Manager Syntax http://server_address/.../osm.dll?GetOAM server_address: Address of the web server hosting the OSM service Parameters This request has no parameters.

Response 9.2.3 GetOAS

This request allows client application to get some information about the Obvious Administration Server.

Syntax http://server_address/.../osm.dll?GetOAS server_address: Address of the web server hosting the OSM service Parameters This request has no parameters.

Response

VII. The Obvious Media Server

1 Concepts

The Obvious Media Server is a server that allows client applications to view OBVIs. It is a runtime component in the sense that it is involved when an OBVI is opened and viewed from a client application. Here, "client application" refers to any application, developed by Obvious Technology (OMM/OME/OMV, Obvious Java Viewer) or a third-party, that is able to open, visualise or edit OBVIs.

The main goal of the Obvious Media Server is to serve metadata, images, structure, and annotations (it also accomplishes various others tasks that will be described later)

the images are used by client application for displaying thumbnails or OBVI blocks. For example, in the OMM/OME/OMV suite of client applications, the retrieved images are used in the 2D/3D views.

the annotations are used by client applications for displaying the annotation content of a specific piece of the video.

the structure is used by client applications for displaying a synthetic view of the video structure (in terms of meaningful video blocks), for facilitating the navigation in large video files. For example, the OMM/OME/OMV suite of client applications use the structure for displaying the 3D train of blocks. Others client applications may prefer to visualise the structure differently.

The Obvious Media Server acts as a service. It can be replicated and is subject to access control. Thus, it is handled by the Obvious Site Manager and has an entry in the SERVICE table of the OIS. An Obvious Load Manager can monitor its activity via a specific service handler.

An Obvious Media Server can handle several sites. This configuration is done during the installation process. An OMS internally manages a mapping between sites and DSNs, each DSN representing a connection to the OIS database of the corresponding site.

Serving metadata, structure information and annotations is a matter of extracting the information from the OIS database and sending it to the client in the appropriate format. However, serving images involves a more complex mechanism. The following sub-section will focus on that specific task.

2 Serving Images

For serving images, the Obvious Media Server uses an Image Proxy File (IPF). The IPF file contains the images that can be distributed by the OMS. When it receives a request for a specific image, the OMS determines the location of the IPF file corresponding to the desired media file (by looking at the OIS database). Then, it extracts the requested frame, scales it if necessary, and sends it to the client application.

In the simplest case, the IPF file is just the original video file. However, for improving performances, it is more efficient to build a special file, called OBF, that will be used by the OMS for extracting the requested frames. The OBF is designed to be a very efficient way for distributing video images.

In the other hand, building the OBF file is a time consuming process and implies a disk space overhead. Experiments show that the OBF file has approximately the same size than the original video file. In some cases it may be better to let the OMS use the original video file.

The current implementation of the Obvious Media Server can use both methods.

2.1 Supported Input Formats 2.1.1 Popular Formats

An IPF file is usually an AVI, a QT or an MPEG file, even if the OMS can virtually work with any video format recognised by DirectShow. In that case, the OMS works directly on the original video file and its performance depends on the video codec. For example, random access to MPEG frames is very slow. Some AVI codecs (Intel Indeo) allow very fast decompression and access time. Obvious Technology will recommend a set of codecs that should be used for the OMS. If the original video file is not encoded with one of these preferred codecs, then it is more efficient to choose the OBF file format, described below.

2.1.2 OBF Format

The OMS can also access video images from an OBF file (Obvious Backend Format). This file format has been designed for improving the performance of the Obvious Media Server. The OBF file is built from the original video file. During this build process, the user can choose the portion of the original video file that must be converted into OBF. He can also choose the image size of the output OBF file.

Allowing the user to build an OBF with a custom image size is very important. Original video files have often a high resolution and the OMS don't have to handle large images: most of the client applications that retrieve images from the OMS use them in thumbnails and 2D/3D storyboards. The image size needed in such applications is typically around 128×96.

An OBF file is a proprietary MJPEG format. It contains 3 sections: a header, an index and a body.

Concerning the header, its structure is described in the following table:

| Field Name | Size | Description |
|---|---|---|
| NbFrames | 4 bytes (DWORD) | Number of images in the OBF |
| FrameRate | 8 bytes (double) | Frame rate |
| Width | 4 bytes (DWORD) | Image width (in pixels) |
| Height | 4 bytes (DWORD) | Image height (in pixels) |

All the JPG images that constitute the OBF file have the same size, stored in the Width and Height fields. The common size of the images is chosen during the build process of the IPK file and depends on the desired image quality and the available bandwidth. A typical and recommended size is 128×96 (for a 4/3-ratio movie).

Right after the header, there is the OBF index. It is constituted by NbFrames entries. Each entry is defined by the following 12 bytes:

| Field Name | Size | Description |
|---|---|---|
| NumFrame | 4 bytes (DWORD) | Frame number |
| Offset | 4 bytes (DWORD) | Offset of the beginning of the image |
| Size | 4 bytes (DWORD) | Size of the JPEG data |

Concerning the size of the whole OBF file, it depends of course on the complexity of the images. A size of 5K can be achieved for a 128×96 image compressed at a 75% compression ratio. OBF files are designed to store low-resolution versions of original media files. They are designed to be efficiently used by the Obvious Media Server for distributing individual images.

2.2 Advanced Caching

The Obvious Media Server maintains a local cache of extracted images. This cache is used only when AVI, QT and MPEG files are used as the source. For OBF files, the cache is not used because the performance gain is not relevant (the extraction time of an image from an OBF file is very fast and there is no need to cache the extracted images).

An intelligent cache management is implemented: the OMS tries to predict future requests by pre-extracting images and putting them in the cache. The prediction algorithm involves to mechanisms Hint information A client application may send some hints to the Obvious Media Server that can help him improve its performances. These hints are represented by a set of image numbers that the application is more likely going to request in the near future. For example, in the case where the client application is the Obvious Media Manager, if the user is currently working at the first level, between block number 12 and block number 47, than the OMM can send the whole set of image numbers corresponding to this range of blocks to the OMS. The OMS will use this information as hints that will help him pre-extract and anticipate OMM needs.

Request prediction

User navigation in an OBVI is never completely random. The OMS has a simple predictive algorithm that allows him to pre-extract images from the source file and anticipate user requests. This algorithm does a linear interpolation over the last N extracted image numbers and estimate the next possible image number that can be requested by the client application.

A cache cleanup mechanism has also been implemented. It allows to keep the cache size below a given threshold, specified during the installation process of the OMS. Each image in the cache has a counter that gives the number of times this image has been requested. After a certain amount of time, images that have a low counter value are removed from the cache.

3 Protocol Between the OMS and the OSM 3.1 Concepts

There are basically two kind of interactions between the OMM and the OSM. The first one concerns security and replication. As described above in Section VI, the OMS is considered as one of the services managed by OSM's security and replication mechanisms. Each OMS has a Load Handler that is permanently polled for the load. The corresponding protocol has already been described in previous pages.

The second kind of interaction between the OMS and the OSM concerns the dispatch of session keys. The Obvious Site Manager handles access control by verifying the user credentials for a given site. Then, it calculates a session key that must be transmitted to both the client application and the Obvious Media Server. The following sections describe the protocol used between the OMS and the OSM for enabling and disabling session keys.

The protocol between the OMS and the OSM is built on top of HTTP. Encryption of transmitted data between the OMS and the OSM is handled by using a DES algorithm in CBC mode. Authentication is handled by using a N passes Zero-Knowledge algorithm.

3.2 Protocol Specification 3.2.1 Setting a New Session Key

Syntax http://server_address/.../oms.dll?SetSessionKey server_address: Address of the web server hosting the OMS service Parameters This request has no parameters Request Body The body of the HTPP request (POST method) has the following binary format:

| Field | Offset | Size | Description |
|---|---|---|---|
| RequestVersion | 0 | 8 bits | Version of the request (0 in current implementation) |
| Reserved | 1 | 24 bits | Not used |
| SiteID | 4 | 32 bits | Site Identifier |
| ObviId | 8 | 32 bits | Obvi Identifier |
| VdocID | 16 | 32 bits | Vdoc Identifier |
| MediaID | 20 | 32 bits | Media Identifier |
| SessionKey | 24 | 128 bits | Session key |
| Reserved | 40 | 32 bits | Not used |

The whole chunk is encrypted by using the DES algorithm in CBC mode. The key used to encrypt and to decrypt is defined during the installation process of the OSM and the OMS. Each site has its own DES key.

3.2.2 Revoking a Session Key

4 Protocol Between Clients Applications and the OMS 4.1 Concepts

Two kind of requests are supported by the OMS:

1) Requests concerning the runtime phase, i.e. the viewing of an OBVI:

GetObviMetadata

GetObviVersionMetadata

GetVideoMetadata

GetImage

GetLevel

GetStructure

GetAnnotation

SetHints

GetVAMTResults

Given a specific version of an OBVI (referenced by two identifiers: ObviID and VersionID), these requests allow client application to get all the information necessary to view the OBVI.

2) Requests concerning the retrieval of an OBVI:

GetObviAsOvi

GetObviAsXml

Given a specific OBVI version (referenced by two identifiers: ObviID and VersionID), these requests allow client application to retrieve the OBVI in a secondary storage format (OVI or XML)[1].

[1] OSF extraction is not implemented in the OMS because OSF streams are supposed to be used by multicast/unicast tools such as the Obvious Multicaster and the Obvious Multicast Receiver.

4.2 Protocol Specification

The protocol between client applications and the OMS is implemented on top of HTTP.

4.2.1 GetImage

This request allows the client to retrieve an image from a video media.

Syntax http://server_address/.../oms.dll?GetImage?SiteID&VdocID&MediaID&NumFrame&Width&Height server_address: Address of the web server hosting the OMS service Parameters SiteID: Site Identifier VdocID: Vdoc Identifier MediaID: Media Identifier NumFrame: Frame number Width: Desired width Height: Desired height The NumFrame parameter must be in a valid range. An empty response is returned if this parameter is out of range. The first frame of a video media is always referenced by 0. The client application can get the total number of a video media by issuing a GetVideo request (see below). The Width and Height parameters define the desired size of the retrieved image.

Request Body

The request doesn't have a request body (GET method)

Response

The response is a JPG image. The MIME type is image/jpeg.

4.2.2 GetVideoMetadata

This request allows to retrieve the metadata of a given video document.

Syntax http://server_address/.../oms.dll?GetVideoMetadata?SiteID&VdocID&MediaID server_address: Address of the web server hosting the OMS service Parameters SiteID: Site Identifier VdocID: Vdoc Identifier MediaID: Media Identifier Request body The request doesn't have a request body (GET method)

Response

The MIME response type is plain/text. The response is constituted by XML formatted data. The corresponding DTD is described in more detail below in Section XVIII.

4.2.3 GetLevel

This request allows to retrieve the blocks of a given OBVI, at a specified level.

Syntax http://server_address/.../oms.dll?GetLevel?SiteID&ObviID&VersionID&Level server_address: Address of the web server hosting the OMS service Parameters SiteID: Site Identifier ObviID: OBVI Identifier VersionID: Version Identifier Level: Level in the hierarchy (0 or 1)

Request body

The request doesn't have a request body (GET method)

Response

The MIME response type is plain/text. The response is constituted by XML formatted data. The corresponding DTD is described in more detail below in Section XVIII.

This request returns the blocks for the level corresponding to the Level parameter. If Level is equal to 0, the first level of the hierarchy is returned. If Level is equal to 1, the second level of the hierarchy is returned. In current implementation, since the third level is constituted by one-frame blocks, it is not handled by this request.

The GetLevel request doesn't give the parent/child relationship between blocks. Applications must calculate such relationships by comparing the timecodes of the blocks. For retrieving the whole hierarchy information, client applications should use the GetStructure request.

4.2.4 GetStructure

This request allows to retrieve the structure of a given OBVI.

Syntax http://server_address/.../oms.dll?GetStructure?SiteID&ObviID&VersionID server_address: Address of the web server hosting the OMS service Parameters SiteID: Site Identifier ObviID: OBVI Identifier VersionID: Version Identifier Request Body The request doesn't have a request body (GET method)

Response

The MIME response type is plain/text. The response is constituted by XML formatted data. The corresponding DTD is described in more detail below in Section XIX entitled XML Format for OBVI Structure.

The GetStructure gives the whole structure of the specified OBVI version in terms of parent/child relationship between blocks. This request has more overhead than the GetLevel request.

4.2.5 GetAnnotation

This request allows client applications to retrieve the URL of an annotation. An annotation is represented by its identifier.

Syntax http://server_address/.../oms.dll?GetAnnotation?SiteID&ObviID&VersionID&AnnotID server_address: Address of the web server hosting the OMS service Parameters SiteID: Site Identifier ObviID: OBVI Identifier VersionID: Version Identifier AnnotID: Annotation Identifier Request Body The request doesn't have a request body (GET method)

Response

This request returns the complete URL of the requested annotation. The MIME type of the response is plain/text. In case of error an empty response is returned.

4.2.6 SetHints

This request allows client applications to send hints to the OMS concerning the image extraction process. These hints help the OMS to update its cache and improve its performances.

Syntax http://server_address/.../oms.dll?SetHints server_address: Address of the web server hosting the OMS service Parameters This request has no parameters (POST method)

Request Body

The first part of the request body is constituted by the following 3 identifiers:

SiteID: Site Identifier

VdocID: Vdoc Identifier

MediaID: Media Identifier

The second part of the request body is constituted of lines of text, terminated by a carriage return character. Each line contains a frame number, in ASCII. This list of frame number constitutes the list of images that are most likely to be requested in a near future.

Response

No response.

4.2.7 GetObviMetadata

This request allows to retrieve the metadata of a given OBVI.

Syntax http://server_address/.../oms.dll?GetObviMetadata?SiteID&ObviID server_address: Address of the web server hosting the OMS service Parameters SiteID: Site Identifier ObviID: Obvi Identifier Response The MIME response type is plain/text. The response is constituted by XML formatted data. The corresponding DTD is described in more detail in Section XVIII.

The response contains the Video Identifier, the Media Identifier, the name and the description of the OBVI. Note that this request concerns an OBVI, not a specific OBVI version. Version specific metadata can be retrieved by using the GetObviVersionMetadata request.

4.2.8 GetObviVersionMetadata

This request allows to retrieve the metadata of a given OBVI version. The GetObviMetadata request returns Syntax http://server_address/.../oms.dll?GetObviVersionMetadata?SiteID&ObviID&VersionID server_address: Address of the web server hosting the OMS service Parameters SiteID: Site Identifier ObviID: Obvi Identifier VersionID: Version Identifier Response The MIME response type is plain/text. The response is constituted by XML formatted data. The corresponding DTD is described in more detail in Section XVIII.

4.2.9 GetVAMTResults

This request allows client applications to retrieve the VAMT results of a given registered Media. The user can retrieve a subset of the measures by specifying valid values for the FirstFrame and LastFrame parameters. If these parameters are both null, the whole set of measures is sent.

Syntax http://server_address/.../oms.dll?GetVAMTResults?VdocID&MediaID&FirstFrame&LastFrame server_address: Address of the web server hosting the OMS service Parameters VdocID: Vdoc Identifier MediaID: Media Identifier FirstFrame: First frame to retrieve LastFrame: Last frame to retrieve Response The MIME response type is application/octet-stream. The response is constituted of the VAMT measures in binary form. Each measure is coded as a DWORD value.

4.2.10 GetObviAsOvi

This request allows client applications to retrieve an OBVI as an OVI file. This operation correspond to the transformation from the primary storage to the OVI secondary storage format.

Syntax http://server_address/.../oms.dll?GetObviAsOvi?SiteID&ObviID&VersionID server_address: Address of the web server hosting the OMS service Parameters SiteID: Site Identifier ObviID: Obvi Identifier VersionID: Version Identifier Response The MIME response type is application/octet-stream. The response is the OVI file representing the requested OBVI.

4.2.11 GetObviAsXml

This request allows client applications to retrieve an OBVI as an XML file. This operation correspond to the transformation from the primary storage to the XML secondary storage format.

Syntax http://server_address/.../oms.dll?GetObviAsXml?SiteID&ObviID&VersionID server_address: Address of the web server hosting the OMS service Parameters SiteID: Site Identifier ObviID: Obvi Identifier VersionID: Version Identifier Response The MIME response type is text/plain. The response contains XML formatted data. The corresponding DTD is specified in more detail below in Section XX entitled XML Format for Object Annotations.

5 Implementation

The Obvious Media Server is currently implemented for Windows NT and is constituted by 2 modules:

an ISAPI script for Internet Information Server a Windows NT service

The NT service is responsible for extracting images from corresponding IPF files (that can either OBF, AVI, QT or MPEG files). The extraction of images is not achieved in the ISAPI script because of multithreading constraints in DirectShow. The others requests are handled by the ISAPI itself.

The ISAPI script has a cached connection to the OIS database, improving the speed of the SQL requests. ADO is used for all database operations.

A running OMS is available on http://odyssee.opus.obvioustech.com/OMSscript/oms.dll VIII. The Obvious Administration Server 1 Concepts The Obvious Administration Server (OAS) allows remote administration of a given site. Administering a site is essentially a matter of modifying entries in the OIS database. Administration tools (developed by Obvious Technology or by third parties) never directly access the OIS database. They must send their requests to the OAS which is responsible for managing the database. By putting this additional layer between administration applications and the database repository, we ensure a higher level of security. We also facilitate the maintenance of the system: changes in the internal structure of the database will not have any impact on the administration tools as long as they use the standard interface of the OAS.

XML is extensively used for formatting the responses of the OAS. In particular, recordsets corresponding to data fetched from the OIS tables are formatted as XML documents and sent to the client application.

2 Protocol

The protocol between administration applications and the OAS is built on top of HTTP. The OAS is implemented as an ISAPI script for Internet Information Server. The following pages gives the definition of all requests accepted by the OAS.

2.1 Category/Vdoc Manipulation 2.1.1 GetVdocCategories

This request allows client applications to retrieve the list of Vdoc categories.

Syntax http://server_address/ . . . /oas.dll?GetCategories server_address: Address of the web server hosting the OAS service Parameters This request has no parameters.

Response

The MIME response type is text/plain. The response contains XML formatted data. The corresponding DTD is specified in more detail in Section XVIII.

2.1.2 AddNewVdocCategory

This request allows client applications to add a new Vdoc category. They must specify a name, a description and the parent category identifier.

Syntax http://server_address/.../oas.dll?AddNewVdocCategory?Name&Description&ParentCategoryID server_address: Address of the web server hosting the OAS service Parameters Name: Name of the category Description: Description of the category ParentCategoryID: Parent category identifier Response The MIME response type is text/plain. It contains the unique identifier of the new Vdoc category.

2.1.3 DeleteVdocCategory

This request allows client applications to delete a Vdoc category.

Syntax http://server_address/.../oas.dll?DeleteVdocCategory?CategoryID server_address: Address of the web server hosting the OAS service Parameters CategoryID: Identifier of the Vdoc category Response The MIME response type is text/plain. It contains an error code.

2.1.4 SetVdocCategoryName 2.1.5 GetVdocFromCategory 2.1.6 SetVdocToCategory 2.1.7 UnAssignvdocFromcategory 2.2 Vdoc/Media Manipulation 2.2.1 GetMediaFromVdoc IX. The Obvious Asset Server 1 Concepts The Obvious Asset Server has 2 roles:

1) Archiving media files

2) Hosting the video analysis engine 1.1 Archiving

Media files are typically created on client machines, with video acquisition cards, sound cards, closed-caption devices etc. One a media file is ready for . . .

1.2 Video Analysis

The Video Analysis and Measuring Tool (VAMT) allows fast video analysis of a media. Its current features allows automatic detection of scene changes on AVI, QT and MPEG files.

The goal of the VAMT is to analyse and gather various spatial and time related information from a video sequence. Its goal is not to find cuts. The VAMT process must be seen as a pre-processing step. The decision step is application dependant. For example, two different application may use the same results of the VAMT and interpret them differently, thus providing 2 completely different segmentations of the media.

The separation of the pre-processing step from the decision step is very important in the Obvious architecture. It ensure the reusability of the analysis processes (preserving time consuming analysis in applications where several different OBVIs may be built from the same source media). This features also allows to reinterpret at any time the measures collected during the pre-processing step, allowing for example the user to add or remove blocks. The addition and removal of blocks is simply a matter of reinterpreting the VAMT results with a different threshold.

The VAMT is designed to run on large amount of data. It is also designed to be used in parallel on multiples media sources. A special module called the VAMT Manager has been designed for handling multiple video analysis jobs. External applications (on the same machine or on remote locations) can access the VAMT Manager and perform the following tasks:

Create a new job

Setup the properties of a job

View the list of active jobs

Delete a job

Start/Pause a job

Get the results of a job

A job is defined as the process of analyzing a given media instance, from a timecode in to a timecode out. A media instance is uniquely identified by two identifiers VdocID and MediaID.

Several jobs can be ran in parallel. In addition, the current architecture defines a way for transparently using different VAMT algorithms and flavours.

2 Implementation

The implementation involves 3 modules:

1) The VAMT Engine

The core video analysis module.

2) The VAMT Service

This is a Windows NT Service that manages concurrent analysis jobs.

3) The VAMT Manager

This is the GUI from which a user remotely administrates and controls of the VAMT Service.

This module is NOT used in normal use of the system. It has been developed for demonstrating and testing the features of the VAMT Service.

2.1 VAMT Engine

The core engine of the VAMT is implemented as an DirectShow filter. Thus, it can be used to parse any file format recognised by the DirectX Media architecture. An improved version for the Pentium III processor is available. By using SIMD instructions for the comparison of image pixels, an improvement ratio of 70% can be achieved.

The current implementation of the VAMT works on the pixel domain. It handles the decoded frame buffer of a rendering chain for its computations. Future versions of the VAMT will handle specific file formats such as MPEG for rapid extraction of spatial and/or time related information.

The DirectShow filter implementing the VAMT is called vamt.ax. The Pentium III version is available in vamtkatmai.ax. Since these filters act as COM objects, they present a custom interface that can be used from a container application to control the behaviour of the filter. This COM interface is called IVAMTCustom and is described below.

GUID: E9BBBA41-77E7-11d1-9A81-000040409595

Methods

HRESULT GetMeasures(

[out] DWORD* pBuffer,

[out] unsigned int* pNumDiffs);

HRESULT Configure(

[in] VOID* pConfigData);

This method allows container applications to configure the VAMT Engine.

HRESULT NewAnalysis( );

Future versions of the VAMT Engine (MPEG domain processing for example) will also be encapsulated as DirectShow filters. That will allow a complete compatibility between different VAMT Engine implementations.

Any VAMT Engine implementation must:

be implemented as a DirectShow filter implement the IVAMTCustom interface must calculate a distance or a pseudo-distance between each pair of consecutive frames A container application that wants to use the VAMT Engine must first create a rendering chain containing the VAMT Engine filter.

2.2 VAMT Service

Figure 21:
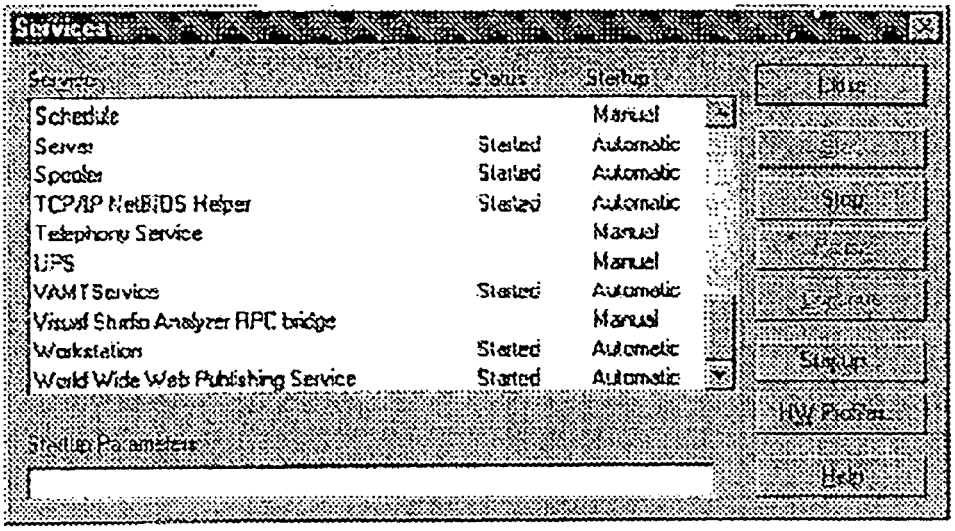
FIG. 21 is an example of a screen shot for providing Video Analysis and Measuring Tool (VAMT) Services.

The VAMT Service is implemented as a Windows NT service, as shown in FIG. 21.

The VAMT Service has 2 operating modes.

The first one is automatic: the VAMT Service is configured to scan a given directory structure on the local file system, take all video files and analyse them. The results of the analysis are automatically stored in the OIS database. The second mode has been developed for demonstration and testing purposes. It is NOT used in normal operations. It will be described here because it gives a good understanding of the internal structure of the VAMT Service.

2.2.1 First Operating Mode (Normal)

The Windows registry contains a list of directories that must be scanned by. The administrator can edit this list of directories by using the VAMT Manager, described in next pages. Each directory is scanned for recognised media files: MPEG, AVI and MOV. Each media file must correspond to a description file. The description file is an XML file that contains various information necessary for the analysis:

The algorithm type

The algorithm type is used to select the appropriate VAMT Engine, i.e. the appropriate DirectShow filter that implements the core analysis process.

The analysis range (first frame and last frame numbers)

The analysis range tells which part of the video should be analysed.

The corresponding Vdoc and Media identifiers

The Vdoc and Media identifiers allow the VAMT Service to populate the OIS database with the results of the VAMT analysis.

The description file is generated by the Obvious Management Console, when the user creates a new Media entry. The original media file and the description file are uploaded via FTP to one the Obvious Asset Manager machine.

2.2.2 Second Operating Mode (Testing Only)

The VAMT Service opens a TCP/IP socket and listens for incoming connections. The protocol used for controlling the VAMT Service is described below.

For each request sent by the client application, a TCP/IP connection must be open to the VAMT Service. On that connection, a binary-formatted message describing the request is sent. Once processed by the VAMT Service, a response message is sent back to the client application and the TCP/IP connection is dropped.

Each request is identified by a code. The possible code values are:

| | |
|---|---|
| #define REQ_ADD_JOB | 0#define REQ_GET_NB_JOB |
| 1#define REQ_GET_JOB_INFO | 2#define REQ_REMOVE_JOB |

-continued

```
3#define REQ_GET_JOB_RESULT     4
#define REQ_SET_JOB_PRIORITY    5
```

The following structures describe, for each type of request, the binary message that must be sent by a client application to the VAMT Service. Every structure has a vType field that contains one of the predefined REQ_ constants.

Adding a New Job struct _TRequestAddJob{UCHAR vType; DWORD vMediaID; UINT vFirstFrame; UINT vLastFrame;};typedef struct _TRequestAddJob TRequestAddJob;

This structure represents the request for adding a new job. Each job is defined by a VdocID, a MediaID and a range (first frame and last frame of the analysis). The VdocID and the MediaID fields uniquely define a specific video file.

Retrieving the Number of Jobs

// TRequestGetNbJobstruct _TRequestGetNbJob{UCHAR vType;};typedef struct _TRequestGetNbJob TRequestGetNbJob;

This structure describes the binary message that allows a client application to retrieve the current number of jobs.

// TRequestGetJobInfostruct _TRequestGetJobInfo{UCHAR vType; long iJob;};typedef struct _TRequestGetJobInfo TRequestGetJobInfo;

A client application must send this message for retrieving the settings of a particular job. Each job is referenced by an index, starting at 0. The total number of jobs can be retrieved by using the previous request.

Removing a Job struct _TRequestRemoveJob{UCHAR vType; DWORD hThread;

};typedef struct _TRequestRemoveJob TRequestRemoveJob;

Retrieving the Results of a Job struct _TRequestGetJobResult{UCHAR vType; DWORD vMediaID; UINT vFirstMeasure; UINT vLastMeasure;

};

typedef struct _TRequestGetJobResult TRequestGetJobResult;

This structure describes the binary message that must be used to retrieve the results of a job. The results of a job are constituted by a set of measures. For a media containing N frames, there is N-1 measures. It is possible to request for a subset of the available measures. In that case, vFirstMeasure and vLastMeasure contain the starting and the ending indexes of the requested measures. If vFirstMeasure and vLastMeasure contain 0, then all the measures are retrieved.

Setting the Priority of a Job struct _TRequestSetJobPriority{UCHAR vType; HANDLE hThread;

int vThreadPriority; // 0=highest, 1=normal, 2=lowest};typedef struct _TRequestSetJobPriority TRequestSetJobPriority;

2.3 VAMT Manager

Figure 22:
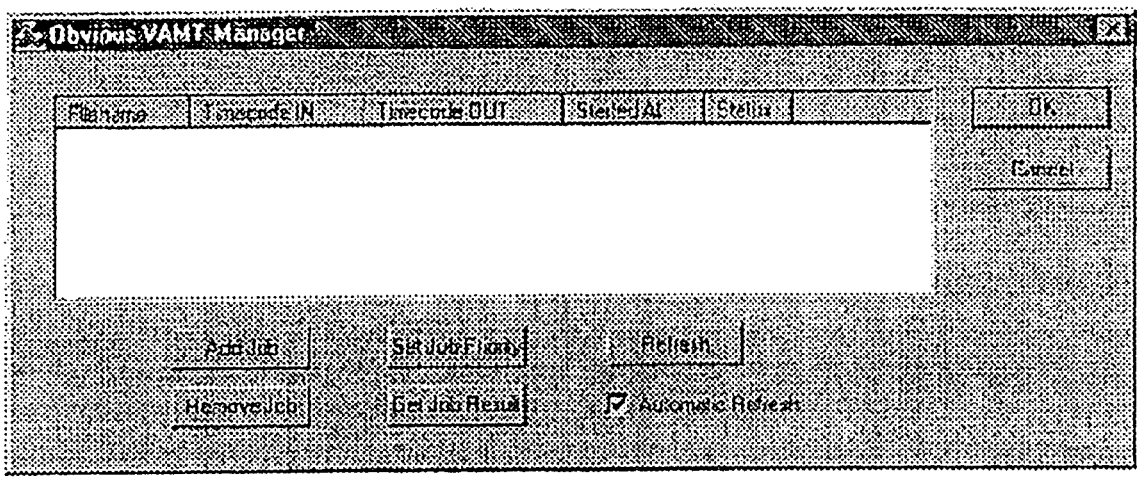
FIG. 22 is an example of a screen shot of an interface with a VAMT Manager.

The VAMT Manager is the client application that can be used for driving the VAMT Service from a remote location. It is implemented in Visual C++ with the MFC library. FIG. 22 displays the main graphical user interface of the VAMT Manager. From this simple interface, a user can remotely control the VAMT Manager, starting and removing jobs.

As explained above, this operating mode is NOT used during normal operations. The VAMT Service is supposed to be autonomous and does not need the manual creation of analysis jobs. However, the VAMT Manager can be useful in many situations.

The list displays the current jobs. Each job is represented by:

the corresponding filename a timecode in and a timecode out the time at which the job started the status of the job (running, paused, error)

Figure 23:
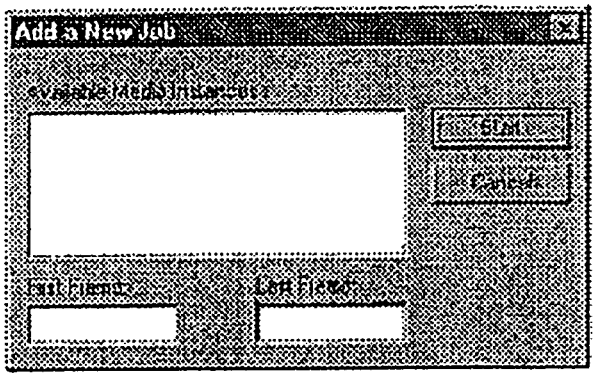
FIG. 23 is an example of a screen shot for adding a new job with the VAMT Manager.

When the user clicks on the Add button, the window in FIG. 23 appears. This window allows the user to select a pre-registered media to be analyzed. The user can also define the analysis range by entering the first frame number and the last frame number.

Figure 24:
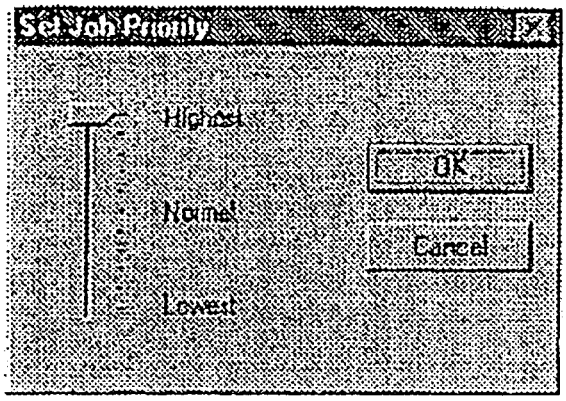
FIG. 24 is an example of a screen shot for setting a job priority with the VAMT Manager.

When the user clicks on the Set Job Priority button of the main interface, the window in FIG. 24 appears. This window allows the user to modify the priority of the selected job.

X. The Obvious Indexing System

The Obvious Indexing System (OIS) is the database technology used for managing and indexing all the objects of the system: machines, video, media, video servers, OBVIs, Obvious Media Servers, Obvious Site Managers, etc. Its is global repository for registering these objects. As explained above, the OIS is the central component of the Obvious Network Architecture.

1 Concepts 1.1 Vdoc and Media

A Video Document (Vdoc) is the format-independent concept of a video. Any physical copy of a Vdoc, in whole or in part, is called a Media, regardless of the copy's format. For example, from a Vdoc representing a TV movie, you can create 3 media:

a BetaSP copy of the whole program a MPEG stream corresponding to the encoding of the first 45 minutes of the program an AVI file corresponding the last 10 minutes of the program 1.2 Timecode The OIS architecture handles drop frame and non drop-frame (29.97 fps) SMPTE timecodes. For non drop-frame SMPTE, the string representation of the timecode is HH:MM:SS:FF. For drop frame SMPTE, a semi-colon is used (HH:MM:SS;FF)

1.3 Annotation and Stratification

The basic process of annotation involves the creation of a relationship between a media chunk and a description. A media chunk is described by two timecodes. The description can be a combination of:

Text

Graphic

Audio

Video

A stratum is a logical group of annotated chunks. All annotated chunks in a stratum share a same semantic. For example, a Who stratum may be constituted by a set of annotated chunks describing the persons present in the video. The What stratum describes the objects present in the video. The process of stratification i.e. the process of creating various strata, can occur at the user interface level (manual annotation) or as a result of a computerised process (object tracking, speaker identification, etc.).

The stratification process can occur as many times as necessary, for a particular application. New strata correspond to new entries in the OIS repository. As users create annotations, new users and automated processes can select media chunks of interest with ever-increasing precision.

2 Schemas

The OIS database is composed of 4 schemas.

2.1 Video Schema

This schema concerns the management and the cataloging of video documents and corresponding media. The OMS is the main component that uses this schema.

2.2 OBVI Schema

This schema concerns the management and the indexing of OBVIs. Published and indexed OBVIs are stored in this schema. The OMS is the main component that uses the OBVI Schema.

2.3 Access Control Schema

This schema concerns the access control facilities in the system. The OSM is the main component that uses this schema.

2.4 Replication Schema

This schema contains database objects that are related to the replication features. The OSM is the main component that uses this schema.

3 Oracle 8

The Obvious Indexing System is based on Oracle 8. Its advanced features for object management, content indexing, security and replication make it a good choice for supporting the core database technology of the OIS. Several extension modules called Cartridges can be used to add new features to the core Oracle database system. In particular, the Obvious Network Architecture extensively uses the Context Cartridge for implementing full search capabilities on OBVI annotations.

4 Database Schema Objects

The following pages describe all the database schema objects that have been defined in the OIS. These database schema objects concern the four schema previously defined . . . Users, tables and sequences.

Tables in the OIS database use only 4 built-in datatypes: NUMBER, VARCHAR2, CLOB, DATE. For more details about these type definitions, refer to the Oracle 8 documentation. Porting to another database environment should be easy for NUMBER, VARCHAR2 and DATE. Concerning the CLOB datatype it can be emulated by using a raw binary datatype.

An * symbol is used to show table columns that are part of a primary key.

4.1 Video tables 4.1.1 VDOC

The VDOC table is the base registry for each video program stored in the database. Usually, there is one row per video program in this table no matter how many media (formats or copies) of the video program exist. Each video document is uniquely identified by a VideoID. It has a title, a description and is associated with a category.

| Field | Type | Description |
|---|---|---|
| VideoID* | NUMBER | Unique Identifier |
| Title | VARCHAR2 | Title of the Vdoc |
| Description | VARCHAR2 | Description of the Vdoc |
| CategoryID | VARCHAR2 | Category identifier |
| Proxy | VARCHAR2 | Proxy |

A Vdoc can be associated to a category. The CategoryID field is used to store the identifier of the category to which the Vdoc belongs.

4.1.2 VDOCCATEGORY

The VDOCATEGORY table is used to set a category to each video document. The categories are structured as a tree. Each category may have sub- categories and a parent category.

| Field | Type | Description |
|---|---|---|
| CategoryID * | NUMBER | Unique Identifier |
| Name | VARCHAR2 | Name of the category |
| Description | VARCHAR2 | Description of the category |
| ParentCategoryID | NUMBER | Parent category identifier |

A Vdoc can be associated to a category. A category may contain sub categories. Categories can be represented by a tree This table describe the hierarchy of categories. Each category has a unique identifier, a name and a paren category id. The parent category identifier allows a tree representation of the categories. The CategoryID of the root of the tree is 0. If a category has no sub categories, than ParentCategoryID must be 0.

Categories are defined by high level applications. A user interface . . .

4.1.3 MEDIA

The MEDIA table contains general physical attribute for each Media instance in the system. This table characterizes the various video media either digital or analogic. TheVideoID value is taken from the VDOC table. The MediaDerived field indicates the source status of the Media. It equals zero if the Media is a source, otherwise the MediaID that this Media is issued from. The Offset field is used if there is just a partial copy of the video program.

| Field | Type | Description |
|---|---|---|
| MediaID* | NUMBER | Unique Identifier |
| VideoID* | NUMBER | Unique video document ID |
| Name | VARCHAR2 | Name of the Media |
| StandardID | NUMBER | Standard Identifier |
| FormatID | NUMBER | Format Identifier |
| FrameRate | NUMBER | Frame rate in frames/sec |
| MediaDerivedID | NUMBER | Source media ID or 0 if source |

4.1.4 DMEDIA

Each Media instance is referenced by at least one row in the MEDIA table. In addition, it has an additional row in DMEDIA table if it is a digital instance (compressed).

| Field | Type | Description |
|---|---|---|
| MediaID * | NUMBER | Media Identifier |
| VideoID * | NUMBER | Vdoc Identifier |
| VcodecID | NUMBER | Not used yet |
| AcodecID | NUMBER | Not used yet |
| Fwidth | NUMBER | Frame width in pixels |
| Fheight | NUMBER | Frame height in pixels |
| Location | VARCHAR2 | Full location path |
| Datasize | NUMBER | Size in megabytes of the Media file |
| When | DATE | Creation date |
| VamtLocation | VARCHAR2 | Vamt file title and extension |
| IPFLocation | VARCHAR2 | Image Proxy File title and extension |

4.1.5 FORMAT

The FORMAT table lists video formats. Each format is uniquely represented by an identifier. Identifier values between 1 and 999 are reserved and are the same for all sites. They correspond to industry standard formats. Values greater than 1000 can be freely added and customized.

| Field | Type | Description |
|---|---|---|
| FormatID * | NUMBER | Unique Identifier |
| Name | VARCHAR2 | Format name |
| Description | VARCHAR2 | Format description |

The following shows the default data installed in the FORMAT table.

| FormatID | Name | Description |
|---|---|---|
| 1 | Unknown | Unknown format |
| 2 | D-1 | D-1 |
| 3 | D-2 | D-2 |
| 4 | D-3 | D-3 |
| 5 | VHS | VHS |
| 6 | Hi-8 | Hi-8 |
| 7 | 8 mm | 8 mm |
| 8 | S-VHS | S-VHS |
| 9 | Film | Film |
| 10 | BetaSP | BetaSP |
| 11 | BetaSP-30 | BetaSP-30 |
| 12 | BetaSP-60 | BetaSP-60 |
| 13 | AVI | AVI format |
| 14 | MPEG | MPEG format |
| 15 | QT | QuickTime format |
| 16 | Compressed | Compressed |

4.1.6 STANDARD

The STANDARD table lists video standards.

| Field | Type | Description |
|---|---|---|
| StandardID * | NUMBER | Unique Identifier |
| Name | VARCHAR2 | Standard name |
| FrameRate | NUMBER | Not used yet |
| LinesPerFrame | NUMBER | Not used yet |
| VisibleLines | NUMBER | Not used yet |

The following shows the default data installed in the STANDARD table:

| StandardID | Name | FrameRate | LinesPerFrame | VisibleLines |
|---|---|---|---|---|
| 1 | Unknown | NULL | NULL | NULL |
| 2 | NTSC | 29.97 | 525 | 483 |
| 3 | SECAM | 25.0 | 625 | 576 |
| 4 | D-SECAM | 25.0 | 625 | 576 |
| 5 | K-SECAM | 25.0 | 625 | 576 |
| 6 | L-SECAM | 25.0 | 625 | 576 |
| 7 | PAL | 25.0 | 625 | 576 |
| 8 | PAL-M | 29.97 | 525 | 483 |
| 9 | PAL-N | 25.0 | 625 | 576 |
| 10 | PAL-B | 25.0 | 625 | 576 |
| 11 | PAL-G | 25.0 | 625 | 576 |
| 12 | PAL-H | 25.0 | 625 | 576 |
| 13 | PAL-I | 25.0 | 625 | 576 |

4.1.7 VIDEOSTREAM

A Media can be associated to any number of streams. The VIDEOSTREAM table gives, for each Media identified by a MediaID, the list of corresponding streams. These streams are identified by a unique number. The Filename field contains the name and the extension of the corresponding stream.

| Field | Type | Description |
|---|---|---|
| StreamID * | NUMBER | Unique Identifier |
| MediaID * | NUMBER | Media Identifier |
| VideoID * | | Vdoc Identifier |
| Name | VARCHAR2 | Stream name |
| Description | VARCHAR2 | Stream description |
| BitrateMin | | Bitrate minimum |
| BitrateMax | NUMBER | Bitrate maximum |
| Filename | VARCHAR2 | Filename withoutpath |

4.2 OBVI tables 4.2.1 OBVICATEGORY

The OBVICATEGORY table represents the tree structure of OBVI categories. A category is defined by a unique identifier and a parent category identifier. For top levels categories, the parent category identifier must be equal to 0.

| Field | Type | Description |
|---|---|---|
| CategoryID * | NUMBER | Unique Identifier for the category |
| Name | VARCHAR2 | Name of the category |
| Description | VARCHAR2 | Description of the category |
| ParentCategoryID | NUMBER | Parent category identifier |

4.2.2 OBVI

This table is used for storing the mapping between OBVI files, OBVI identifiers and corresponding Vdoc/Media. Each indexed OBVI is associated to a unique identifier called ObviID. For each OBVI, this table gives the corresponding location of the OBVI file (as a URL) and the corresponding VdocID/MediaID to which the OBVI is bound.

| Field | Type | Description |
|---|---|---|
| ObviID * | NUMBER | Unique Identifier for the OBVI |
| VideoID | NUMBER | Vdoc identifier |

-continued

| Field | Type | Description |
|---|---|---|
| MediaID | NUMBER | Media identifier |
| Name | VARCHAR2 | OBVI name |
| Description | VARCHAR2 | OBVI description |
| ObviCategoryID | NUMBER | OBVI category identifier |
| ExportFlag | NUMBER | Export possibilities |

The ExportFlag field gives the export possibilities of a given OBVI. It can be a combination of the following masks:

0×01: the OBVI is exportable as OVI

0×02: the OBVI is exportable as XML

0×04: the OBVI is exportable as OSF 4.2.3 VERSION

The VERSION table is used for storing the OBVI versions. Each version is represented by a unique identifier. A version is defined by the OBVI identifier, the author name, a creation date and a parent version identifier. The ParentVersionID allows to tracks the list of versions for a each OBVI.

| Field | Type | Description |
|---|---|---|
| VersionID | NUMBER | Unique Identifier for the Version |
| ObviID | NUMBER | OBVI identifier |
| Author | VARCHAR2 | Author of the version |
| CreationDate | DATE | Creation date |
| OVIURL | VARCHAR2 | URL of the OVI file |
| XMLURL | VARCHAR2 | URL of the XML file |
| OSFURL | VARCHAR2 | URL of the OSF file |
| ParentVersionID | NUMBER | Identifier of the parent version |

4.2.4 STRATA

The STRATA table is a registry for the strata that are used to group annotations by content semantic. There must be one row per stratum in this table. Each strata is identified by a unique number.

| Field | Type | Description |
|---|---|---|
| StrataID * | NUMBER | Unique Identifier for the strata |
| Description | VARCHAR2 | Description of the strata |

The following shows the default data installed in the STRATA table:

| StrataID | Description |
|---|---|
| 1 | Who |
| 2 | What |
| 3 | Where |
| 4 | Free Annotation |
| 5 | Speech |

4.2.5 CHUNK

The CHUNK table gives the list of chunks. A chunk determines an annotated range in the video. It is defined by 2 timecodes.

| Field | Type | Description |
|---|---|---|
| ChunkID * | NUMBER | Unique Identifier for the chunk |
| TcIN | VARCHAR2 | Timecode In |
| TcOUT | VARCHAR2 | Timecode Out |

4.2.6 ANNOTATION

The ANNOTATION table stores all the annotations that have been set for the OBVIs.Each annotation is represented by a unique identifier and is associated to a strata and a chunk. The Text field contains the character data of the annotation. These data are indexed with the Oracle ConText Cartridge for full search capabilities. The Location field gives the URL of the annotation.

| Field | Type | Description |
|---|---|---|
| ObviID * | NUMBER | Unique Identifier for the Obvi |
| StrataID * | NUMBER | Strata identifier |
| ChunkID * | NUMBER | Chunk identifier |
| Text | CLOB | Indexed text of the annotation |
| Location | VARCHAR2 | Location of the annotation |

4.2.7 ANNOTFOROBVI

This table gives the mapping between OBVIs and annotations. Each version of a particular OBVI has a its own list of annotations. An annotation (represented by its unique identifier AnnotID) can be shared by several OBVIs or by several OBVI versions.

| Field | Type | Description |
|---|---|---|
| ObviID * | NUMBER | Unique Identifier for the Obvi |
| VersionID | NUMBER | Strata identifier |
| AnnotID | NUMBER | Chunk identifier |

4.2.8 BLOCK

This table gives the list of all OBVI blocks. A block is represented by a unique identifier, a timecode in and a timecode out. The hierarchy of blocks is handled by using the ParentBlockID.

| Field | Type | Description |
|---|---|---|
| BlockID * | NUMBER | Unique Identifier for the Block |
| TcIN | VARCHAR2 | Timecode In |
| TcOUT | VARCHAR2 | Timecode Out |
| ParentBlockID | NUMBER | Identifier of the parent Block |

4.2.9 BLOCKFOROBVI

This table lists the mapping between OBVI versions and Blocks. Each OBVI version has its own set blocks.

| Field | Type | Description |
|---|---|---|
| BlockID * | NUMBER | Unique Identifier for the Block |
| ObviID * | NUMBER | OBVI identifier |
| VersionID * | NUMBER | Version identifier |

4.2.10 FILTER

The FILTER table gives the mapping between OVI annotation types and the GUID of the corresponding filter that can be used for parsing.

| Field | Type | Description |
|---|---|---|
| FilterID * | NUMBER | Unique Identifier for the Filter |
| Name | NUMBER | Name of the filter |
| AnnotationType | NUMBER | Annotation type |
| Guid | VARCHAR2 | GUID of the COM object |

This table is used by the Obvious Publishing Engine, described in more detail below in Section XIII. During the publishing/indexing process, the Obvious Publishing Engine must parse each annotation of the OVI file for extracting raw text that can be indexed. The extraction is specific to the type of annotation (Wordpad, HTML, database, closed-captions, etc.) and is handled by an external filter (which is a COM object).

4.2.11 CONVERTER

The CONVERTER table gives the mapping between OVI annotation types and the GUID of the corresponding converter that can be used for converting the annotation into HTML.

| Field | Type | Description |
|---|---|---|
| FilterID * | NUMBER | Unique Identifier for the Filter |
| Name | NUMBER | Name of the filter |
| AnnotationType | NUMBER | Annotation type |
| Guid | VARCHAR2 | GUID of the COM object |

This table is used by the Obvious Publishing Engine, described in more detail below in Srction XIII. During the publishing/indexing process, the Obvious Publishing Engine must convert each annotation of the OVI file into HTML. The conversion mechanism depends on the type of annotation (Wordpad, HTML, database, closed-captions, etc.) and is handled by an external converter (which is a COM object).

4.3 Replication Tables 4.3.1 UNIT

The UNIT table is a registry for all the machines handled by a specific Obvious Site Manager. Each machine or unit is associated to a unique identifier.

| Field | Type | Description |
|---|---|---|
| UnitID * | NUMBER | Unique Identifier |
| IP | VARCHAR2 | Unit IP address |
| Name | VARCHAR2 | Unit name |
| Position | VARCHAR2 | Position of the unit |

The Position field contains the geographical position of the unit. This field is used by the Obvious Management Console and the Obvious Map (both described in Section XI) for displaying a map of all units/services in a given site. The format of the Position field is: X/Y where X is the latitude and Y the longitude. Latitudes and longitudes are given in degrees, as a floating-point number. Longitude is positives (+) for East of Greenwich (Europe), negative (−) for West (as in USA). Latitude is positive (+) for North of the equator, negative (−) for South. (For example −77.10 for 77 degrees 06 minutes West longitude).

4.3.2 SERVICE

The SERVICE table lists all the services handled by a specific Obvious Site Manager. At regular time intervals the OSM polls each service in this table for retrieving its load and updates the SERVICE table accordingly. At the same time, the Obvious Site Manager appends the same information into the STATOMS and the STATVS tables (see the description of these tables below).

| Field | Type | Description |
|---|---|---|
| ServiceID * | NUMBER | Unique Identifier |
| UnitID | NUMBER | Unit identifier |
| Type | NUMBER | OMS or VS |
| Name | VARCHAR2 | Service name |
| Protocol | VARCHAR2 | Protocol used |
| IP | VARCHAR2 | Unit IP |
| VirtualDir | VARCHAR2 | Unit Virtual Directory |
| FtpVirtualDir | VARCHAR2 | Ftp Virtual Directory |
| FtpLogin | VARCHAR2 | Ftp login |
| FtpPassword | VARCHAR2 | Ftp password |
| Load | NUMBER | Loading Balance |

4.3.3 DUPOMS

The DUPOMS table is an OMS replication table. For a given VideoID and a MediaID, it indicates all the units on which this Media exists.

| Field | Type | Description |
|---|---|---|
| VideoID * | VARCHAR2 | Vdoc identifier |
| MediaID * | VARCHAR2 | Media identifier |
| UnitID | NUMBER | Unit identifier |

4.3.4 DUPVS

The DUPVS table is a VS replication table. For a given StreamID, it indicates all the VS UnitID's where the Stream can be found.

| Field | Type | Description |
|---|---|---|
| StreamID * | NUMBER | Stream identifier |
| MediaID * | NUMBER | Media identifier |
| VideoID * | NUMBER | Vdoc identifier |
| UnitID | NUMBER | Unit identifier |

4.3.5 STATOMS

The STATOMS table is used to store load statistics of the OMS services.

| Field | Type | Description |
|---|---|---|
| UnitID * | NUMBER | Unique Identifier |
| Date | DATE | Self explanatory |
| Load | NUMBER | Load value |

4.3.6 STATVS

Same as STATOMS but concerning video servers.

| Field | Type | Description |
|---|---|---|
| UnitID * | NUMBER | Unique Identifier |
| Date | DATE | Self explanatory |
| Load | NUMBER | Load value |

4.4 Security Tables 4.4.1 USERACCOUNT

This tables defines the user accounts. For a given site, each user is represented by a unique identifier. The Obvious Network Architecture does not guaranty that user identifiers are unique through the whole set of sites. The password field contains a MD5 message digest of the user password. The system never stores the real password. For each user, the USERACCOUNT table also stores credential information concerning the administration of video, OBVI, replication, and security.

Créer plusieurs utilisateurs Oracle. Un pour chaque ensemble de tables. Les 4 derniers flags ne sont donc plus utilise!!!!!

Flags for the VideoAdmin field:

The VideoAdmin field can be one a combination of the following binary masks:

| Field | Type | Description |
|---|---|---|
| UserID | NUMBER | Unique Identifier |
| Login | VARCHAR2 | Login string |
| Password | VARCHAR2 | Password string (message direct) |
| Description | VARCHAR2 | Description of the user account |
| GroupID (A EFFACER !!!!) | NUMBER | Unique Identifier for the group |
| VideoAdmin | NUMBER | Flag for video administration |
| ObviAdmin | NUMBER | Flag for obvi administration |
| RepAdmin | NUMBER | Flag for replication administration |
| SecAdmin | NUMBER | Flag for security administration |

4.4.2 GROUPACCOUNT

This table stores the definition of groups. For a given site, each group has a unique identifier. The last four fields are identical to the last four fields of the USERACCOUNT table.

| Field | Type | Description |
|---|---|---|
| GroupID | NUMBER | Unique Identifier |
| Name | VARCHAR2 | Name of the group |
| Description | VARCHAR2 | Description for the group account |
| VideoAdmin | NUMBER | Flag for video administration |
| ObviAdmin | NUMBER | Flag for obvi administration |
| RepAdmin | NUMBER | Flag for replication administration |
| SecAdmin | NUMBER | Flag for security administration |

4.4.3 USERMAPPING

This table sets the mapping between users and groups. A user can be in several groups.

| Field | Type | Description |
|---|---|---|
| UserID | NUMBER | Unique Identifier for the user |
| GroupID | NUMBER | Unique Identifier for the group |

4.5 Site Tables

These tables are not available in all sites. They will be present on master sites, such as the Obvious Technology's site, that will host the site directory service (via the Obvious Site Directory server detailed in in more detail below in Section V).

4.5.1 SITE

The SITE table describes the available sites. Each site has a unique identifier. The CategoryID field must correspond to an entry in the SITECATEGORY table, described below. The Email field concern the email address of the administrator of the site. This email address is used by the OSM to automatically send monitoring information to the person responsible of the site. The Web field should contain the http address of the Web server of the company that holds the site.

| Field | Type | Description |
|---|---|---|
| SiteID | NUMBER | Unique Identifier |
| IP | VARCHAR2 | List of IP addresses for the OSMs |
| Name | VARCHAR2 | Name of the site |
| Description | VARCHAR2 | Description of the site |
| CategoryID | NUMBER | Identifier of the category |
| Email | NUMBER | Email |
| Web | NUMBER | Web address |

4.5.2 SITECATEGORY

The SITECATEGORY table represents the tree structure of site categories. A category is defined by a unique identifier and a parent category identifier. For top levels categories, the parent category identifier must be equal to 0.

| Field | Type | Description |
|---|---|---|
| CategoryID | NUMBER | Unique Identifier |
| Name | VARCHAR2 | Name of the category |
| ParentCategoryID | VARCHAR2 | Parent category identifier |

4.6 Sequences 4.6.1 OSequence

A Sequence object, as defined by Oracle 8, is used to generate unique identifiers for various purposes. In the OIS, one Sequence object is created for each database instance. This Sequence object is called OSequence and is created with the following SQL command:

CREATE SEQUENCE OSequence START WITH 1

4.7 Package

A Oracle package called OBVIPACKAGE has been created. It contains several stored procedures and functions internally used by several components.

4.7.1 Types Definitions 4.7.2 Stored Procedures

For more details on searching see Section XIV entitled OBVI Searching, two stored procedures are used: PROC_SEARCH and PROC_ADVSEARCH.

4.7.3 Functions

5 Installing the Obvious Indexing System 5.1 Creating the OIS database

Oracle 8 must be properly installed on the system. The following procedures describe how to create the OIS database and prepare Oracle 8 for hosting.

The easiest way to build the OIS database is to use the Oracle Database Assistant tool, provided with the standard installation of Oracle 8. The following Figures, denoted below, show how to parameter the OIS database. Another method is to use the provided SQL scripts that will automatically create and setup the OIS database.

Figure 25:
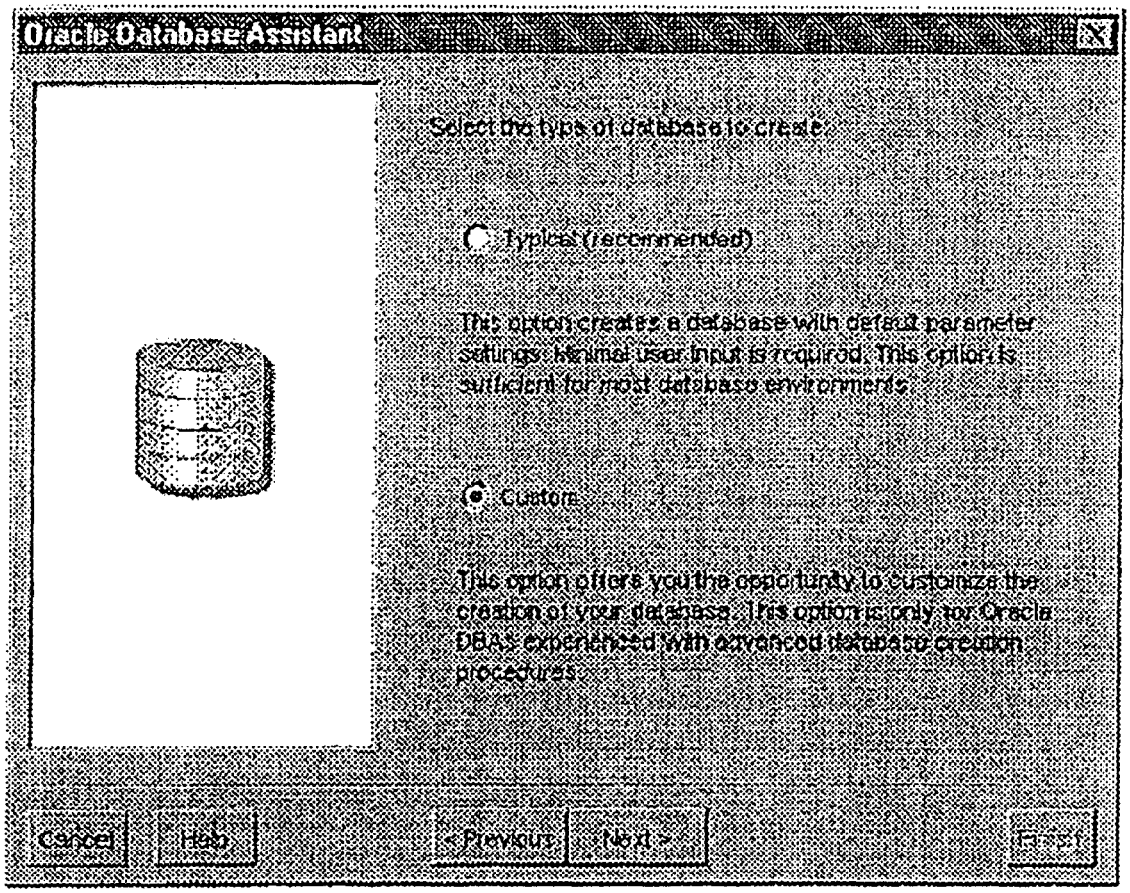
FIG. 25 is an example of a screen shot illustrating a first step in creating an OIS database.

Step 1—FIG. 25

The custom way of creating databases must be selected.

Figure 26:
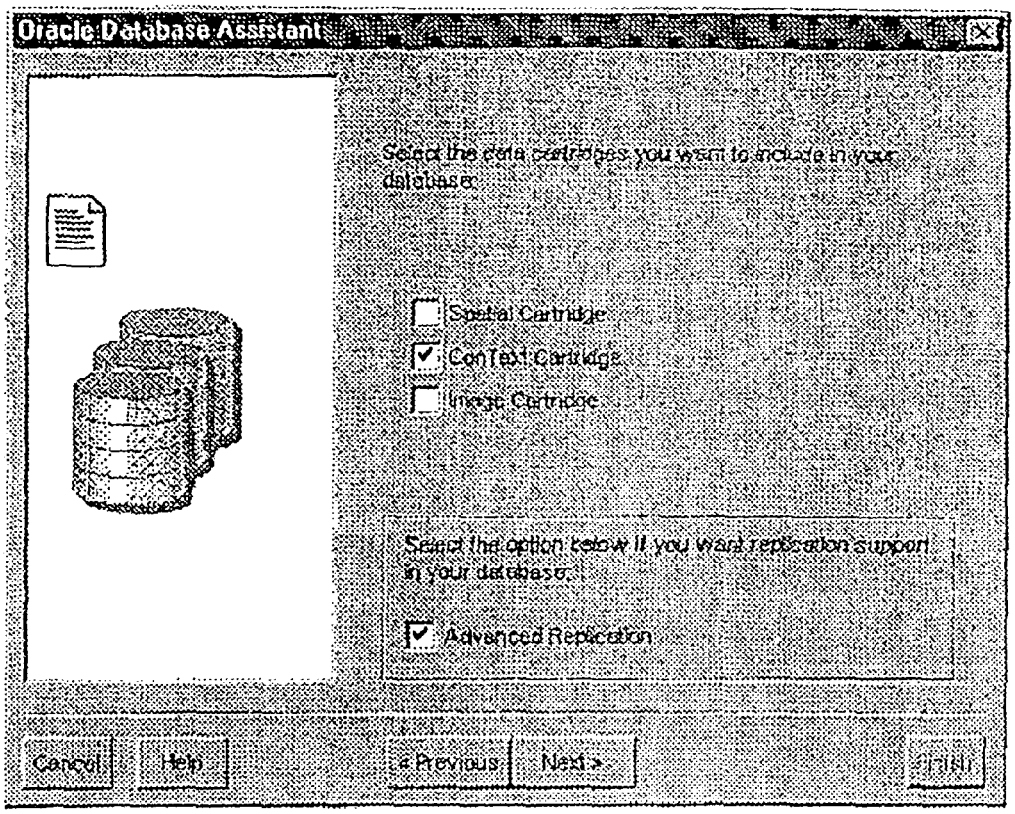
FIG. 26 is an example of a screen shot illustrating a second step in creating an OIS database.

Step 2—FIG. 26:

Select the ConText Cartridge if your are installing the indexing components. The Advanced Replication option must be selected.

Figure 27A:
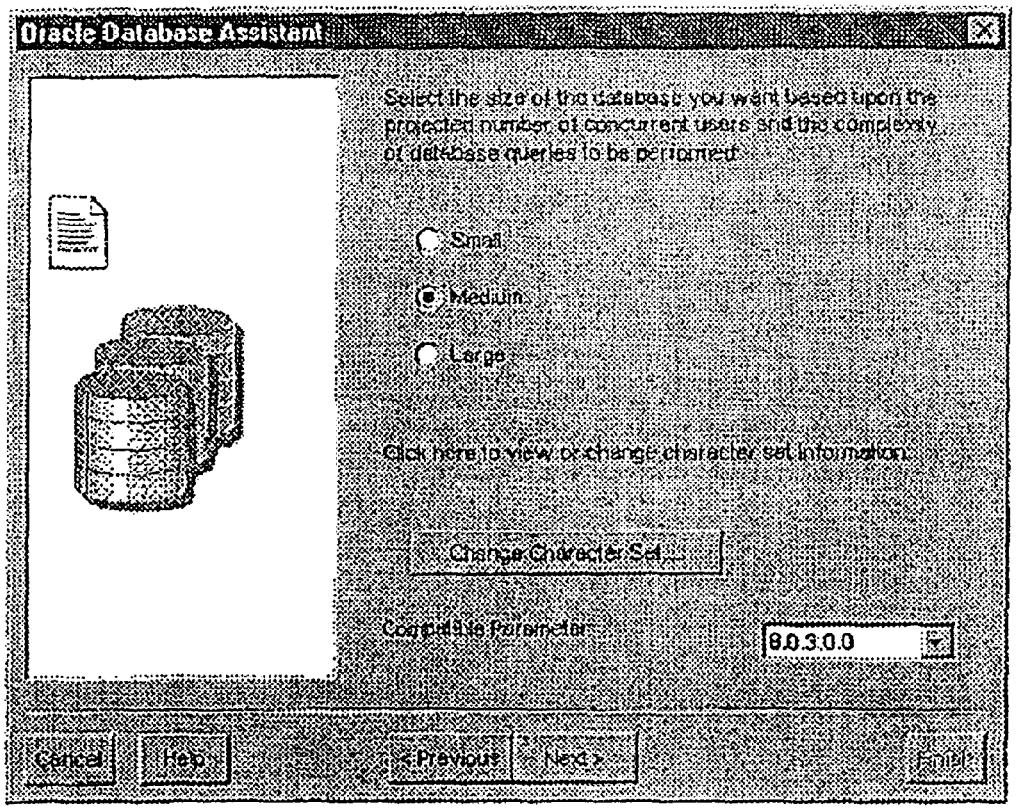
FIG. 27A is an example of a screen shot illustrating a third step in creating an OIS database.
Figure 27B:
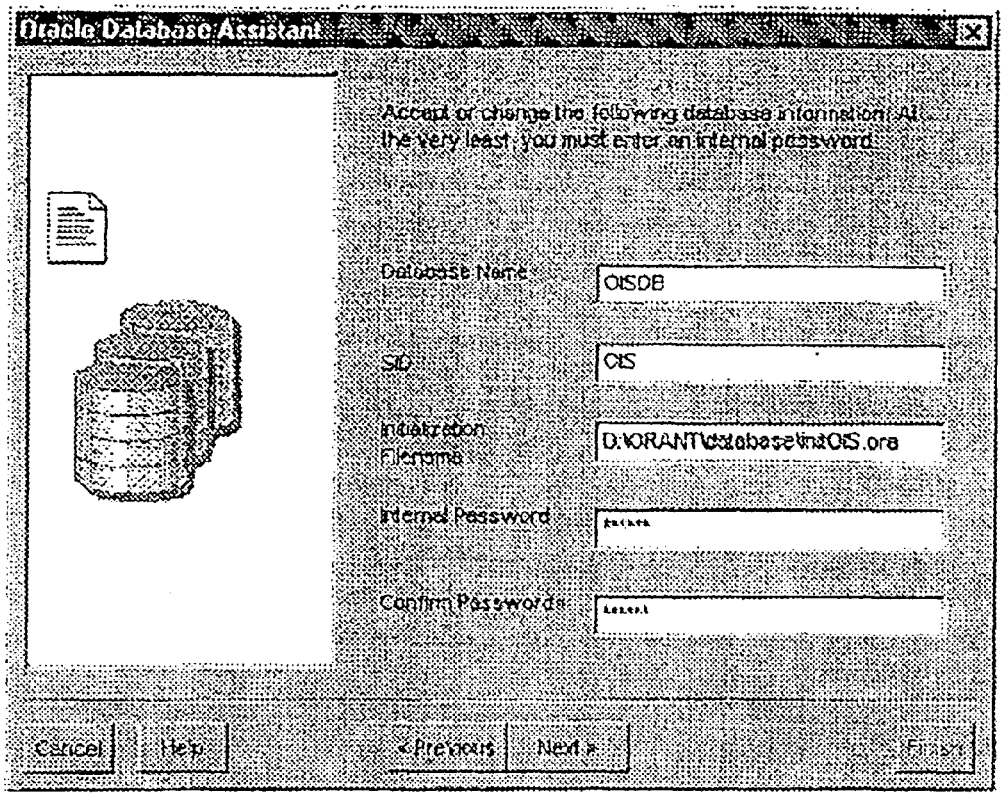
FIG. 27B is an example of a screen shot illustrating a fourth step in creating an OIS database.

Step —FIG. 27:

Select the size of the data base that you require.

Step 4—FIG. 27A:

The database name is OISDB. The SID must be OIS. The internal password can be freely defined.

Figure 28:
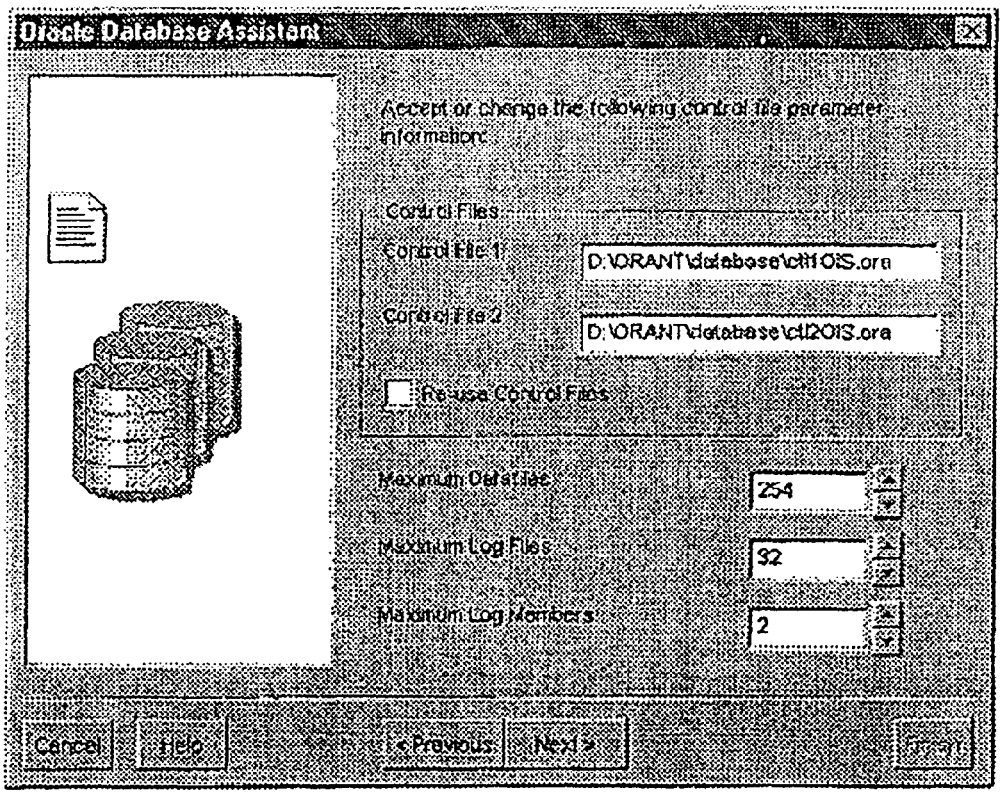
FIG. 28 is an example of a screen shot illustrating a fifth step in creating an OIS database.

Step 5—FIG. 28:

Data base options window.

Figure 29:
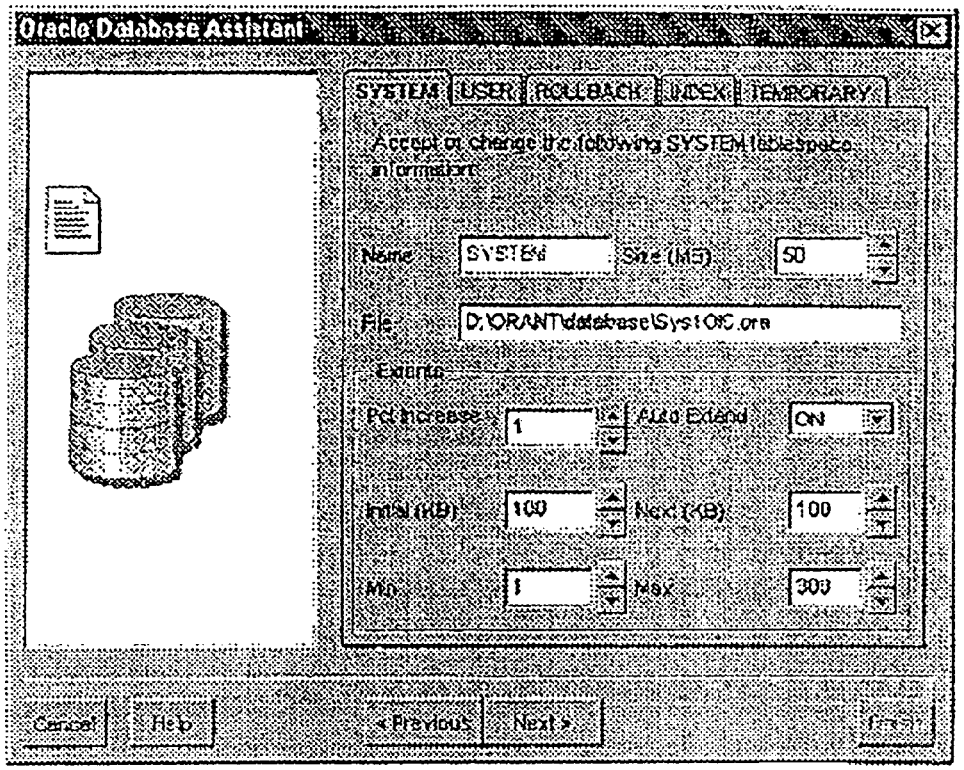
FIG. 29 is an example of a screen shot illustrating a sixth step in creating an OIS database.

Step 6—FIG. 29:

File parameters window

Figure 30:
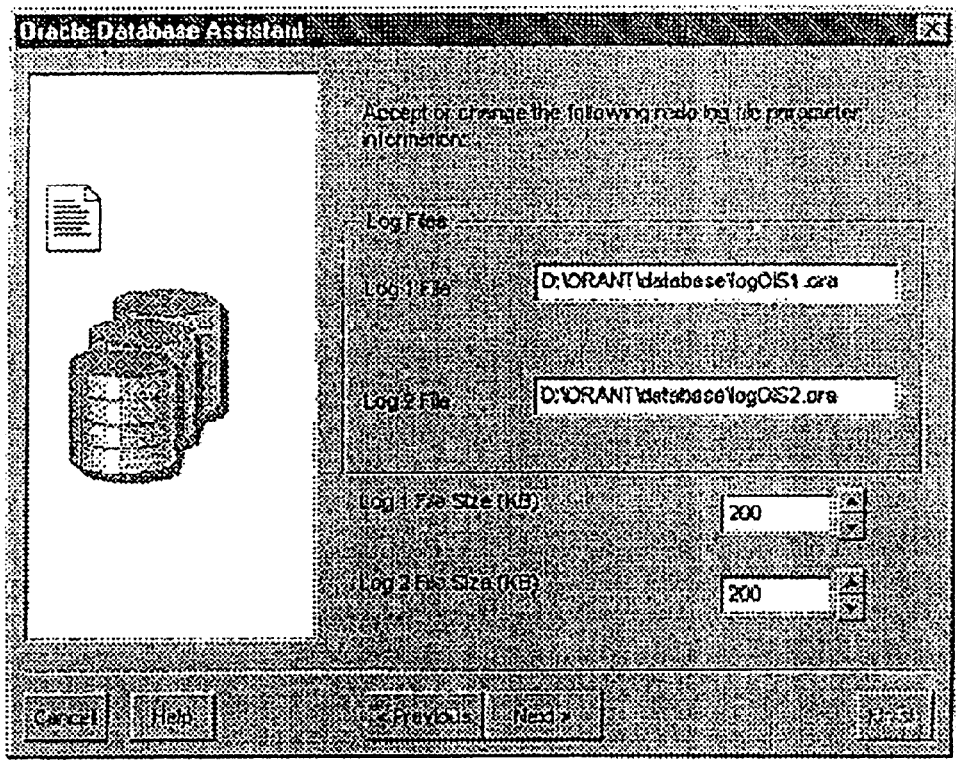
FIG. 30 is an example of a screen shot illustrating a seventh step in creating an OIS database.
Figure 31:
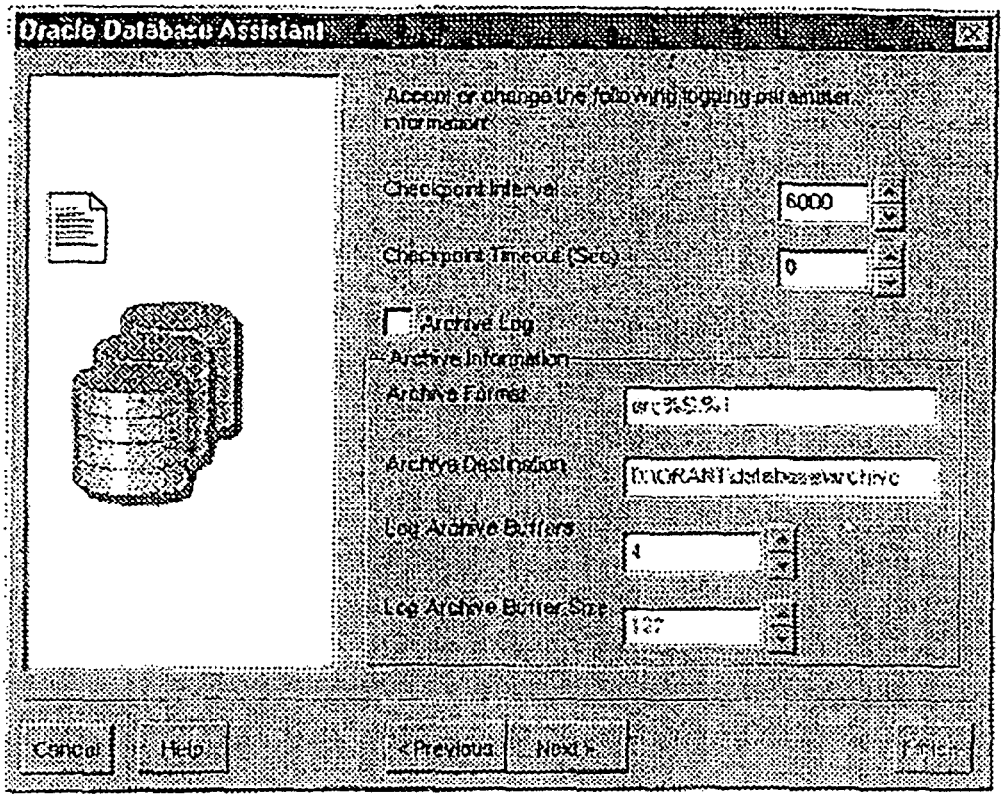
FIG. 31 is an example of a screen shot illustrating a eighth step in creating an OIS database.

Step 7—FIG. 30:

Step 8—FIG. 31

Figure 32:
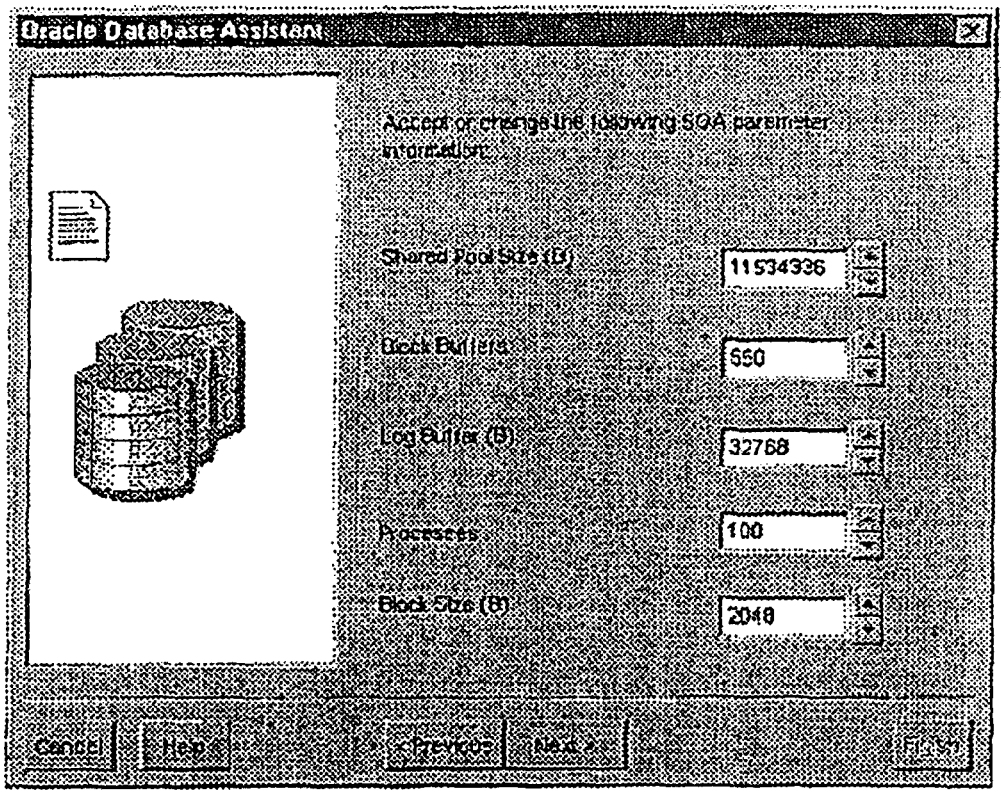
FIG. 32 is an example of a screen shot illustrating a ninth step in creating an OIS database.

Step 9—FIG. 32

Figure 33:
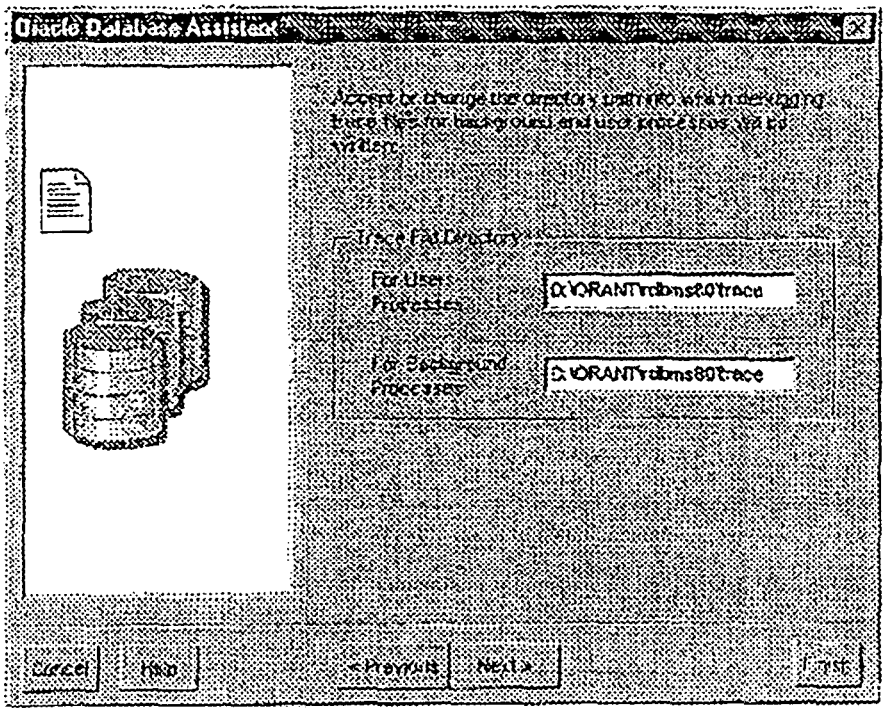
FIG. 33 is an example of a screen shot illustrating a tenth step in creating an OIS database.

Step 10—FIG. 33:

5.2 Adding ConText Support

ConText support is required for database instances that handle the OBVI schema. Others schemas do not require ConText support.

1) Run a ConText server

From the DOS prompt, start the ctxct180.exe utility

Type the following command:

```
START 1 QUERY DDL DML
```

Exit from the ctxct180.exe utility

2) Create the Policy

Type the following command:

```
EXECUTE CTX_DML.CREATE_POLICY
(
  PolicyName=>'OISPOLICY',
  ColSpec=>'ANNOTATION.TEXT',
  TextKey=>'AnnotID, StrataID, ChunkID'
)
```

3) Create the index

Type the following command:

```
EXECUTE CTX_DML.CREATE_INDEX
  ('OISPOLICY')
```

4) Create the result table

Type the following command:

```
CREATE TABLE SearchResult
(
  TextKey VARCHAR(64),
  TextKey2 VARCHAR(64),
  TextKey3 VARCHAR(64),
  Score NUMBER,
  Conid NUMBER
)
```

5.3 Installation of the OIS Distribution File

The OIS distribution files are available in a self-extractable archive called oisntb1.exe Executing this file will launch the Install Shield installation program. During installation, the following parameters are required:

Name of the OIS home directory:

5.4 Creation of the OIS Schemas

There are four schemas that can be installed on a specific OIS database instance. The choice of the schemas that have to be installed depends on the nature of the particular database instance that the administrator wants to install.

| Type of system | Schema to install |
|---|---|
| Hosting the Obvious Site Management<br>Hosting the Obvious jlkhkjhk | Security Schema |

Security Schema

For systems hosting the Obvious Site Management Component

Video & OBVI Indexing Schema

For systems hosting

It is possible to install all these schemas on the same system.

Scanners

The installation of the schemas is performed by a set of four SQL scripts:

1) CreateVideoSchema.sql

2) CreateObviSchema.sql

3) CreateAccessControlSchema.sql

4) CreateReplicationSchema.sql

These scripts are located in $OIS_HOME.\Scripts and can be executed with the SQL Worksheet utility, provided with Oracle 8. Upon completion, these scripts create logs files in the same directory. Check them for any error.

XI. Obvious Management Console

1 Concepts

The Obvious Management Console is the application that is used for administering the whole system. From a single graphical interface, the administrator of a site can browse for the different kinds of objects defined by the Obvious Network Architecture (Vdoc, Media, Groups, Users, Streams, Units, Services, etc.) and manage them.

These objects can be grouped into meaningful administration realms. For example, the video realm contains the Vdocs, Media and Streams objects. The security realm contains Groups and Users objects.

Each realm is graphically represented by a tree in the Obvious Management Console. Several realms can be displayed at the same time and can be dynamically added or removed.

Administration realms are not available for all user. Even if the Obvious Management Console is able to access and manage several realms, the user credentials will prohibit the access to specific realms. The installation procedure of the Obvious Management Console will also allow the configuration of the realms that can be administered from a particular machine.

2 Administration Realms

The following realms have been defined. They should cover most administration tasks in the current implementation of the system.

2.1 Site Realm

The site realm involves two kind of objects: SiteCategory and Site. A SiteCategory object may contain others SiteCategory objects and Site objects. The corresponding tree has 2 levels.

2.2 Security Realm

The security realm involves two kind of objects: Group and User. The corresponding tree has two levels. A group can contain several users and a user can be part of several groups. Depending on the preference of the administrator, the tree can show the groups at the first level and the users at the second level ore it can show the users at the first level and the groups at the second level.

2.3 Video Realm

The video realm involves four kind of objects: VdocCategory, Vdoc, Media and Stream. A VdocCategory object can contain others VdocCategory objects and Vdoc objects. A Vdoc object may contain several Media object. A Media object may contain several Stream objects. The corresponding tree can have 4 levels.

2.4 OBVI Realm

The OBVI realm involves two kind of objects: ObviCategory and Obvi objects. An ObviCategory object may contain ObviCategory objects and Obvi objects.

3 Site Map

Figure 34:
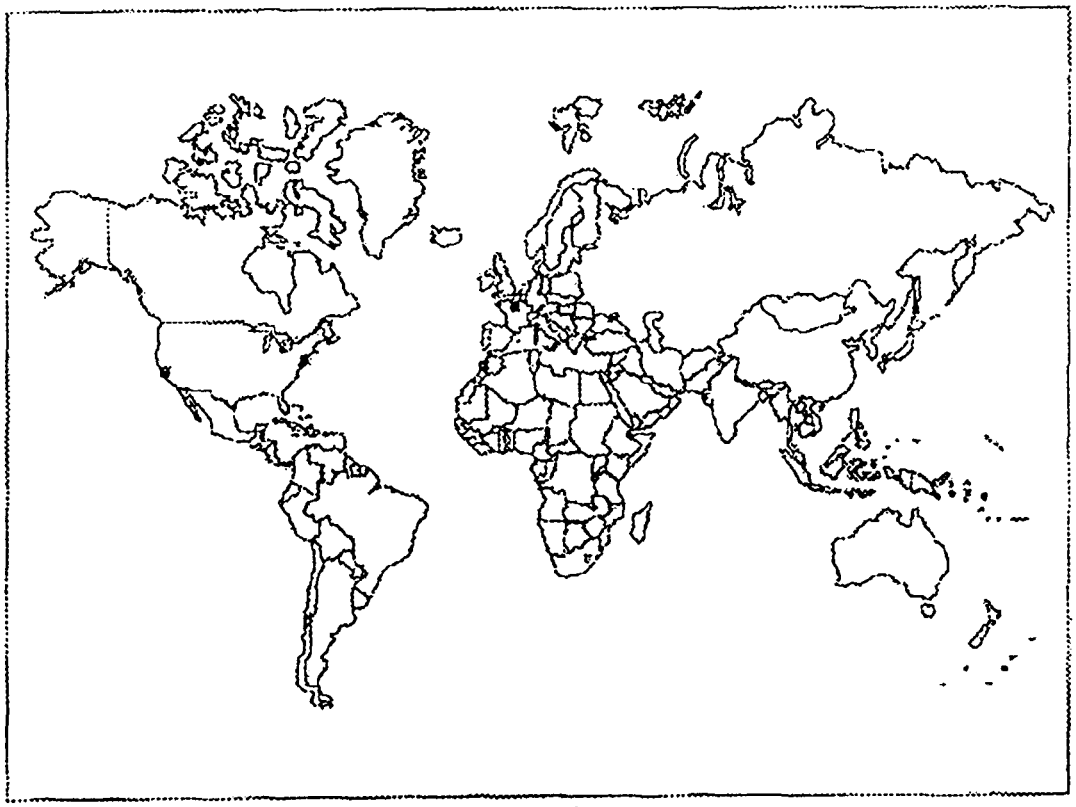
FIG. 34 is an example of a map showing locations of units and services involved in a specific site.

The Obvious Management Console can also display a geographical map showing the location of the units and services involved in a specific site. As shown in FIG. 34, units are represented by coloured squares. Each square may have several colours, one for each service. The OMS service is represented in red. The VS service is represented in blue.

This map tool is implemented as an ActiveX control called the Obvious Map and implemented in C++. It is currently used in the Obvious Management Console but it can be embedded in any other management application.

The user interface of the Obvious Map allows the user to manually define de 2D position of each unit with a simple drag and drop operation. The corresponding geographical coordinates are stored in the Position field of the UNIT table.

When the Obvious Map is launched, it connects to the OIS database via the Obvious Administration Server described in more detail in Section VIII for retrieving the configuration of a given site, in terms of units, services and replication information.

4 Implementation

The Obvious Management Console is currently implemented in C++/MFC. It offers an explorer-like graphical user interface: a left pane displays a hierarchy of objects and the right pane shows the details of a specific object. A new version is being implemented in VB and should offer the same level of functionalities.

Figure 35:
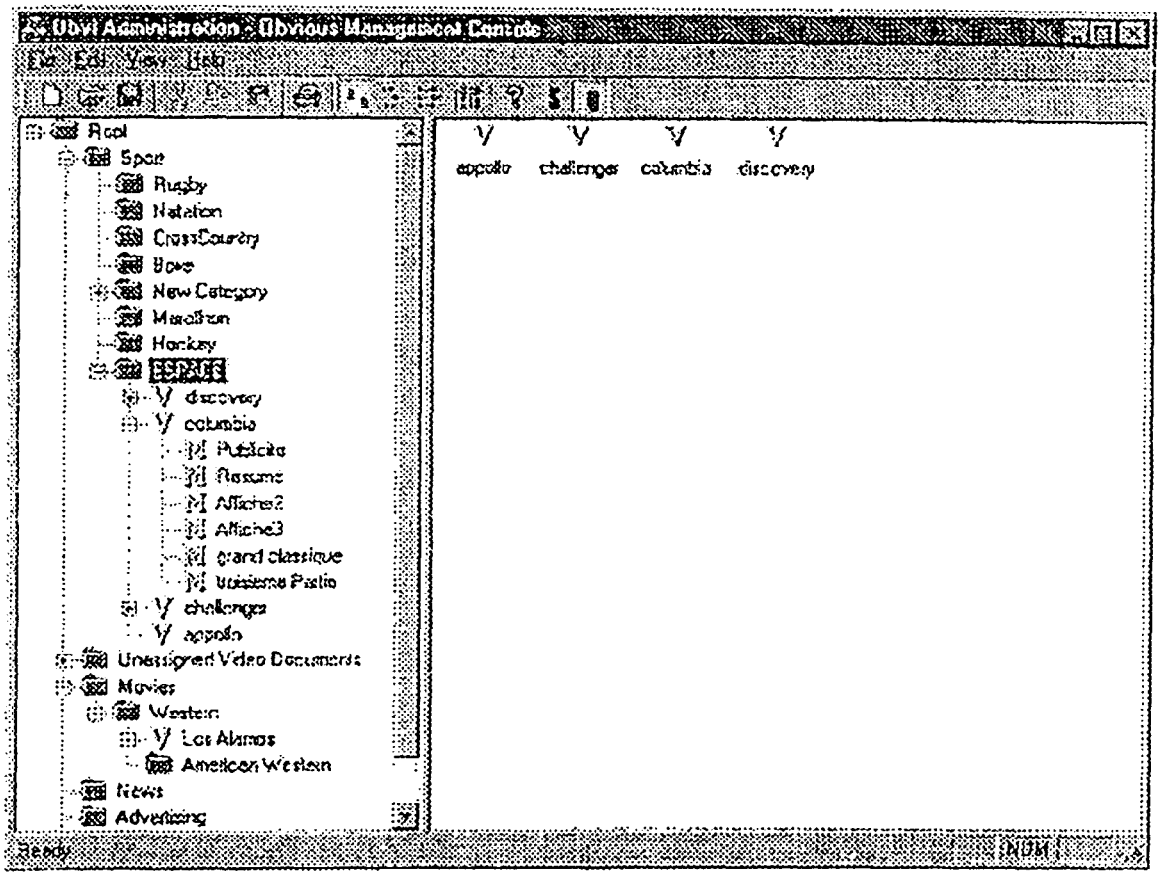
FIG. 35 is an example of a screen shot of an interface to an Obvious Management Console, and more particularly showing an administration session on a video realm.

FIG. 35 shows a screen shot of an administration session on the video realm. The left pane displays the hierarchy of Vdoc categories, Vdoc, Media and Streams objects.

Figure 36:
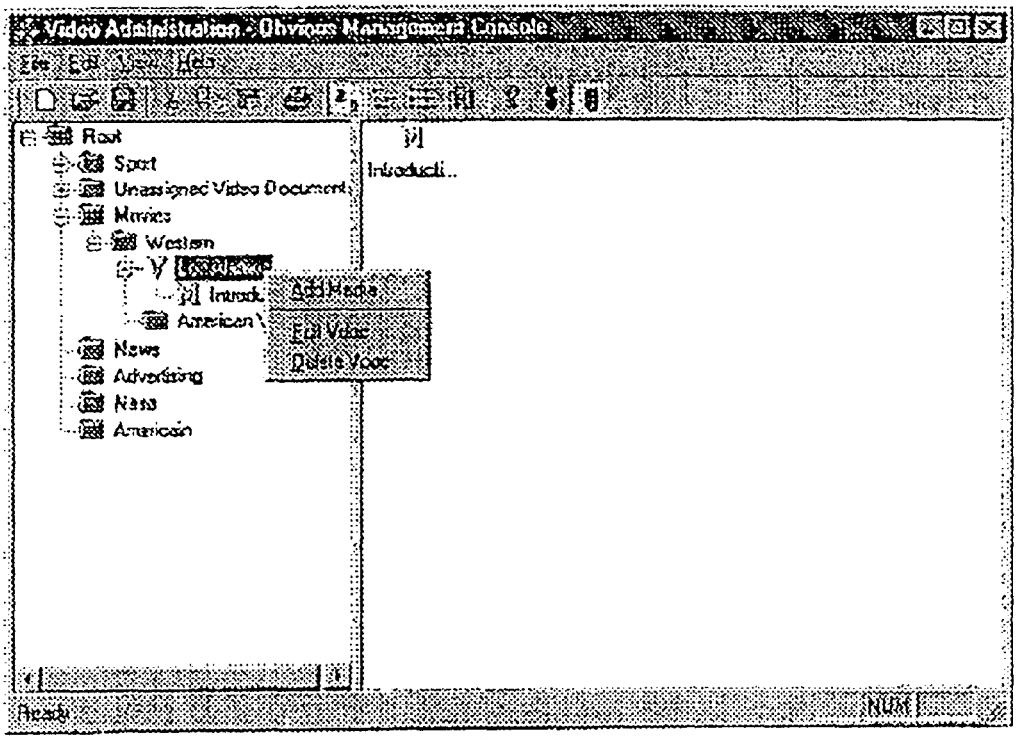
FIG. 36 is an example of a screen shot of the interface in FIG. 35 showing a contextual menu.

Each managed object is called an AdminItem. An AdminItem has a set of properties, handles a set of child AdminItems and can display its configuration dialog. It can respond to basic events such as Configure (tells an object to display its configuration dialog), Add (tells an object to add a sub object) and Delete (tells the object to remove itself from the system). By right-clicking on an item in the left view, a contextual menu appears. For example, FIG. 36 shows the contextual menu for a Vdoc item.

Figure 37:
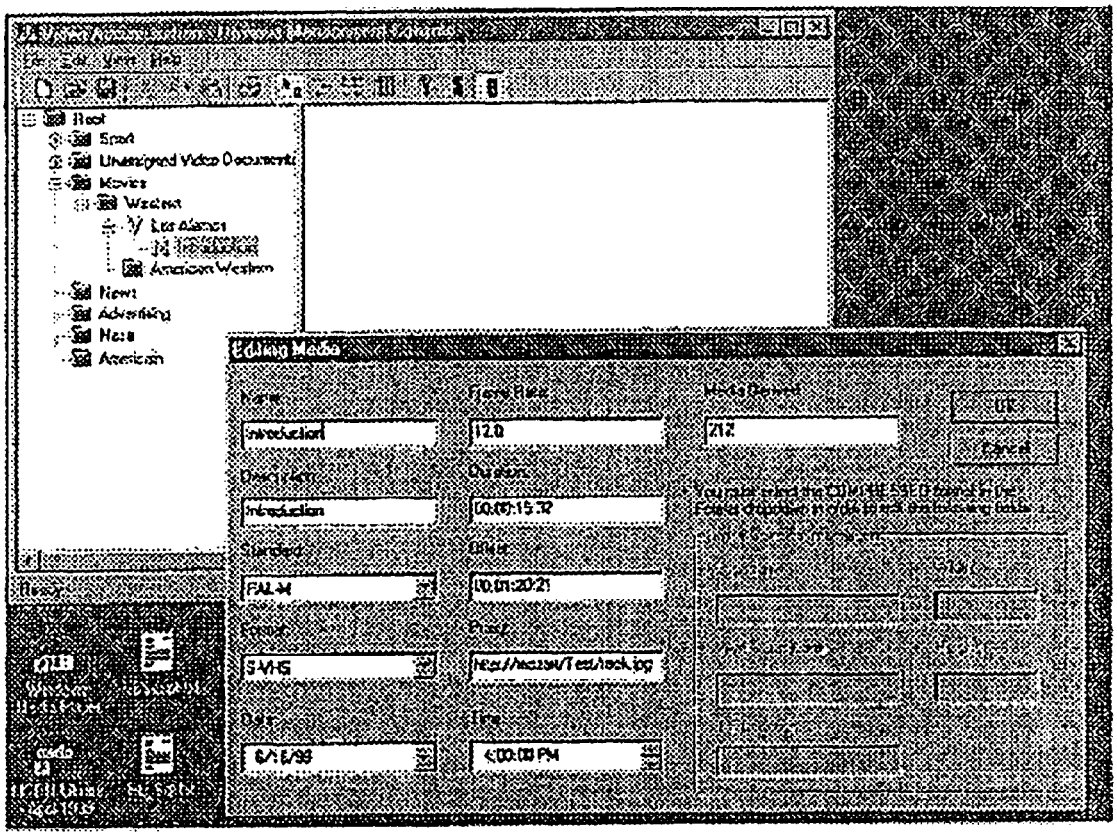
FIG. 37 is an example of a screen shot of the interface in FIG. 35 when "Edit Media" is selected.

Selecting an entry in the contextual menu will display a dialog box for object- specific operations. For instance, when the user selects the "Edit Media" menu entry from the contextual menu of a Media object, FIG. 37 shows the dialog box that appears, allowing the user to modify the definition of the media.

The architecture of the Obvious Management Console is modular: new objects (corresponding to a new administration realm) can be easily added and administered. For that purpose, each object must be a represented by a C++ class derived from the CAdminItem class. The derived class must override some member functions.

For each administration realm, a tree is constructed. The nodes of the tree are derived from the CAdminItem class. The graphical part of the Obvious Management Console displays the trees in the left pane, dispatch the events between the objects and updates the right pane when necessary. The Obvious Management Console is completely independent of the nature of the AdminItems it displays.

Figure 38:
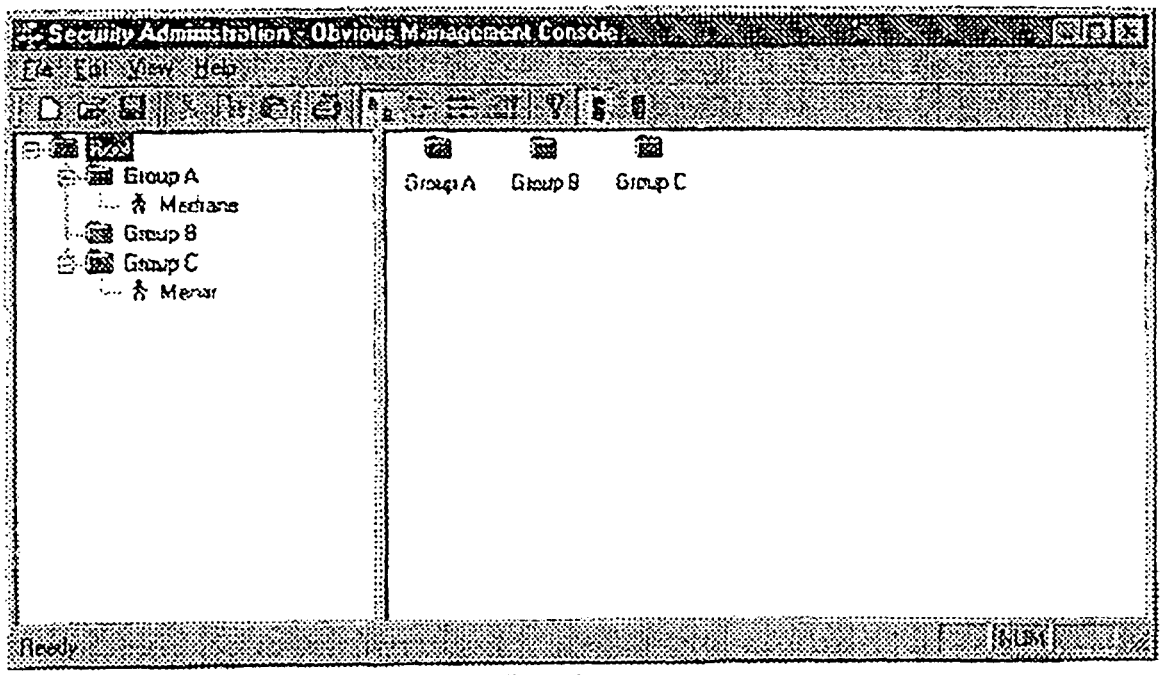
FIG. 38 is an example of a screen shot of the interface in FIG. 35 showing an administration session on the security realm.

FIG. 38 shows an administration session on the security realm. Here, the hierarchy of objects is composed of Groups and Users objects.

XII. Video Registering

This Section will describe the steps performed at the video registering level. This concerns all the steps involved from the video acquisition to the creation of database entries for a specific Vdoc/Media. Video registering has nothing to do with OBVIs. It prepares and registers media files. Registered media files can then be used for creating and authoring OBVIs.

As explained before, these steps are accomplished from the Obvious Management Console. By right-clicking on a Vdoc category the user can create sub- categories. Then, from a Vdoc category, he creates a Vdoc. Each Vdoc is represented by a name and a description. From that Vdoc, he creates a new Media. Each Media is represented by various tags (name, description, format, standard, etc.).

The dialog box for the creation of the Media gives 2 possibilities to the user:

he can browse its local hard-drive (or LAN) for selecting an existing media file he can launch a tool for video and closed-caption acquisition Video characteristics (such as the frame rate, the number of frames, the codec and the image size) are automatically extracted from the video file. Others user-defined fields (such as the name and the description of the Media) must be filled by the user.

At the end, the digital media file is processed as follows:

the media file is converted to an OBF file the media file is uploaded to the Obvious Asset Manager (for archiving and indexing purposes)

the OBF file is uploaded to the Obvious Media Server

Then a new Vdoc/Media entry is created in the OIS database. Of course, if the Vdoc entry already exists, a new entry is appended to the list of Media entries for that Vdoc.

After the creation of the Media, the user can create Streams. By right-clicking on a Media, he launches a external tool for stream building. Typically, this tool is NetShow Encoder in the case of ASF streams or the Real producer in the case of RealMedia streams. Then, he defines the new Stream entry by its name, description, bandwidth, etc. A corresponding entry is created in the OIS database.

These constitute the only steps that must be manually accomplished from the Obvious Management Console. The others steps, described below, are performed in background, asynchronously to this first phase.

Once the original media file is uploaded to the Obvious Asset Manager, it is automatically analysed by the VAMT Service. A new analysis job is created and runs in parallel with others analysis jobs. At the end, a measures file, containing the VAMT pre-processing measures, is created and stored in the OIS database. These measures can be retrieved by any client application by sending the appropriate request to the Obvious Media Server.

XIII. OVI Publishing and Indexing

This chapter details the process of publishing and indexing OBVIs. As explained in previous chapters, an OBVI is a database object that can be exported in several forms: OVI, XML or OSF file. Currently, the only format that can support editing and authoring is the OVI file. The OMM/OME suite of tools allow the user to load an OVI file, modify it and save it locally.

The export functionality is a conversion from the promary storage format to one of the available secondary storage formats. Publishing and indexing an OVI file simply means converting an OBVI from a secondary storage format (the OVI file) to the primary (database-centric) storage format.

1 The Oracle 8 ConText Cartridge

ConText Cartridge is an Oracle extension module that gives fall text search capabilities to the Oracle 8 Server. In addition, ConText provides advanced linguistic processing of English-language text.

ConText provides advanced text searching and viewing functionality, such as full text retrieval, relevance ranking, and query term highlighting. Text queries support a wide range of search options, including: logical operators (AND, OR, NOT, etc.), proximity searches, thesaural expansion, and stored queries. Text viewing capabilities include WYSIWIG and plain text viewing of selected documents, as well as highlighting of query terms.

ConText provides in-depth linguistic analysis of English-language text. The output from this linguistic processing can be used to perform theme queries, which retrieve documents based on the main topics and concepts found in the documents.

2 Concepts

Basically, the publishing and indexing process involves 3 major steps:

1) The conversion of all annotations into HTML (annotation publishing) The annotations of a given OVI file are extracted, converted into HTML and published on one or several remote Web servers. For that purpose, a specific converter is used for each kind of OBVI annotation (Wordpad, HTML, database, etc.)
2) The filtering of annotation contents (for full search capabilities) Each annotation must be filtered to produce raw text that can be easily indexed by the Context Cartridge engine. For that purpose, a specific filter is used for each kind of OBVI annotation (Wordpad, HTML, database, etc.)
3) The creation of database entries for the OBVI An OBVI is internally represented by a set of database entries.

These steps are accomplished by the Obvious Publishing Engine.

2.1 Publishing the Annotations

The annotations contained in an OVI file are converted into HTML. The following table describes how this conversion is achieved, depending of the annotation type.

| Original annotation format | Conversion technique | Comments |
|---|---|---|
| Wordpad | Microsoft Word automation | |
| Embedded HTML | No conversion | |
| Link to a Web Site | Spider engine | |

The conversion between Wordpad and HTML can be easily achieved by using Microsoft Word's automation features. This allows to programmatically launch a Microsoft Word application, load the Wordpad document and convert it into HTML. Microsoft Word automatically handles the conversion of the graphics and others embedded objects.

A specific converter is needed for each kind of annotation. The mapping between annotation types and converters is stored in the CONVERTER table of the OIS. For each annotation type, this table gives the GUID of the COM (or DCOM) object that can be used for processing it. A converter is a COM object that implements the IAnnotConverter COM interface, described in more detail in Section XXII entitled the IANNOTFILTER COM INTERFACE.

After being converted into HTML, each annotation is published on a Web Server and the corresponding URL is stored in the URL column of the ANNOTATION table. The publishing is achieved by doing a FTP upload on a specific directory in the remote Web Server. On this Web server, each annotation is stored in a separate directory whose name has the following syntax:

ANNOT-XXXX-YYYY

XXXX is the Site Identifier

YYYY is the Annotation Identifier 2.2 Filtering the Annotation Content

Regardless of the annotation format, the ConText Cartridge requires text to be filtered for the purposes of text indexing or text processing through the Linguistic Services (as well as highlighting the text for viewing).

Text extracted from OBVI annotations and OBVI metadata is stored in the Text column of the ANNOTATION table. Refer to section X for more details. This column stores data as a CLOB, i.e. a Character Large Object. Under Oracle 8, the CLOB data type can store single-byte text, up to 4 gigabytes in size. CLOBs have full transactional support: the CLOB value manipulations can be committed or rolled back.

Figure 39:
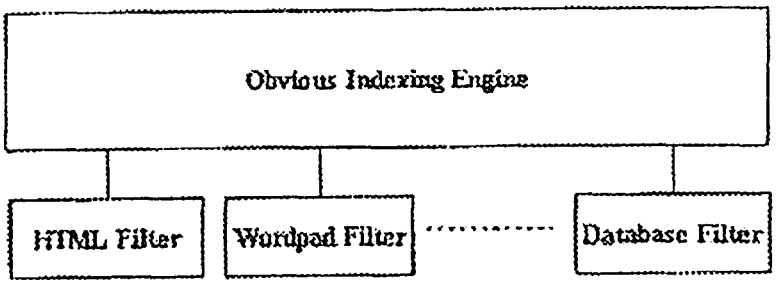
FIG. 39 is a diagram of interfaces between an Obvious Indexing Engine and filters.

At a certain time, the publishing/indexing process of an OBVI involves the extraction of text data from each annotation. The implementation details of this extraction depends on the type of the annotation. In current version of the OVI file format , the following annotations types can be found 1. Link to Web Site
2. Embedded HTML pages
3. Wordpad
4. Text
5. Closed-Captions
6. SpeakerID
7. Database template
8. Audio
9. Object A specific filter is used for filtering each type of annotation. To permit future extensions and enhancements, these filters are implemented as external modules (COM objects) that can be dynamically loaded and used by the Obvious Publishing Engine for retrieving text data from a given annotation. For example, when the Obvious Publishing Engine finds a Web annotation (a HTTP link to a remote HTML page), he uses a specific filter that will download the HTML code, parse it and produce raw text. All filters are supposed to output raw text that will be stored in the Content column of the ANNOTATION table. All filters present the same interface to the Obvious Publishing Engine, FIG. 39.

The mapping between annotation types and filters is stored in the FILTER table of the OIS. For each annotation type, this table gives the GUID of the COM (or DCOM) object that can be used for processing it. A filter is a COM object that implements the IAnnotFilter COM interface, described in more detail below in Section XXI entitled GUID For Objects.

2.3 Creating Database Entries

The database format is the primary storage format for an OBVI. An OBVI is uniquely represented by 2 identifiers: the OBVI Identifier and the Version Identifier. If the OVI file is already bound to an OBVI in the database then the publishing process consists of creating a new version. Otherwise, a new OBVI (with a starting version identifier) is created. The creation of database entries for a new OBVI involves the manipulation of several database tables. First, a new OBVI Identifier and a new Version Identifier are allocated (see OBVI and VERSION tables). Then, new Blocks are created (see BLOCK table) and bound to the OBVI (see BLOCK-FOROBVI table). Finally, new Chunks are created (see CHUNK table) and bound to the OBVI (see CHUNK-FOROBVI table). The ANNOTATION table.

In the case of publishing a new version of the OBVI (rather than publishing a new OBVI), the procedure is roughly the same. The only difference concerns the reuse of Blocks, Chunks and Annotations. As explained before, since changes between versions are supposed to be small (the user typically changes adds or removes some blocks and edit few annotations) the system tries to reuse Blocks, Chunks and Annotations from the previous version.

3 Implementation

Three modules are implemented:

1) The Obvious Publishing Engine: the core publishing/indexing engine
2) The Obvious Publishing Manager: the GUI for controlling the Obvious Publishing Engine
3) The Obvious Publisher: the GUI from which the user publishes an OVI file The most important module is the Obvious Publishing Engine, responsible for the publishing and indexing process. It internally uses a set of filters for gathering text information from the various kinds of annotations found in the OVI file. It also uses a set of converters for transforming OVI annotations into HTML.

3.1 Filters

The following filters have implemented. As explained before, they are COM objects that implement the IAnnotFilter interface.

Wordpad Filter

A Wordpad document is basically an RTF file. An RTF to text converter has been used for implementing this filter.

HTML Filter

The HTML filter can access local or remote HTML pages. It acts as a parser that eliminates the HTML tags. As output it provides raw text. This filter handles both Web Link Annotations and Embedded HTML Annotations.

Database Filter

The database filter is a complex filter that allows remote retrieval of database content. It handles the Obvious Database Annotations described in Section III. It has not been completely defined yet.

3.2 Converters 3.3 Obvious Publishing Engine

Under Windows NT, the Obvious Publishing Engine is implemented as a NT service. It scans a list of predefined directories. For every OVI file found, the Obvious Publishing Engine starts an indexing process (a new thread). Several OVI files can be indexed at the same time.

The code of the core indexing process is located in a DLL called LibINDEX.dll. This DLL contains several exported functions but the most important one is called LIBINDEX_IndexOVI. This function accomplishes all the necessary steps for publishing and indexing an OVI file.

Most of the code uses ADO for accessing and updating the various tables of the OIS database. It also uses the OCI library for Oracle specific code concerning the handling of CLOB data.

3.4 Obvious Publishing Manager

As described in previous pages, the Obvious Publishing Engine can be controlled by a client application, by using a TCP/IP connection. The Obvious Indexing Manager is a sample of such client application. It is implemented in C++/MFC. It opens a TCP/IP connection to the machine hosting the Obvious Publishing Engine and sends requests for:

starting and stopping the publishing/indexing process
configuring the list of scanned directories
monitoring the activity The Obvious Publishing Manager is a configuration tools that can be used by administrators for controlling and tuning the Obvious Publishing Engine.

3.5 Obvious Publisher

The Obvious Publisher is the graphical interface from which a user launches the publishing and indexing of its OVI files. The Obvious Publisher is supposed to run on a client machine, where OVI files are located.

Figure 40:
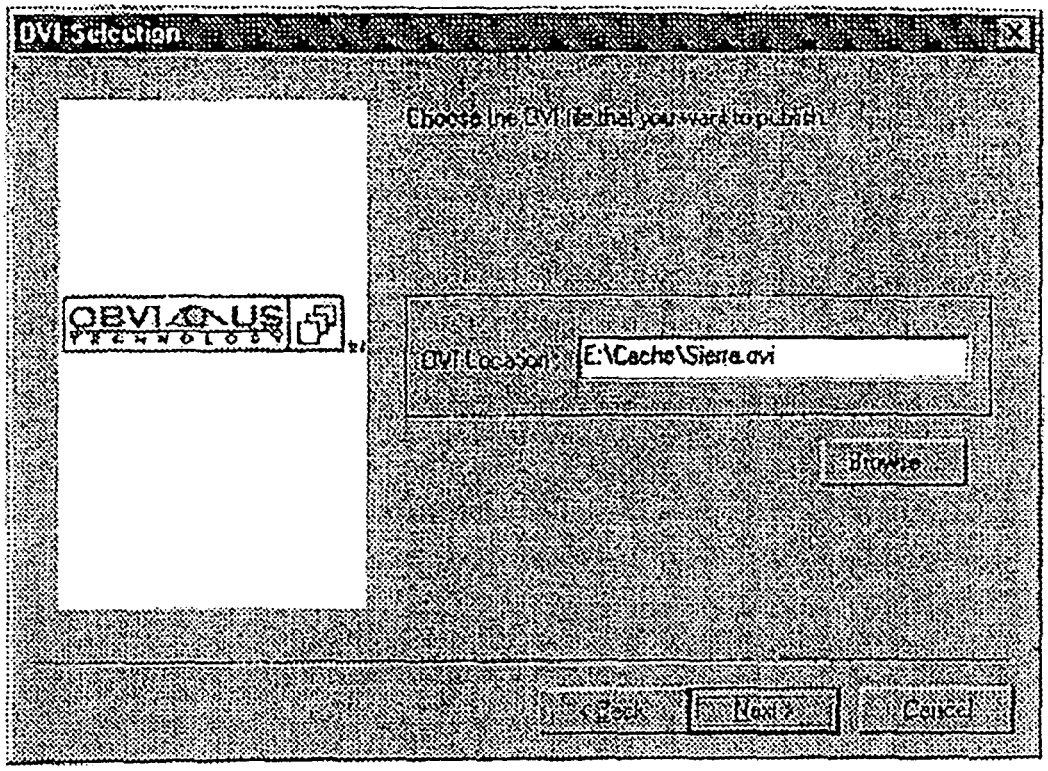
FIG. 40 is an example of a screen shot illustrating a first step in which a user launches the publishing and indexing of OVI files.

The Obvious Publisher is implemented as a Wizard encapsulated in an ActiveX Control. It has been developed in C++/MFC. This ActiveX Control has only one automation function: RunWizard. A container application can call this function to launch the Wizard. It has the following steps:

Step 1: Select a local OVI file—FIG. 40

The user browses its local machine or the LAN for an existing OVI file. This OVI file can correspond to either a new OBVI created from scratch (not bound to any registered Vdoc/Media) or to a registered OBVI (the user has previously extracted an OBVI from the database, in a OVI form and has modified it).

Figure 41:
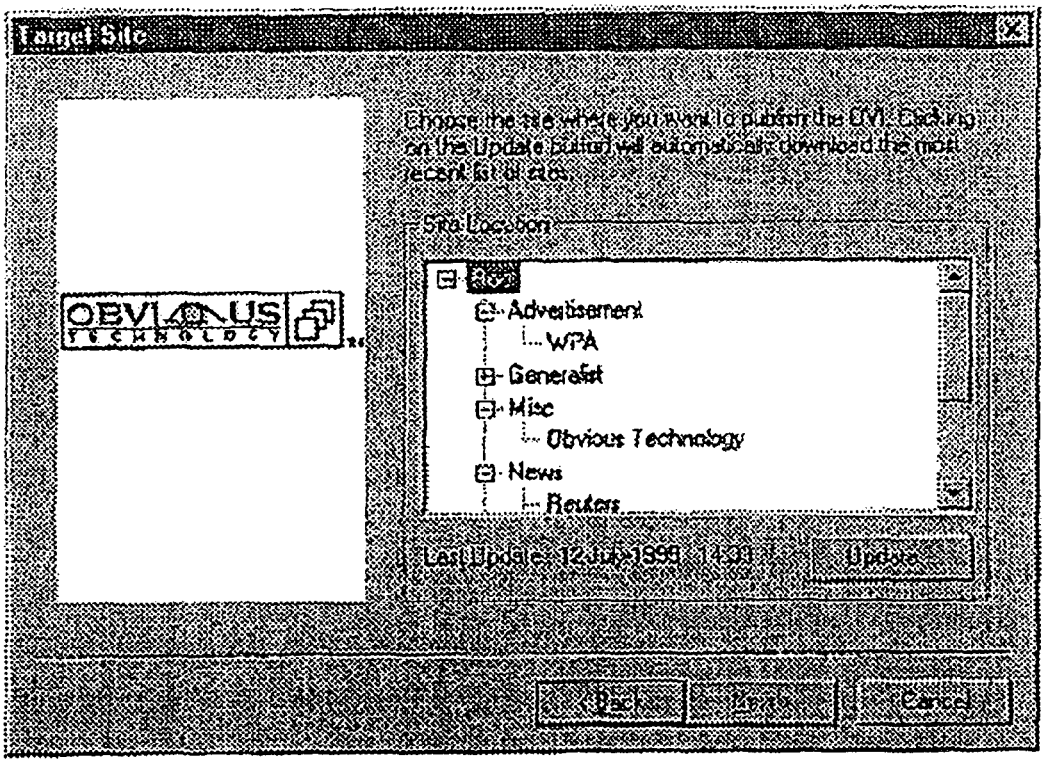
FIG. 41 is an example of a screen shot illustrating a second step in which a user launches the publishing and indexing of OVI files.

Step 2: Select the site on which the OVI must be published—FIG. 41

The user has a tree representation of the various sites, grouped by categories. He selects the site on which the OVI must be published. This step is available only for a multisite configuration. A multisite configuration is a configuration that allows the administration of several sites.

Figure 42:
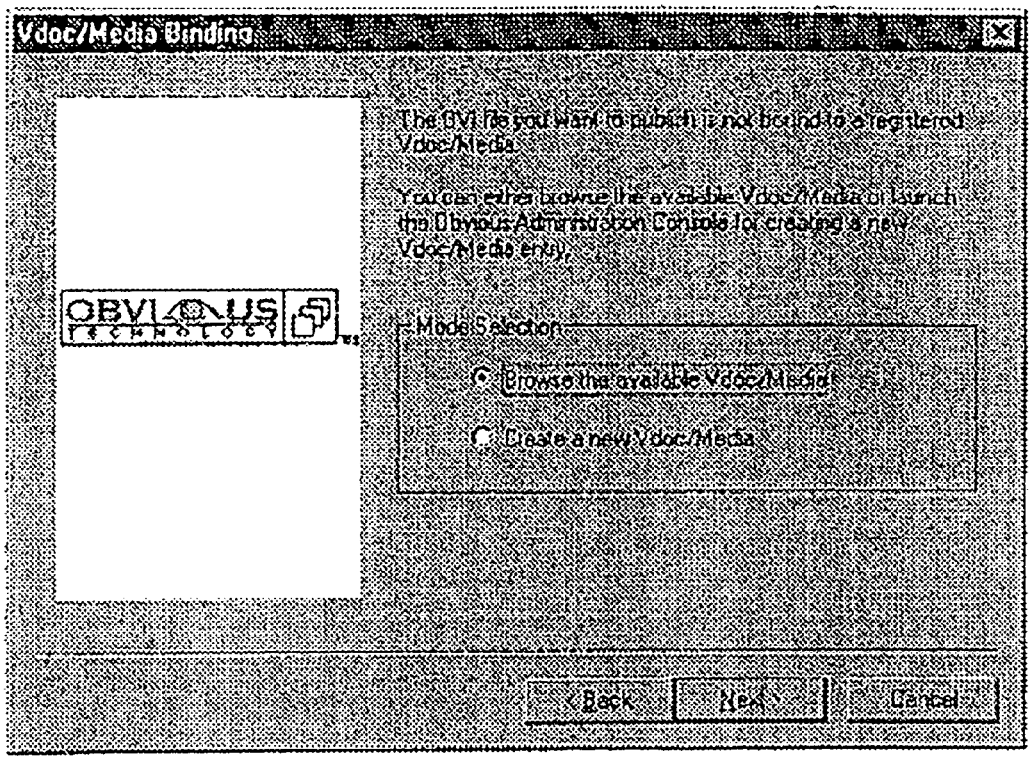
FIG. 42 is an example of a screen shot illustrating a third step in which a user launches the publishing and indexing of OVI files.

Step 3: Selection of the Vdoc/Media that must be bound to the OVI file—FIG. 42

In the case of an OVI file created from scratch, i.e. not previously extracted from the server, the user must select a Vdoc and a Media to which the OVI file will be bound during the publishing process.

Figure 43:
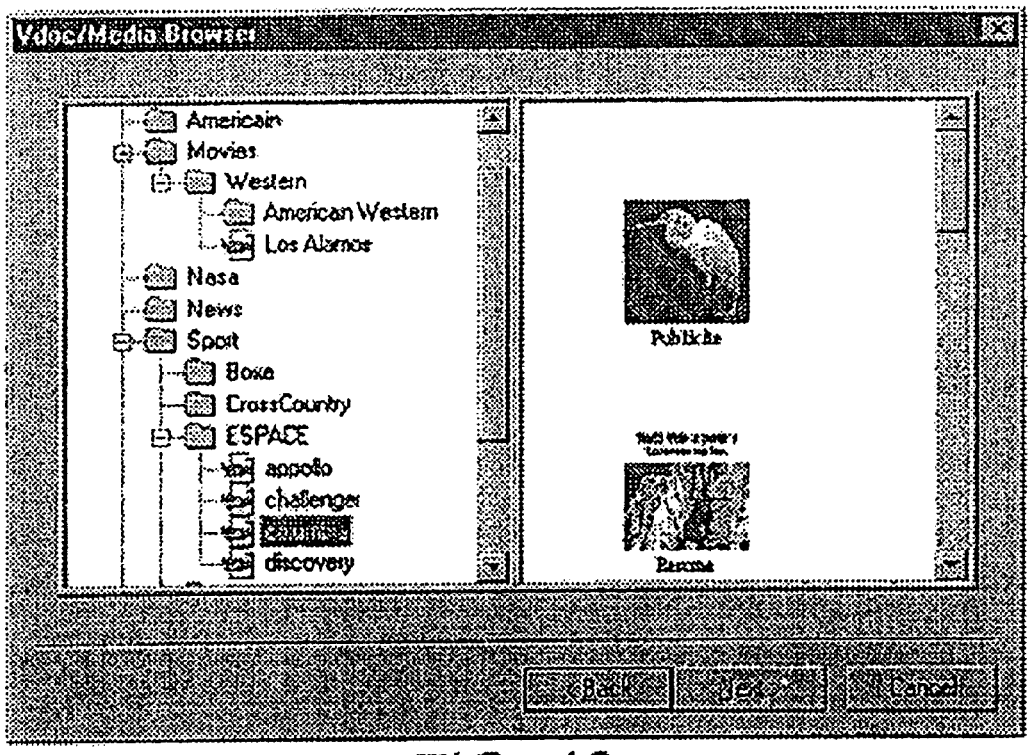
FIG. 43 is an example of a screen shot illustrating a first choice a user has in the screen shot of FIG. 42.

The user has two possibilities, FIG. 43:

Choice 1: Select an existing Vdoc/Media

In that case, the following Wizard page appears. By using the Obvious Vdoc Browser ActiveX Control, the user browses the available Vdoc and the corresponding Media.

Choice 2: Create a new Vdoc/Media

By using the Obvious Administration Console application, the user creates a new Vdoc/Media.

Figure 44:
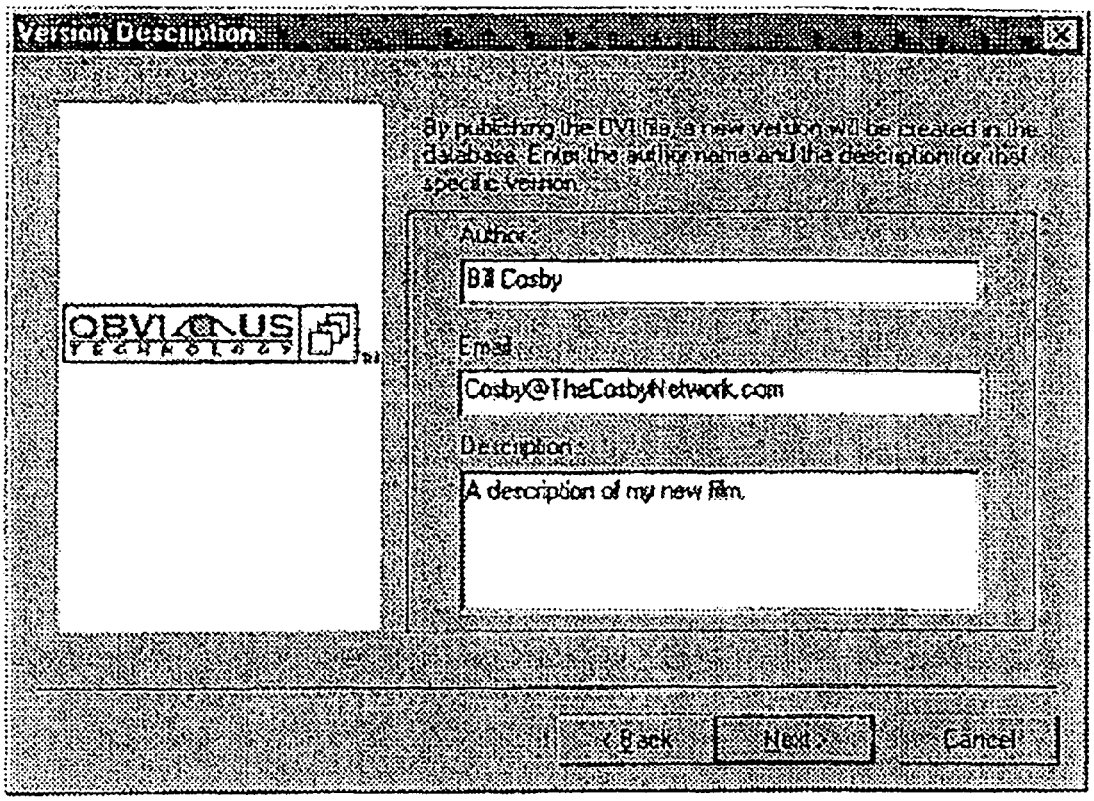
FIG. 44 is an example of a screen shot illustrating a fourth step in which a user launches the publishing and indexing of OVI files.

Step 4: Enter version specific data—FIG. 44

The user enters the author and the description of the OBVI version that will be published.

Figure 45:
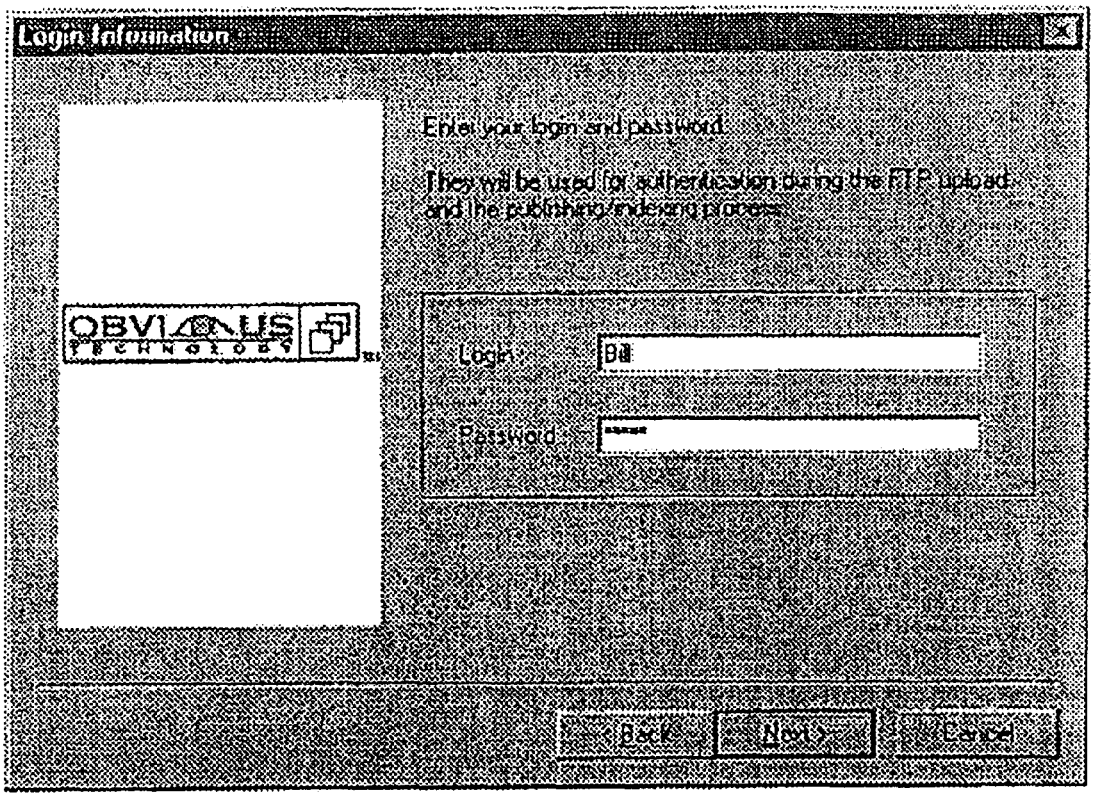
FIG. 45 is an example of a screen shot illustrating a fifth step in which a user launches the publishing and indexing of OVI files.

Step 5: Enter login information—FIG. 45

The user enters the login and the password that will be used to perform the publishing/indexing process.

Figure 46:
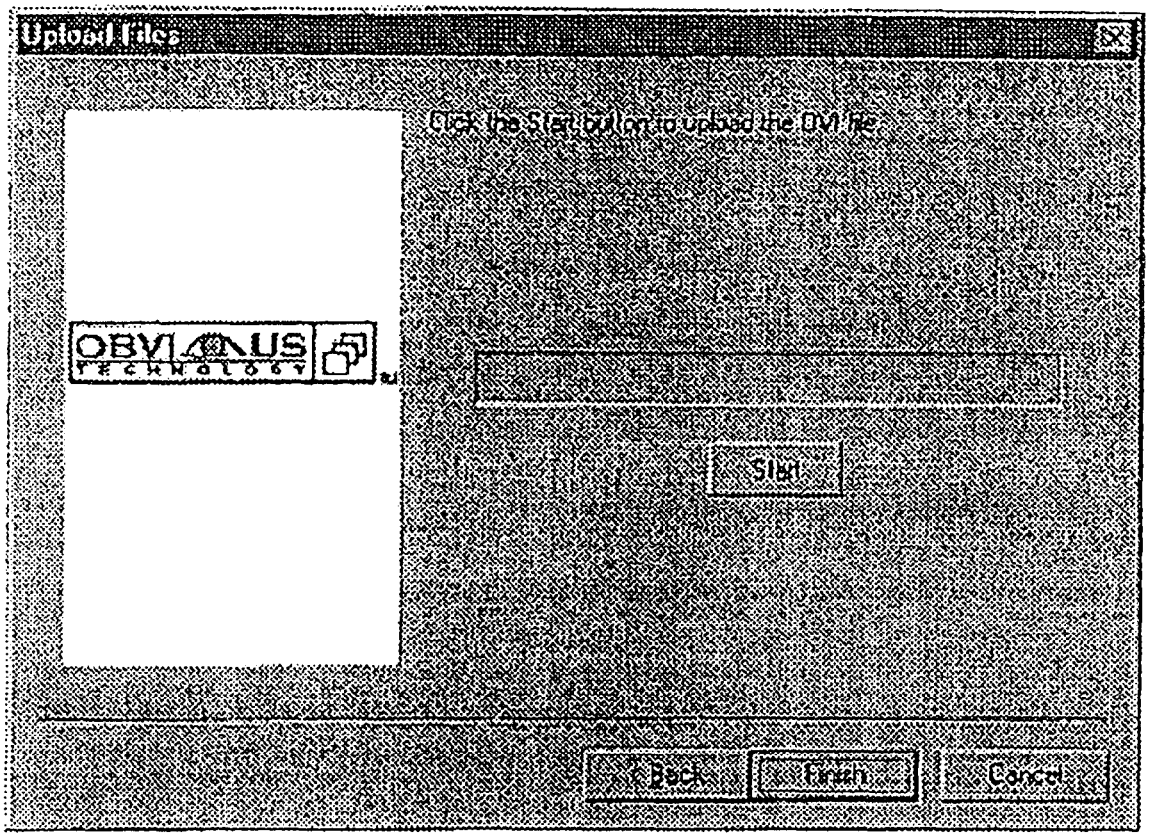
FIG. 46 is an example of a screen shot illustrating a sixth step in which a user launches the publishing and indexing of OVI files.

Step 6: Upload the OVI file and the configuration file—FIG. 46

The OVI file and the configuration file are uploaded to the machine hosting the Obvious Publishing Engine. The upload is done via FTP.

After these steps, the OVI file is now on the machine where the Obvious Publishing Engine is located. The Obvious Publishing Engine will automatically handle all the steps for publishing and indexing the OVI. It will parse the annotations, extract raw text for indexing purposes, convert them into HTML and publishe these annotations on Web servers. It will also create database entries for the new OBVI version.

By using the Obvious Publisher wizard, the user can send several OVI files for publishing. They will be handled by the Obvious Publishing Engine in batch. The Email address that the user entered in the fourth page of the Wizard is used by the Obvious Indexing Engine for sending any error report to the author.

XIV. OBVI Searching

1 Concepts

Under current implementation, search capabilities are provided by the Context Cartridge engine. As explained before, on of the task accomplished by the Obvious Publishing engine is the filtering of annotations: the OVI annotations are extracted and filtered to produce raw text that can be indexed by the ConText Cartridge. This raw text is stored in the Text column of the ANNOTATION table.

The ConText Cartridge has its own indexing servers. They run in background and they continuously update the internal index if the content of the Text column changes. This chapter will focus on using the search capabilities of the ConText Cartridge to build a global search platform in the Obvious Network Architecture.

Two search methods have been implemented: the basic search and the advanced search.

1.1 Basic Search

The basic search procedure allows the user to enter a keyword (or a list of keyword). This keyword is searched in every annotation, for all OBVIs.

1.2 Advanced Search

The advanced search procedure allows the user to enter different keywords for different strata.

2 Implememtation 2.1 Stored Procedures for Searching

For performance reasons, the search code has been implemented as a set of Oracle stored procedures, written with the PL/SQL language. These stored procedures are part of the OBVIPACKAGE package[2]. Two procedures are of interest: PROC_SEARCH and PROC_ADVSEARCH. They corresponding to the basic search and the advanced search mechanisms respectively.

[2]The OBVIPACKAGE package contains all the Oracle stored prodecures that have been implemented in the OIS.

The PROC_SEARCH Procedure

```
-- PROC SEARCH
PROCEDURE PROC__SEARCH(
  vKeyword IN VARCHAR2,
  vCategoryID IN NUMBER,
  vCursor IN OUT TCursor)
IS
BEGIN
CTX__QUERY.CONTAINS('ObviPolicy',vKeyword,
  'SEARCHRESULT');
  OPEN vCursor FOR
    SELECT
      a.AnnotID, b.ObviID, c.Name, c.Description,
      g.VersionID, e.Proxy, h.Description, i.TCIN,
      i.TCOUT, g.Author, g.CreationDate
    FROM
      Annotation a, AnnotForObvi b, Obvi c, Media d,
      Vdoc e, Category f, Version g, Strata h, Chunk
      i, SearchResult j
    WHERE
      j.Textkey=a.AnnotID
    AND j.Textkey2=h.StrataID
    AND j.Textkey3=i.ChunkID
    AND a.AnnotID=b.AnnotID
    AND a.StrataID=h.StrataID
    AND a.ChunkID=i.ChunkID
    AND b.ObviID=c.ObviID
    AND c.ObviID=g.ObviID
    AND c.MediaID=d.MediaID
    AND d.VideoID=e.VideoID
    AND e.CategoryID=f.CategoryID
    AND FUNC__ISCHILDOF(f.CategoryID,
      vCategoryID)=
  =1
  ORDER BY b.ObviID, g.VersionID;
RETURN;
END PROC__SEARCH;
```

Given a Category Identifier and a keyword (or a list of keywords), this function runs the Context Cartridge's search engine for finding all the annotations (in all indexed OBVIs) that are in the specified category and that contain the specified keyword.

FUNC__ISCHILDOF is another function of the OBVIPACKAGE package. This helper function determines the parent/child relationship between two categories.

TCursor is an Oracle cursor type. Its definition is given in the OBVIPACKAGE package definition.

The PROC__ADVSEARCH procedure:

```
-- PROC__ADVSEARCH
PROCEDURE PROC__ADVSEARCH(
    vKeywordWho          IN          VARCHAR2,
    vKeywordWhat         IN          VARCHAR2,
    vKeywordWhere        IN          VARCHAR2,
    vKeywordAnnot        IN          VARCHAR2,
    vCategoryID          IN          NUMBER,
    vCursor              IN OUT      TCursor)
IS
    n          NUMBER;
    bFirst     NUMBER;
BEGIN
    n := 0;
    bFirst := 0;
    IF Length(vKeywordWho) < > 0 THEN
        CTX__QUERY.CONTAINS('ObviPolicy',
        '%' || vKeywordWho
    ||
            '%','SEARCHRESULT',bFirst,36,0,1,'StrataID =
        1');
        n := n+1:
        bFirst := 1;
    END IF;
    IF Length(vKeywordWhat) < > 0 THEN
        CTX__QUERY.CONTAINS('ObviPolicy',
        '%' || vKeywordWhat
            '%','SEARCHRESULT',bFirst,37,0,1,'StrataID =
        2');
        n := n+1:
        bFirst := 1;
    END IF;
    IF Length(vKeywordWhere) < > 0 THEN
        CTX__QUERY.CONTAINS('ObviPolicy','%' ||
vKeywordWhere ||
            '%','SEARCHRESULT',bFirst,38,0,1,'StrataID =
        3');
        n := n+1:
        bFirst := 1;
    END IF;
    IF Length(vKeywordAnnot) < > 0 THEN
        CTX__QUERY.CONTAINS('ObviPolicy','%' ||
```

-continued

```
vKeywordAnnot ||
                '%','SEARCHRESULT',bFirst,39,0,1,'StrataID =
        4');
        n := n+1:
        bFirst := 1;
    END IF;
    OPEN vCursor FOR
        SELECT
                a.AnnotID, b.ObviID, c.Name,
            c. Description,
                g.VersionID, e.Proxy, h.Description,
                i.TCIN, i.TCOUT, g.Author, g.CreationDate
        FROM
                Annotation a, AnnotForObvi b, Obvi c,
                Media d, Vdoc e, Category f, Version g,
                Strata h, Chunk i, SearchResult j
        WHERE
                    j.Textkey = a.AnnotID
                AND j.Textkey2      = h.StrataID
                AND j.Textkey3      = i.ChunkID
                AND a.AnnotID       = b.AnnotID
                AND a.StrataID      = h.StrataID
                AND a.ChunkID       = i.ChunkID
                AND b.ObviID = c.ObviID
                AND c.ObviID = g.ObviID
                AND b.ObviID IN
                    (
                        SELECT ObviID
                        FROM
                            (SELECT Distinct
                                b.ObviID,
                                a.TextKey2
                            FROM
                                SearchResult a,
                                AnnotForObvi b
                            WHERE a.TextKey =
b.AnnotID)
                        GROUP BY ObviID
                        HAVING Count(ObviID) = n
                    )
                AND c.MediaID           = d.MediaID
                AND c.VideoID           = e.VideoID
                AND e.CategoryID = f.CategoryID
                AND
                FUNC_ISCHILDOF(f.CategoryID,
                vCategoryID)
                = 1
                ORDER BY b.ObviID, g.VersionID;
    RETURN;
END PROC_ADVSEARCH;
```

Given a keyword (or a list of keywords) for each strata, this functions runs the Context Cartridge's search engine on each strata, for a given category.

2.2 Search Pages

The search pages (for basic and advanced search) have been written as ASP pages. Although some of these pages use ADO for accessing the OIS database, they do not use ADO for executing a search request. Searches are handled by an Active Server Object called Obvious Search Engine. This module has been implemented in C++/ATL and contains the Oracle-specific code necessary for calling the PROC_SEARCH stored procedure responsible for the search[3].

[3]Calling Oracle stored prodecures from ADO is tricky: The ObviousSearchEngine uses the OCI library for direct access to all Oracle features.

Figure 47:
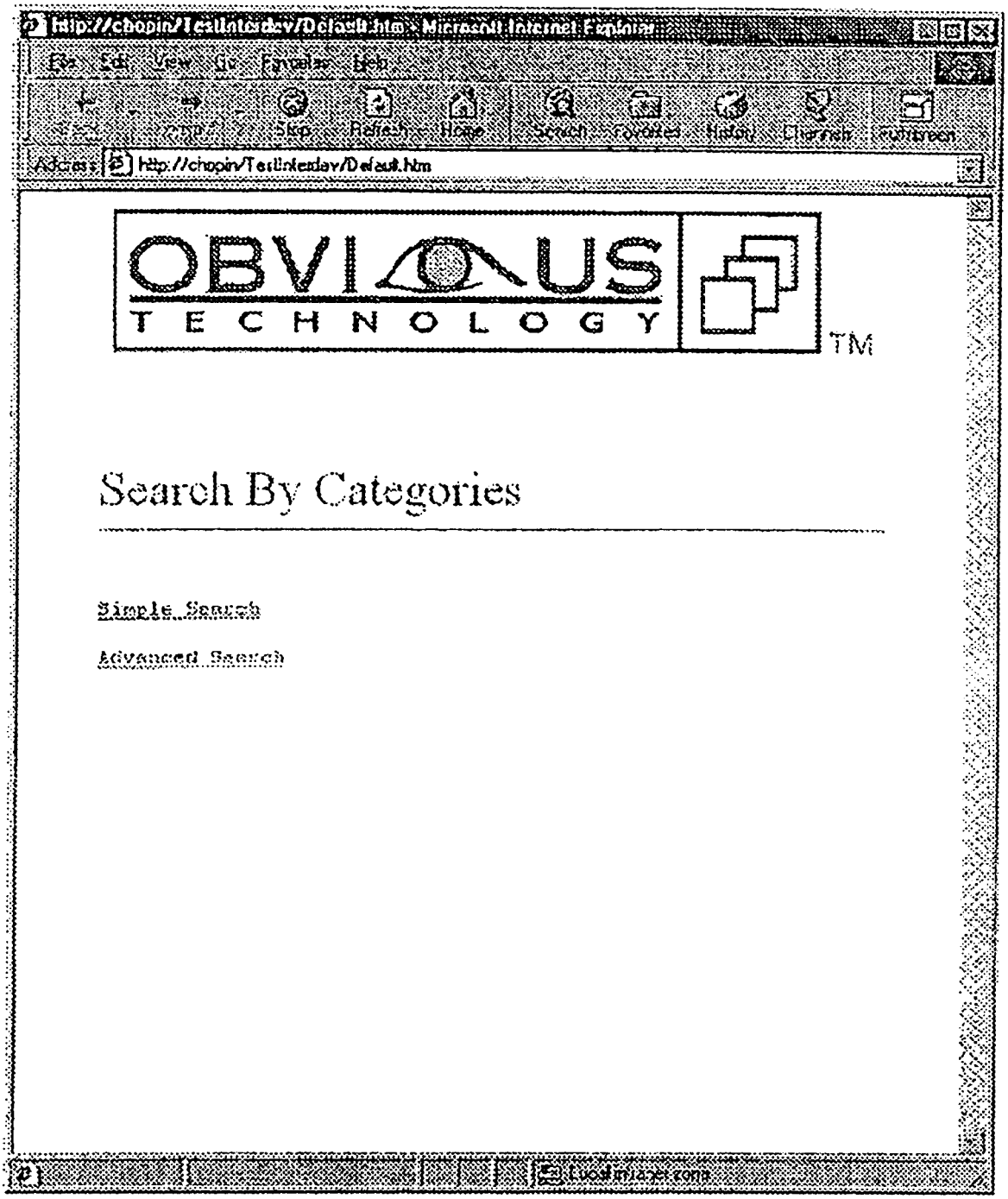
FIG. 47 is an example of a screen shot illustrating a basic search screen.

The latest version of the ASP search pages can be seen at http://odyssee.opus.obvioustech.com/XXX The first page allows the user to choose between the basic search and the advanced search, FIG. 47.

FIG. 47 depicts the basic search screen. The user can navigate in the hierarchy of Vdoc categories. When a search request is sent, it concerns all the categories below the current Vdoc category. By doing a search from the Root category, the user can access all OBVIs.

From the given list of keywords, a request is sent to the database, via the Obvious Search Engine. Results are grouped by OBVI and by version. For each OBVI version, a list of chunks (timecodes) shows the exact location of the hits.

Figure 48:
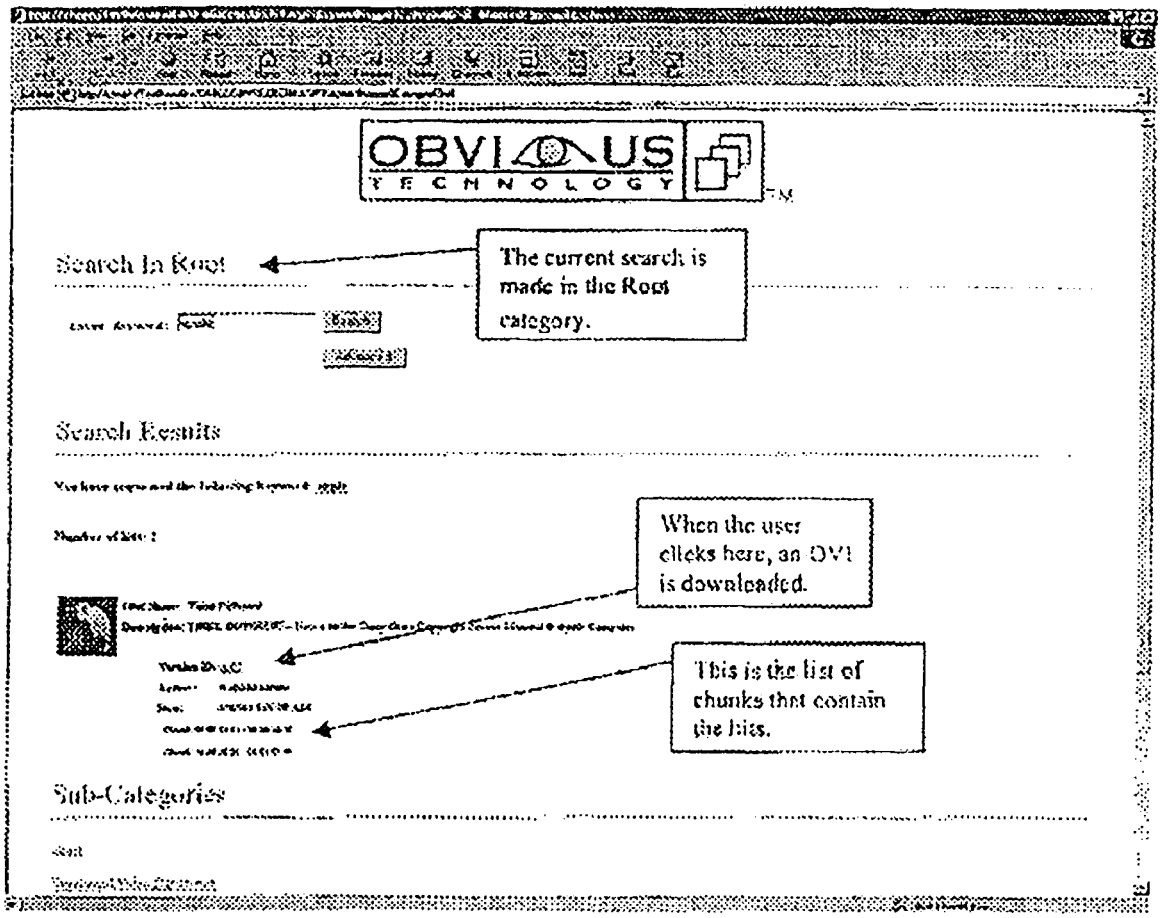
FIG. 48 is an example of a screen shot illustrating a simple search.

By clicking on the image, the corresponding video is played. In FIG. 48, since the video is an ASF stream, the Windows Media Player will be automatically launched.

By clicking on the Version ID field, the OBVI is downloaded in an OVI form. For that purpose a GetObviAsOvi request is sent the OMS. The OMS sends backs the OVI file corresponding to the specific OBVI version. In next version, the user will also be able to click on a chunk. In that case, the OVI will be downloaded and the OMM will automatically position itself on that specific chunk.

Figure 49:
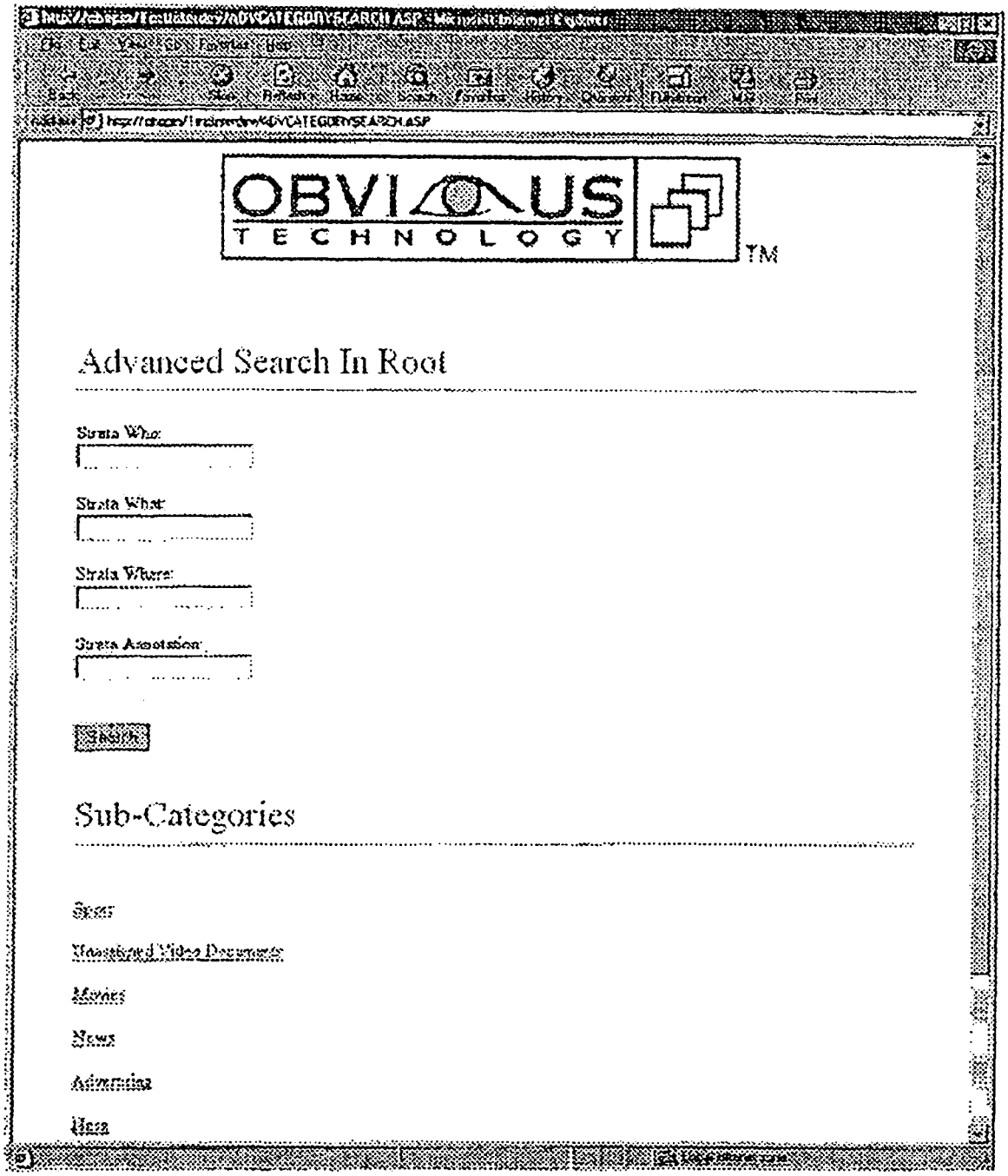
FIG. 49 is an example of a screen shot illustrating an advanced search.

The FIG. 49 shows the advanced search page. Here, an edit box is displayed for each annotation stratum.

XV. OBVI Indexing with MIS

1 Microsoft Index Server

Microsoft® Index Server is a full-text indexing and search engine for Microsoft Internet Information Server (IIS) and Microsoft Windows NT.RTM. Server. It allows any Web browser to search documents for key words, phrases, or properties such as an author's name.

Index Server is designed for use on a single Web server on an intranet or the Internet. It can easily handle large numbers of queries on a busy site. Automatic updating and support for Microsoft Office documents is ideal for an intranet where files change frequently.

Index Server is capable of indexing textual information in any document type through content filters. Filters are provided for HTML, text, and Microsoft Office documents. Application developers can provide support for any other document by writing to the open IFilter interface. An IFilter knows how to read a file and extract the text. This text can then be indexed.

2 Indexing OBVIs with MIS

MIS uses catalogs for storing the index information related to a set of directories. By default, the Web catalog is bound to the root hierarchy of the local Web site. The administrator of the system can create others catalogs. It is recommended to create 3 Implementation An MIS filter has been implemented in C++. It allows MIS's indexing engine to parse OVI files and gather useful information for indexing. This filter basically implements the IFilter COM interface and internally uses the OBVI SDK, described in more detail in Section IV, for opening and reading OVI files.

The filter must registered on the system. Then, any OVI file present will be automatically indexed by MIS. Once indexed, queries can be ran from a web browser or any MIS-compliant application.

can be fetched ch resultscan either create a new MIS catalog or use the pre- defined Web catalog.

XVI—OBVI Streaming

As described above, OSF is, with OVI and XML, another secondary storage format. OBVIs saved as OSF files can be efficiently streamed. This Section will focus on the specific tools that have been developed for building OSF files, streaming OSF data over IP multicast channels and receiving channels content at the client side.

1 The OSF Specification

An OSF file is composed by several chunks: the metadata chunks, the structure chunks, the image chunks and the annotation chunks. Each chunk is encoded with several data packets. A packet has the following binary structure:

```
struct __TPacket
{
char pSync[11]; // "SYNCHRONIZE"
DWORD vOsfID; // OSF identifier
char vType; // Type of chunk=CHUNK_TYPE_XXX
DWORD vDataSize; // Size of data
DWORD vNumPacket; // Packet number
DWORD vNbPacket; // Total number of packets
char pData[0]; // Packet-specific data
};
typedef struct __TPacket TPacket;
```

The pSync field allows the client applications to parse asynchronous OSF streams and synchronise the OSF reading.

Several OSF can be transmitted on the same communication channel. In that case, packets corresponding to different OSFs can be interleaved. The vOsfID allows the identification of each packet. It allows client applications to group received packets by OSF and rebuild the original stream.

The chunk type, stored in the vType field, can be one of the following:

```
#define CHUNK_TYPE_METADATA 0
#define CHUNK_TYPE_STRUCTURE 1
#define CHUNK_TYPE_IMAGE 2
#define CHUNK_TYPE_ANNOTATION 3
```

The vDataSize field gives the number of bytes that constitute the packet data. This data starts at the pData field.

Each chunk type can be transmitted by using several packets. In that case, the vNumPacket and vNbPacket allow client application to reconstruct the original data chunk. This is useful with UDP protocols for example, where the maximum block of data that can be transmitted at each call is limited.

2 The Obvious Stream Builder

The Obvious Stream Builder is simple tool that allows the conversion of OVI files into OSF files. It internally uses the OBVI SDK (LibOBVI.dll) for parsing the input OVI file and creating corresponding packets for the OSF file.

3 The Obvious Multicaster

Figure 50:
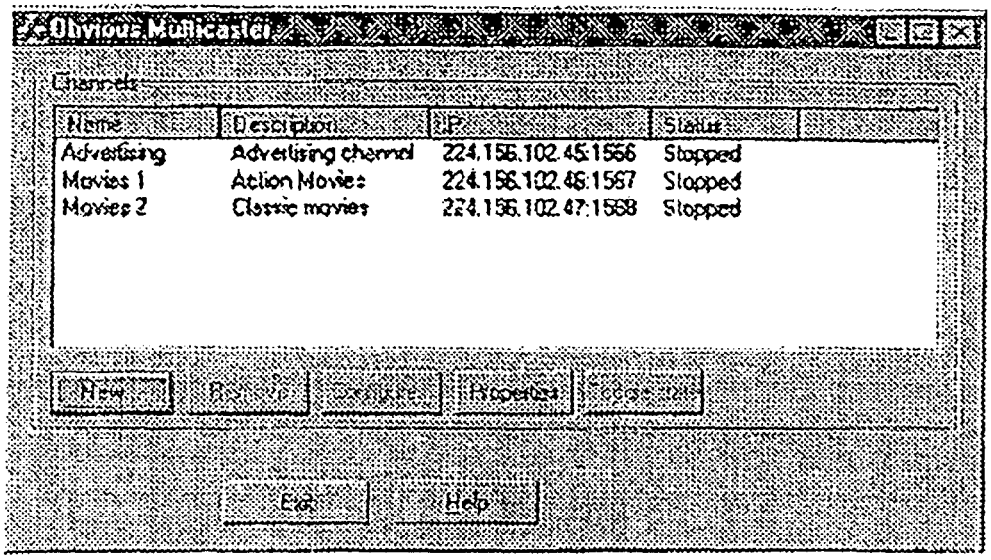
FIG. 50 is an example of a screen shot illustrating a main window for an Obvious Multicaster.

FIG. 50 depicts the main window of the Obvious Multicaster. It shows a list of channels, each channel being represented by a name, a description, an multicast IP address and a status.

Figure 51:
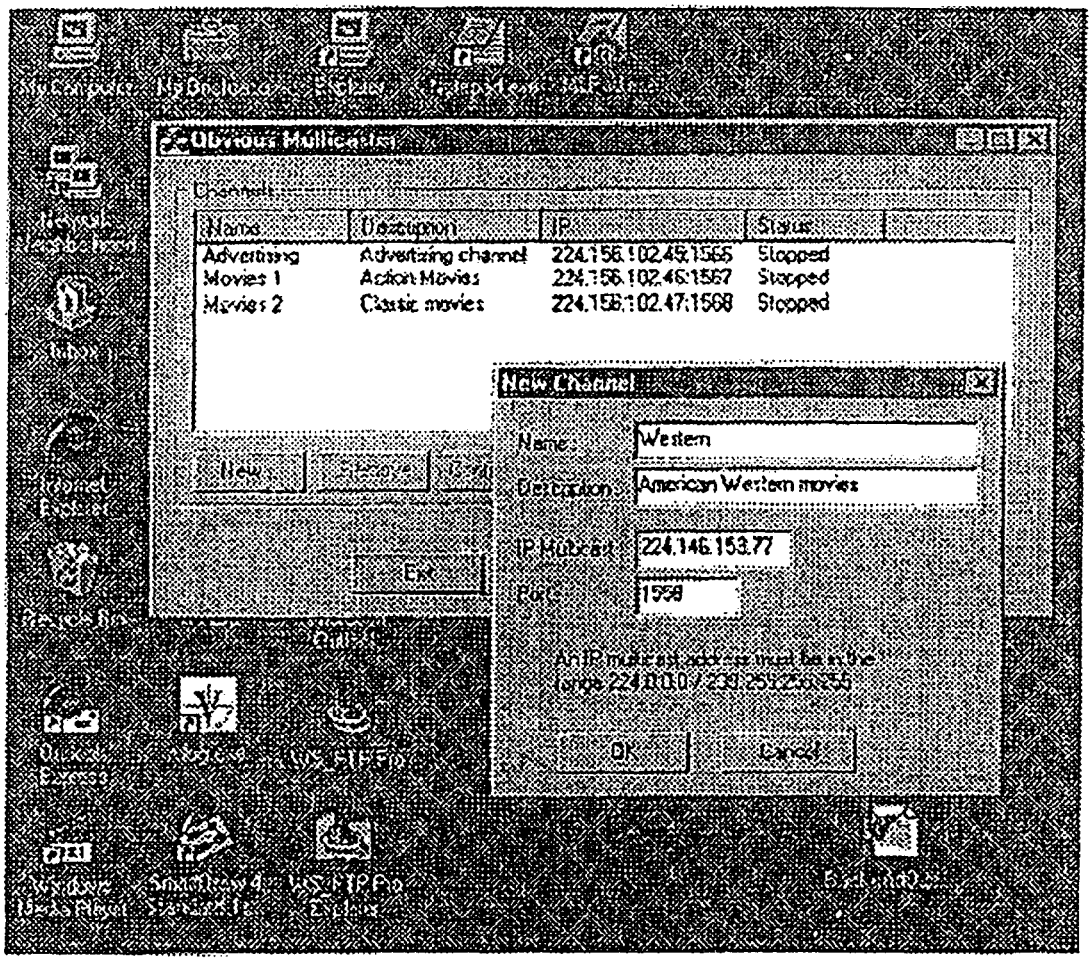
FIG. 51 is an example of a screen shot for adding a new channel.
Figure 52:
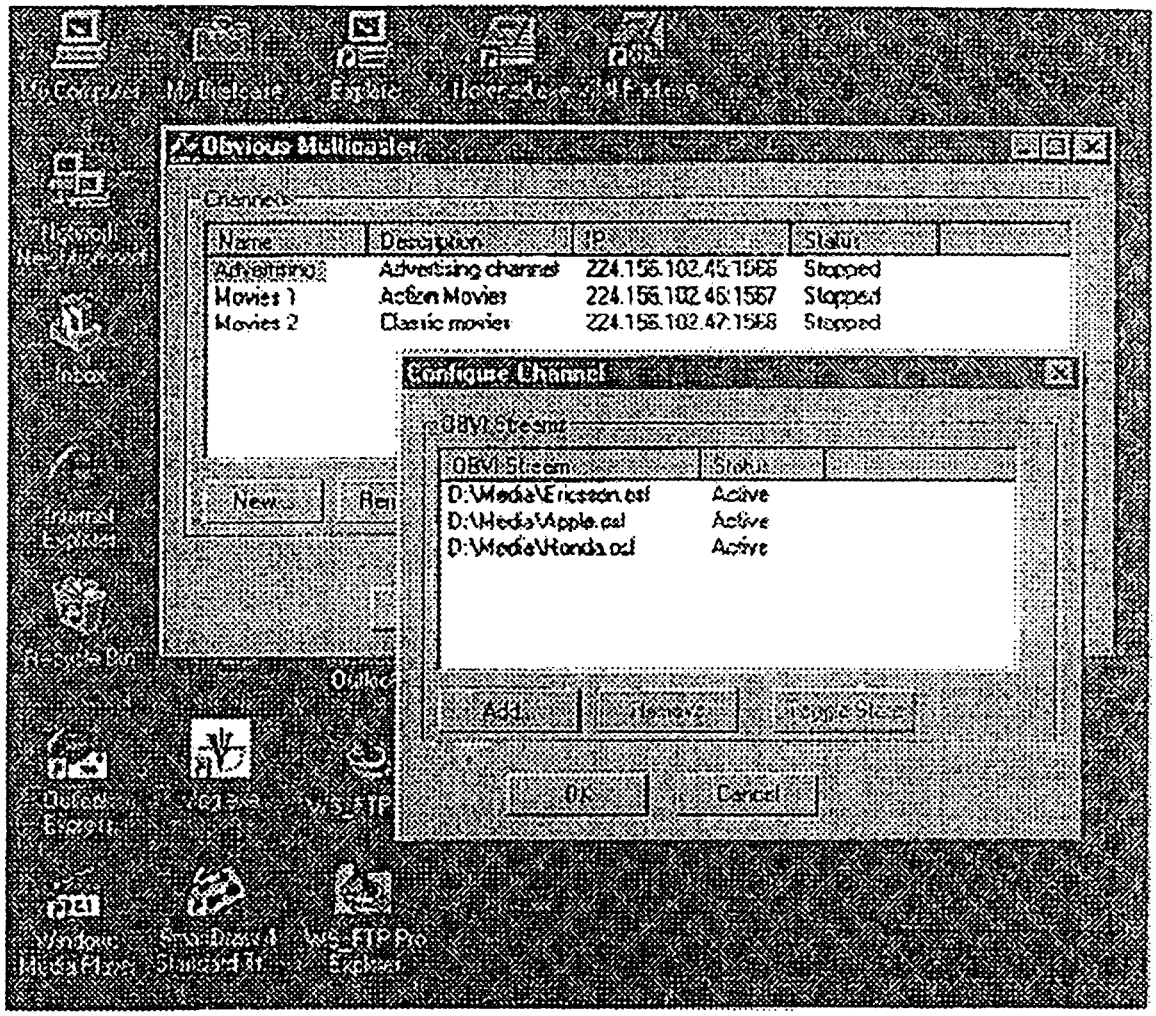
FIG. 52 is an example of a screen shot for configuring a channel.

The New button allows the user to create a new channel. FIG. 51 shows the dialog that appears. By selecting a channel an clicking on the Configure button, the user can define the list of OSF files that constitute that specific channel. The browse button permits to load an existing OSF file from the hard-drive, FIG. 52.

4 The Obvious Multicast Listener

XVII—The whole picture

This section gives an overview of the whole process. This process concerns the following tasks:

managing media files creating and authoring OBVIs publishing and indexing OBVIs searching and browsing published OBVIs distributing OBVIs Cycle 1: Managing Video Files On input: Video assets (in analog or digital form)

On output: Video Documents and Media are created and properly registered in the system. OBF files are created and uploaded to the OMS. The original media file are analysed by the VAMT and archived.

Description: In this cycle, the user typically sits on a video acquisition machine. He may have a closed-caption device that will allow him to extract useful text information that will be stored as annotations. By using the Obvious Management Console (see Section XI), the user select the Media administration realm. It displays the tree of existing Video Documents/Media/Streams in the system. He can either create a new Video Document or it can use an existing Video Document. Then, he creates N Media entries corresponding to the video asset that he wants to register. For that purpose he can either use a pre-digitised video or do a video acquisition from an analog source.

For each created media, an OBF file is created and uploaded to the OMS. The creation of the OBF is done locally (since the original video file) is present on the local hard-drive. The original media file is then uploaded to the VAMT machine for analysis and archiving purposes.

From the same Obvious Administration Console, the user starts the Obvious VAMT Manager. Then he creates and launches VAMT analysis jobs for the media that he has just created.

Cycle 2: Creating and Authoring OBVIs from Pre-registered Media

On input: The user wants to create and author OBVIs related to a pre-registered media On output: An OBVI is created. This OBVI is locally saved as an OVI file. It can be edited at any time, shared between several persons and published.

Description: The user typically sits on an authoring machine containing the OMM. From that application, he browses the available Video Documents and their corresponding Media. He selects one media. Then, a connection to the OIS database is made and VAMT results are downloaded. A decision step, based on the user threshold allows the building of a basic segmentation of the video into meaningful blocks. This step is very fast, because the VAMT analysis has already be done in CYCLE 1.

Cycle 3: Creating and Authoring OBVIs from Non-registered Media

On input: The user has a media file on his hard-drive, This media has not been registered in the system and the user doesn't want to go into CYCLE 1. He wants to create a local OBVI from that local media file.

On output: An OBVI is created from the local media file. The OBVI can not be distributed unless remote users have a way to access the original video file (by either embedding the media file in the OBVI or by giving to them LAN access to that media file).

Description: As of writing, this is the current way of creating and authoring OBVIs with the OMM.

Cycle 4: Publishing and Indexing an OBVI

On input: An OBVI from CYCLE 2 or CYCLE 3

On output: The OVI is published and indexed. A new entry is created in the database. The published OBVI is bound to a registered Vdoc/Media. It can be exported as OVI, XML or OSF.

Description: The user typically sits on a remote client machine. He has the OVI file on its local hard-drive. He launches the Obvious Publisher, browses for this OVI file, selects a site (in a multisite configuration) and enter version specific metadata (author name and description). He also enters a username and password for security purposes. Then, the OVI is uploaded to the machine OVM server. The OVM machine contains the Obvious Publishing Engine which will take care of the core publishing and indexing process.

Cycle 5: Searching and Browsing

On input: An end-user want to browse the OIS database of a given site. He want to make basic and advanced searches foir retrieving OBVIs.

On output: The fetched OBVIs are extracted from the OIS database and sent to the end-user in either OVI or XML form, depending on its client application.

Description: The user typically sits on a client machine, with an Internet brower. He connects to the search page of the given site and makes boolean/strata-driven searches. The he selects the OBVI that we want to visualise and the extraction mode. If he has the Obvious Java Viewer, then he asks for the XML version of the OBVI. The extracted OBVI can not be modified. If he has the OMM/OME, he asks for the OVI version. The extracted OBVI can be modified and re-published at a later time (with a new version).

XVIII. XML Format for Recordsets

In the Obvious Server Architecture, many HTTP requests give a response that can be represented as a recordset, i.e. a table constituted by N fields and M rows. Each field has a type and a name.

An XML format has been designed for representing a generic recordset. This allows a common representation of all these HTTP responses.

The DTD is given below:

```
<?xml version="1.0" ?>
<!-- DTD for the XML representation of a generic recordset -->
<!-- Copyright Obvious Technology, 1999 -->
<!ELEMENT recordset (fields,row*)>
<!ELEMENT fields (field*)>
<!ELEMENT field (#PCDATA)>
<!ATTLIST field type CDATA #REQUIRED>
<!ELEMENT row (value*)>
<!ELEMENT value (#PCDATA)>
```

XIX. XML Format for OBVI Structure

The GetStructure request of the Obvious Media Server returns a XML-formatted response whose DTD is described below:

```
<?xml version="1.0 " ?>
<!-- DTD for the XML representation of an OBVI structure -->
<!-- Copyright Obvious Technology, 1999 -->
<!ELEMENT OBVISTRUCTURE (BLOCK+)>
<!ATTLIST OBVISTRUCTURE DTDVersion CDATA #REQUIRED>
<!ELEMENT TCIN (#PCDATA)>
<!ELEMENT TCOUT (#PCDATA)>
<!ELEMENT BLOCK (TCIN,TCOUT,BLOCK*)>
```

A sample XML is given below. It represents a structure with 3 levels. First level is composed of 2 blocks, with 2 child blocks each.

```
<OBVISTRUCTURE DTDVersion="1.0">
  <BLOCK>
    <TCIN>00:00:00:00</TCIN>
    <TCOUT>00:00:23:05</TCOUT>
    <BLOCK>
      <TCIN>00:00:00:00</TCIN>
      <TCOUT>00:00:12:00</TCOUT>
    </BLOCK>
    <BLOCK>
      <TCIN>00:00:12:01</TCIN>
      <TCOUT>00:00:23:05</TCOUT>
    </BLOCK>
  </BLOCK>
  <BLOCK>
    <TCIN>00:00:23:06</TCIN>
    <TCOUT>00:00:56:15</TCOUT>
    <BLOCK>
      <TCIN>00:00:23:06</TCIN>
      <TCOUT>00:00:49:32</TCOUT>
      <BLOCK>
        <TCIN>00:00:23:06</TCIN>
        <TCOUT>00:00:34:00</TCOUT>
      </BLOCK>
      <BLOCK>
        <TCIN>00:00:34:01</TCIN>
        <TCOUT>00:00:49:32</TCOUT>
      </BLOCK>
    </BLOCK>
    <BLOCK>
      <TCIN>00:00:49:33</TCIN>
      <TCOUT>00:00:56:15</TCOUT>
    </BLOCK>
  </BLOCK>
</OBVISTRUCTURE>
```

XX. XML Format for Object Annotations

Object annotations are internally represented by an XML file whose DTD is described below:

```
<?xml version="1.0" ?>
<!-- DTD for the XML representation of an Objet Annotation -->
<!-- Copyright Obvious Technology, 1999 -->
<!ELEMENT ObjectAnnotation
(Title,Description,URL,ObjectPath+)>
<!ELEMENT Title (#PCDATA)>
<!ELEMENT Description (#PCDATA)>
<!ELEMENT URL (#PCDATA)>
<!ELEMENT ObjectPath (Title,Description,URL,Path)>
<!ELEMENT Path (Box+)>
<!ELEMENT Box (Description?,URL?)>
<!ATTLIST Box
  x CDATA #REQUIRED
  y CDATA #REQUIRED
  width CDATA #REQUIRED
  height CDATA #REQUIRED
  frame CDATA #REQUIRED>
```

A sample XML file is given below.

```
<?xml version="1.0"?>
<ObjectAnnotation RangeMin=36 RangeMax=45>
<Title>Bird and cat</Title>
<Description>Bird and cat</Description>
<URL></URL>
  <ObjectPath>
  <Title>Bird</Title>
  <Description>Motion tracking of the bird</Description>
  <URL>http://www.company1.com/page1.html</URL>
  <Path>
    <Box x=140 y=126 width=76 height=65 frame=35>
      <Description>Bird sleeping</Description>
```

```
        <URL>http://www.company1.com/birds.html</
          URL>
      </Box>
      <Box x=140 y=126 width=76 height=65 frame=36>
      </Box>
      <Box x=140 y=126 width=76 height=65 frame=43>
        <Description>The bird is dead</Description>
      </Box>
      <Box x=140 y=126 width=76 height=65 frame=45>
      </Box>
    </Path>
  </ObjectPath>
    <ObjectPath>
    <Title>Cat</Title>
    <Description>Motion tracking of the cat</
      Description>
    <URL>http://www.company1.com/page2.html</
      URL>
    <Path>
      <Box x=100 y=229 width=127 height=134 frame=
        35>
          <Description>The cat is
    hungry</Description></Box>
      <Box x=145 y=190 width=133 height=130 frame=
        36>
      </Box>
      <Box x=149 y=198 width=120 height=139 frame=
        43>
          <Description>Cat eating the bird</Description>
          <URL>http://www.company1.com/cats.html</
            URL></Box>
      <Box x=142 y=220 width=128 height=155 frame=
        45>
      </Box>
    </Path>
      </ObjectPath>
  </ObjectAnnotation>
```

XXI. GUID for Objects

A Global Unique Identifier (GUID), also called Universal Unique Identifier (UUID), is a 128-bit value used in cross-process communication to identify entities such as client and server interfaces, manager entry-point vectors, and RPC objects.

As previously described, the Obvious Network Architecture defines unique identifiers for various objects, such as Vdocs, Media, Streams, Users, Groups, Units, OBVIs, Versions, etc. However, these identifiers are not unique over all sites. Two objects from two different sites may have the same identifier.

This section describes a way for creating global unique identifier. These GUIDs would permit the referencing of objects across sites boundaries making possible for one site to access the objects of another site.

The structure of a GUID is given in the following matrix:

$$GUID(Object)=Site(Object)+Identifier(Object)$$

Suppose we have 2 Sites called A and B. From a client application a user fetches an object XA from site A. This object has a unique identifier in Site A. However it is not guaranteed that this identifier is not already in use in Site B. A GetGUID request is sent to the OSM of Site A. This allows the client application to get the GUID corresponding to XA.

XXII. The IAnnotFilter COM Interface

The Obvious Publishing Engine uses a set of filters for extracting raw text from the various kind of annotations that can be found in an OVI. Each OVI annotation correspond to a specific filter that acts as a parser for that annotation. The Obvious Network Architecture specifies that filters are COM objects that implements the IAnnotFilter interface. This COM interface is described below.

XXIII. The IAnnotConverter COM Interface

During the publishing/indexing process, the Obvious Publishing Engine uses a set of converters for converting OVI annotations into HTML. Each OVI annotation must be handled by a specific converter. The Obvious Network Architecture specifies that converters are COM objects that implements the IAnnotConverter interface. This COM interface is described below.

What is claimed is:

1. A method of delivering video over a network, comprising:

receiving video data representing a video sequence *at a first device*;

generating a hyper-media container [containing] *including* data associated with the video data;

storing the video data *in a memory at the first device*;

storing the hyper-media container *in the memory in a primary storage format*; *and* providing the video data and the hyper-media container available over the network to a [remote user] *second device, the hyper-media container being provided in a secondary storage format, the secondary storage format being a format different than the primary storage format and being a format that is readable at the second device,*

*wherein the hyper-media container in the secondary storage format includes address information of annotation data.*

2. The method as set forth in claim 1, wherein generating the hyper-media container [comprises] *includes* providing annotations to the video data.

3. The method as set forth in claim 1, wherein generating the hyper-media container includes providing segmentation data associated with the video data.

[4. The method as set forth in claim 1, further comprising controlling access to the video data and the hyper-media container.]

5. The method as set forth in claim [4] *55*, wherein controlling access [comprises] *includes* controlling access to annotations.

6. The method as set forth in claim [4] *55*, wherein controlling access [comprises] *includes* controlling access to annotation packs.

7. The method as set forth in claim [4] *55*, wherein controlling access [comprises] *includes* controlling access to versions of annotations.

8. The method as set forth in claim 1, wherein the providing the video data and the hyper-media container available to the [remote user comprises] *second device includes* publishing the video data and the hyper-media container.

9. The method as set forth in claim 1, wherein the providing the video data and the hyper-media container available to the [remote user] *second device* includes distributing at least the hyper-media container.

10. The method as set forth in claim 9, wherein the distributing [comprises] *includes* providing the hyper-media container available on-demand.

11. The method as set forth in claim 9, wherein the distributing [comprises] *includes* streaming the video data to the [remote user] *second device* over the network.

12. The method as set forth in claim 9, wherein the distributing [comprises] *includes* immerse streaming the video data to the [remote user] *second device* over the network.

13. The method as set forth in claim 9, wherein the distributing [comprises] *includes* broadcasting the hyper-media container over the network to the [remote user] *second device*.

14. The method as set forth in claim 1, further comprising indexing the video data.

15. The method as set forth in claim 1, further comprising receiving modifications to one of the hyper-media container and the video data from the [remote user] *second device* and [the] modifying the corresponding one of the hyper-media container and video data.

16. The method as set forth in claim 1, further comprising allowing the [remote user] *second device* to collaborate with other [remote users] *devices* on at [lest] *least* one of the video data and the hyper-media container.

17. The method as set forth in claim 16, further comprising maintaining version control of modifications to at least one of the video data and the hyper-media container.

18. The method as set forth in claim 1, wherein generating the hyper-media container [comprises including] *includes providing* an identification of a location for the video data associated with the hyper-media container.

19. The method as set forth in claim 1, wherein generating the hyper-media container [comprises including] *includes providing* an identifier for the video data associated with the hyper-media container.

20. The method as set forth in claim 1, wherein the data in the hyper-media container that is associated with the video data [comprises] *includes* an identifier for a data object.

21. The method as set forth in claim 1, wherein the receiving [comprises] *includes* receiving the video data over the network.

22. The method as set forth in claim 1, wherein the receiving [comprises] *includes* receiving the video data from a [second remote user] *fourth device*.

23. The method as set forth in claim 1, further comprising enabling the [remote user] *second device* to send the hyper-media container directly to a [second remote user] *fourth device*.

24. A method of delivering video over a network, comprising:

receiving video data representing a video sequence *at a first device*;

generating a hyper-media container [containing] *including* data associated with the video data;

storing the video data *in a memory at the first device*;

storing the hyper-media container *in the memory in a primary storage format*; *and* providing the video data and the hyper-media container available over the network to a [remote user] *second device, the hyper-media container being provided in a secondary storage format, the secondary storage format being a format different than the primary storage format and being a format that is readable at the second device,* wherein generating the hyper-media container includes analyzing the video data and associating results of the analyzing with the hyper-media container, *and the hyper-media container in the secondary storage format includes address information of annotation data*.

25. The method as set forth in claim 24, wherein the analyzing [comprises] *includes* selecting an object from within the video.

26. The method as set forth in claim 24, wherein the analyzing includes extracting an object from within the video.

27. The method as set forth in claim 24, wherein the analyzing includes ranking frames of the video.

28. The [methods] *method* as set forth in claim 24, wherein the analyzing includes analyzing camera motion.

29. The method as set forth in claim 24, wherein the analyzing includes generating zooming effects.

30. The method as set forth in claim 24, wherein the analyzing includes generating scripts effects.

31. The method as set forth in claim 24, wherein the analyzing includes generating special effects.

32. A method of delivering video over a network, comprising:

receiving video data representing a video sequence *at a first device*;

generating a hyper-media container [containing] *including* data associated with the video data;

storing the video data *in a memory at the first device*;

storing the hyper-media container *in the memory in a primary storage format*;

providing the video data and the hyper-media container available over the network to a [remote user] *second device, the hyper-media container being provided in a secondary storage format, the secondary storage format being a format different than the primary storage format and being a format that is readable at the second device*;

[the method further comprising:]

receiving modifications to one of the hyper-media container and the video data from the [remote user] *second device* and modifying the corresponding one of the hyper-media container and video data; and publishing versions of the modifications from the [remote user] *second device* to other [remote users] *devices,*

*wherein the hyper-media container in the secondary storage format includes address information of annotation data.*

*33. A method of providing video data over a network comprising:*

*receiving video data representing a video sequence at a first device;*

*generating a hyper-media container including data associated with the video data;*

*storing the video data in a memory at the first device;*

*storing the hyper-media container in the memory in a primary storage format; and*

*providing the video data and the hyper-media container available over the network to a second device, the hyper-media container being provided in a secondary storage format, the secondary storage format being a format different than the primary storage format and being a format that is readable at the second device,*

*wherein the hyper-media container is separated from the video data and the hyper-media container in the secondary storage format includes address information of annotation data.*

*34. The method as set forth in claim 33, wherein the annotation data is described in terms of mark-up language.*

*35. The method as set forth in claim 33, wherein the annotation data is associated with the video data through an identifier.*

*36. The method as set forth in claim 33, wherein the annotation data is manually generated by a user.*

*37. The method as set forth in claim 33, wherein the annotation data is automatically generated.*

*38. The method as set forth in claim 33, wherein the video data is associated with one or more annotation data.*

*39. The method as set forth in claim 33, wherein the annotation data includes an identification of a location for the video data associated with the annotation data.*

*40. The method as set forth in claim 33, further comprising designating at least one object in a frame of the video data, and tracking the object in the other frames.*

*41. The method as set forth in claim 33, wherein the video data is received in streaming format.*

*42. The method as set forth in claim 33, wherein the video data is downloaded.*

*43. The method as set forth in claim 33, wherein the hyper-media container is stored and managed as a database object.*

*44. A method of providing annotation data over a network comprising:*

*receiving video data representing a video sequence at a first device;*

*generating annotation data including data associated with the video data;*

*storing the annotation data in a memory at the first device; and*

*providing the digital data and annotation data available over the network to a second device, wherein the annotation data is separated from the video data and is associated with the video data through an identifier,*

*wherein the annotation data is associated with a hyper-media container, the hyper-media container is stored at the first device in a primary storage format and provided to the second device in a secondary storage format, the secondary storage format being a format different than the primary storage format and being a format that is readable at the second device, and the hyper-media container in the secondary storage format includes address information of the annotation data.*

*45. The method as set forth in claim 44, wherein the annotation data is described in terms of mark-up language.*

*46. The method as set forth in claim 44, wherein the annotation data is manually generated by a user.*

*47. The method as set forth in claim 44, wherein the annotation data is automatically generated.*

*48. The method as set forth in claim 44, wherein the video data is associated with one or more annotation data.*

*49. The method as set forth in claim 44, wherein the annotation data includes an identification of a location for the video data associated with the annotation data.*

*50. The method as set forth in claim 44, further comprising designating at least one object in a frame of the video data, and tracking the object in the other frames.*

*51. The method as set forth in claim 44, wherein the video data is received in streaming format.*

*52. The method as set forth in claim 44, wherein the video data is downloaded.*

*53. The method as set forth in claim 44, wherein the hyper-media container is stored and managed as a database object.*

*54. The method as set forth in claim 1, wherein the hyper-media container is stored and managed as a database object.*

*55. The method as set forth in claim 1, further comprising controlling access to the video data and the hyper-media container.*

*56. The method as set forth in claim 24, wherein the hyper-media container is stored and managed as a database object.*

*57. The method as set forth in claim 32, wherein the hyper-media container is stored and managed as a database object.*

*58. An apparatus for delivering video over a network, comprising:*

*a receiving unit configured to receive video data representing a video sequence;*

*a generating unit configured to generate a hyper-media container including data associated with the video data;*

*a memory unit which stores the video data and the hyper-media container, the hyper-media container being stored in a primary storage format;*

*a providing unit configured to provide the video data and the hyper-media container available over the network to a first device, the hyper-media container being provided in a secondary storage format, the secondary storage format being a format different than the primary storage format and being a format that is readable at the first device,*

*wherein the hyper-media container in the secondary storage format includes address information of annotation data.*

* * * * *